(12) United States Patent
Harish

(10) Patent No.: US 8,700,828 B2
(45) Date of Patent: *Apr. 15, 2014

(54) UNIVERSAL INTERFACE FOR ONE OR MORE SENSORS

(71) Applicant: Divyasimha Harish, Fremont, CA (US)

(72) Inventor: Divyasimha Harish, Fremont, CA (US)

(73) Assignee: Loadstar Sensors, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,256

(22) Filed: Jun. 20, 2013

(65) Prior Publication Data

US 2013/0282936 A1    Oct. 24, 2013

Related U.S. Application Data

(63) Continuation-in-part of application No. 12/234,745, filed on Sep. 22, 2008, now Pat. No. 8,495,263.

(60) Provisional application No. 60/974,434, filed on Sep. 21, 2007.

(51) Int. Cl.
*G06F 13/12* (2006.01)
*G06F 13/38* (2006.01)

(52) U.S. Cl.
USPC .......................................................... 710/63

(58) Field of Classification Search
USPC .......................................................... 710/63
See application file for complete search history.

(56) References Cited

U.S. PATENT DOCUMENTS

| | | |
|---|---|---|
| 4,695,955 A | 9/1987 | Faisandier |
| 5,568,815 A | 10/1996 | Raynes et al. |
| 7,256,505 B2 | 8/2007 | Arms et al. |
| 7,478,009 B2 * | 1/2009 | Cabrera et al. ................ 702/141 |
| 7,518,493 B2 | 4/2009 | Bryzek et al. |
| 8,275,471 B2 | 9/2012 | Huizenga et al. |
| 8,311,754 B2 | 11/2012 | Alles |
| 8,332,567 B2 | 12/2012 | Burr et al. |
| 8,495,263 B2 * | 7/2013 | Harish ............................ 710/63 |

* cited by examiner

*Primary Examiner* — Chun-Kuan Lee
(74) *Attorney, Agent, or Firm* — Raj Abhyanker, P.C.

(57) ABSTRACT

A method, system, and apparatus of a universal interface compatible with one or more sensors are disclosed. In one embodiment, a method comprises acquiring an electrical power signal of an external source at a universal interface device; communicating with the one or more sensors coupled to the universal interface device; conditioning, at the universal interface device, the electrical power signal; receiving an output of the one or more sensors operating on the conditioned electrical power signal; converting the output of to an appropriate form; communicating the appropriate form to the interface; and communicating the output of the one or more sensors to one or more data processing devices communicatively coupled to the universal interface device.

20 Claims, 51 Drawing Sheets

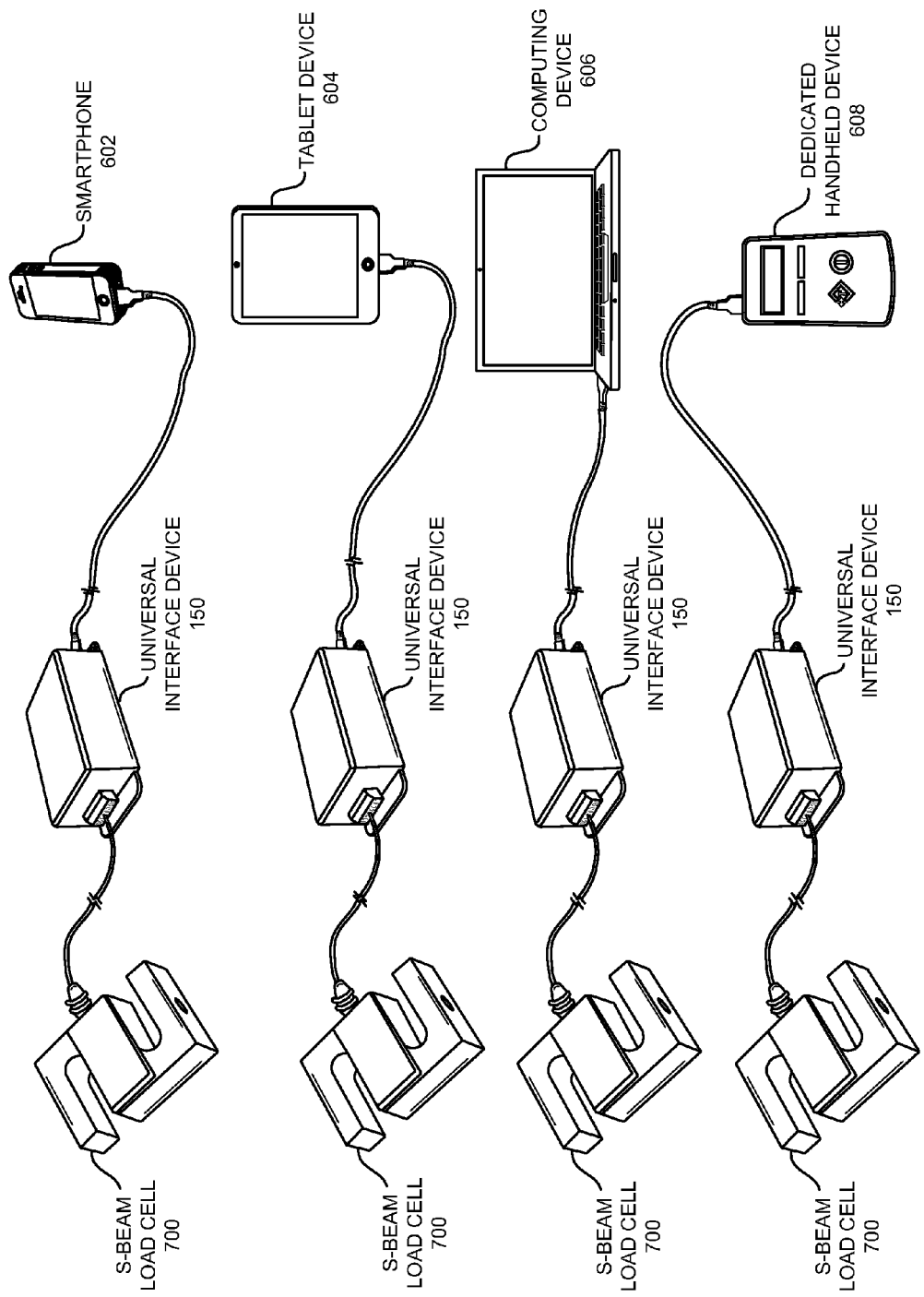

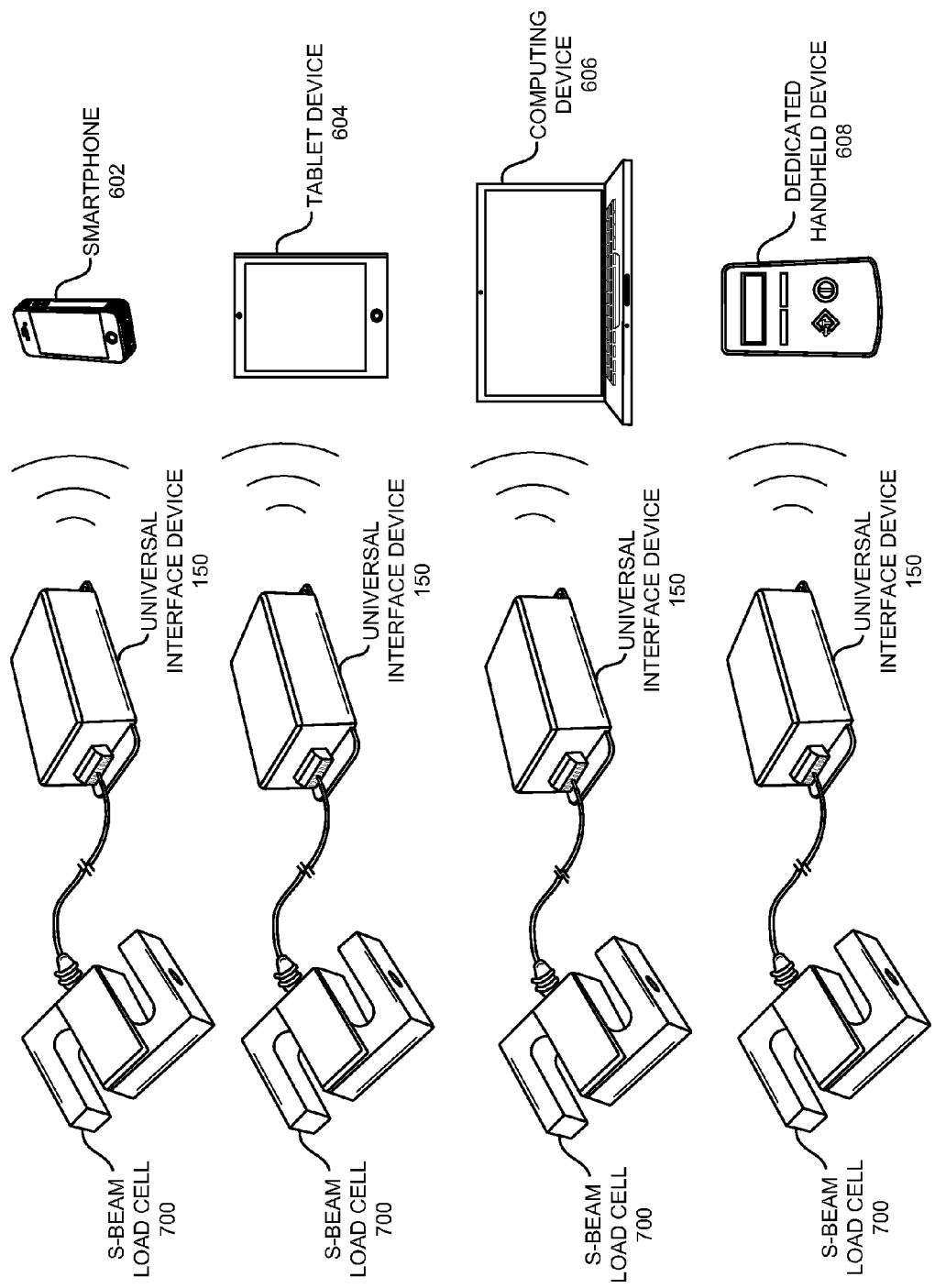

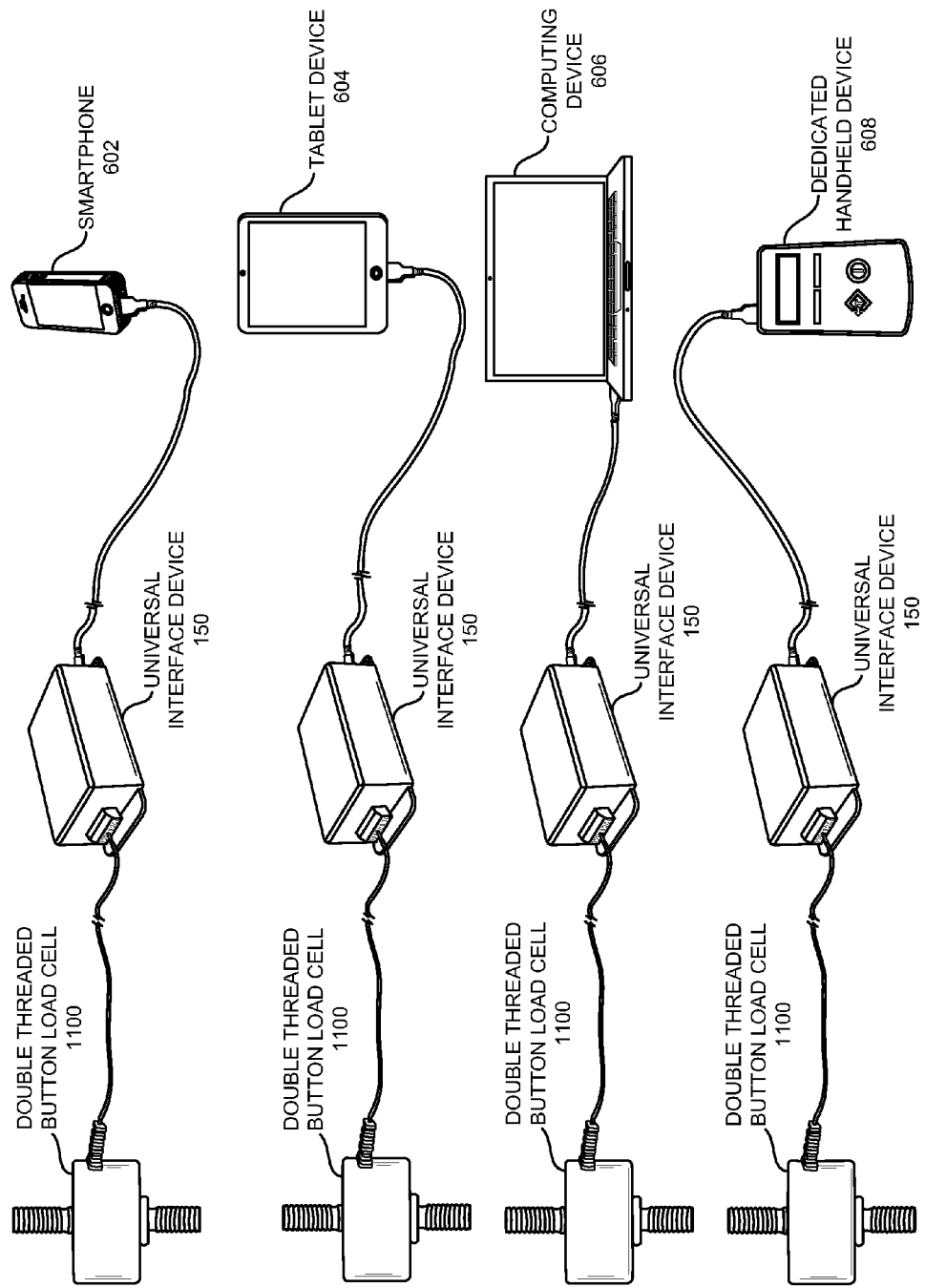

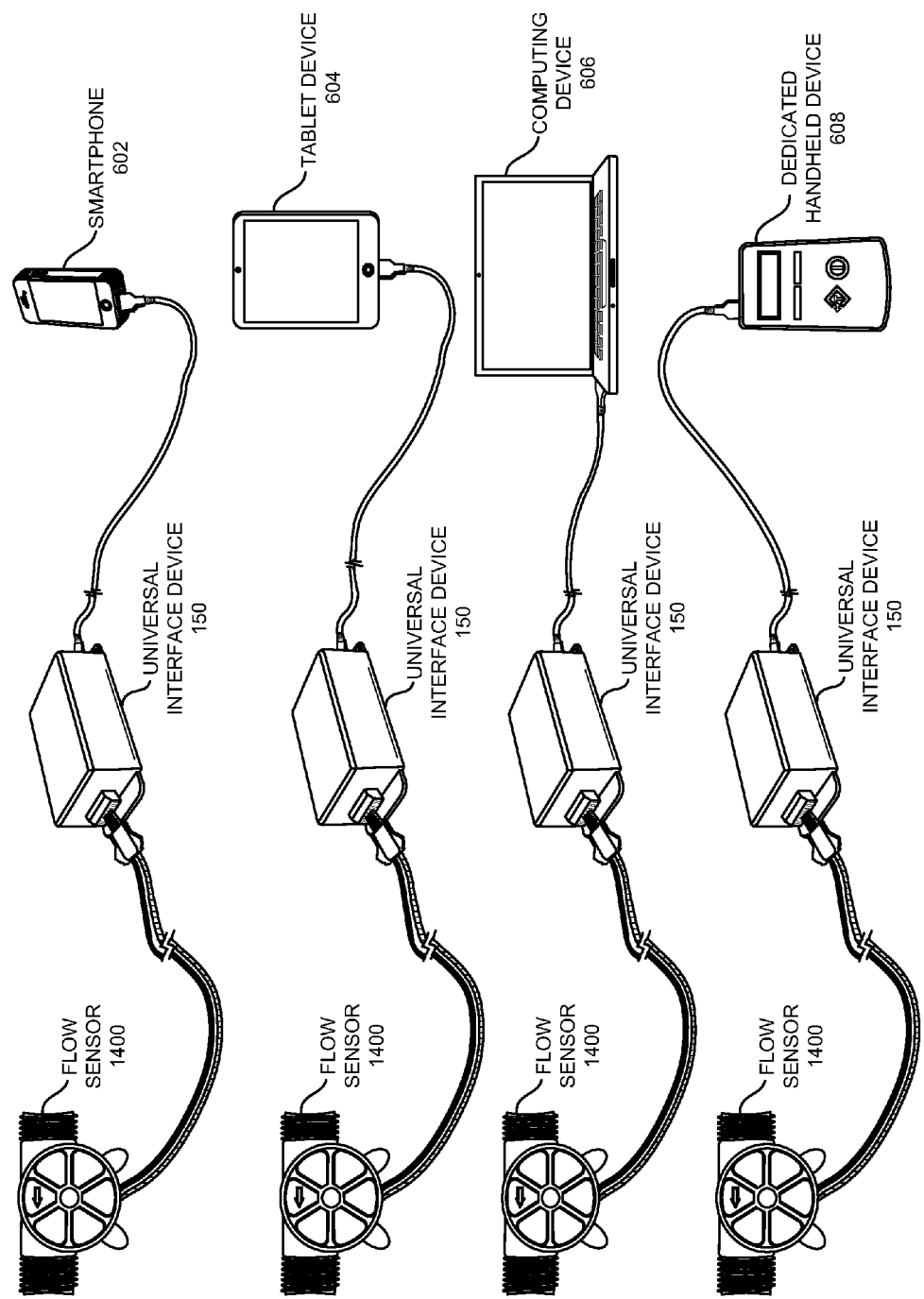

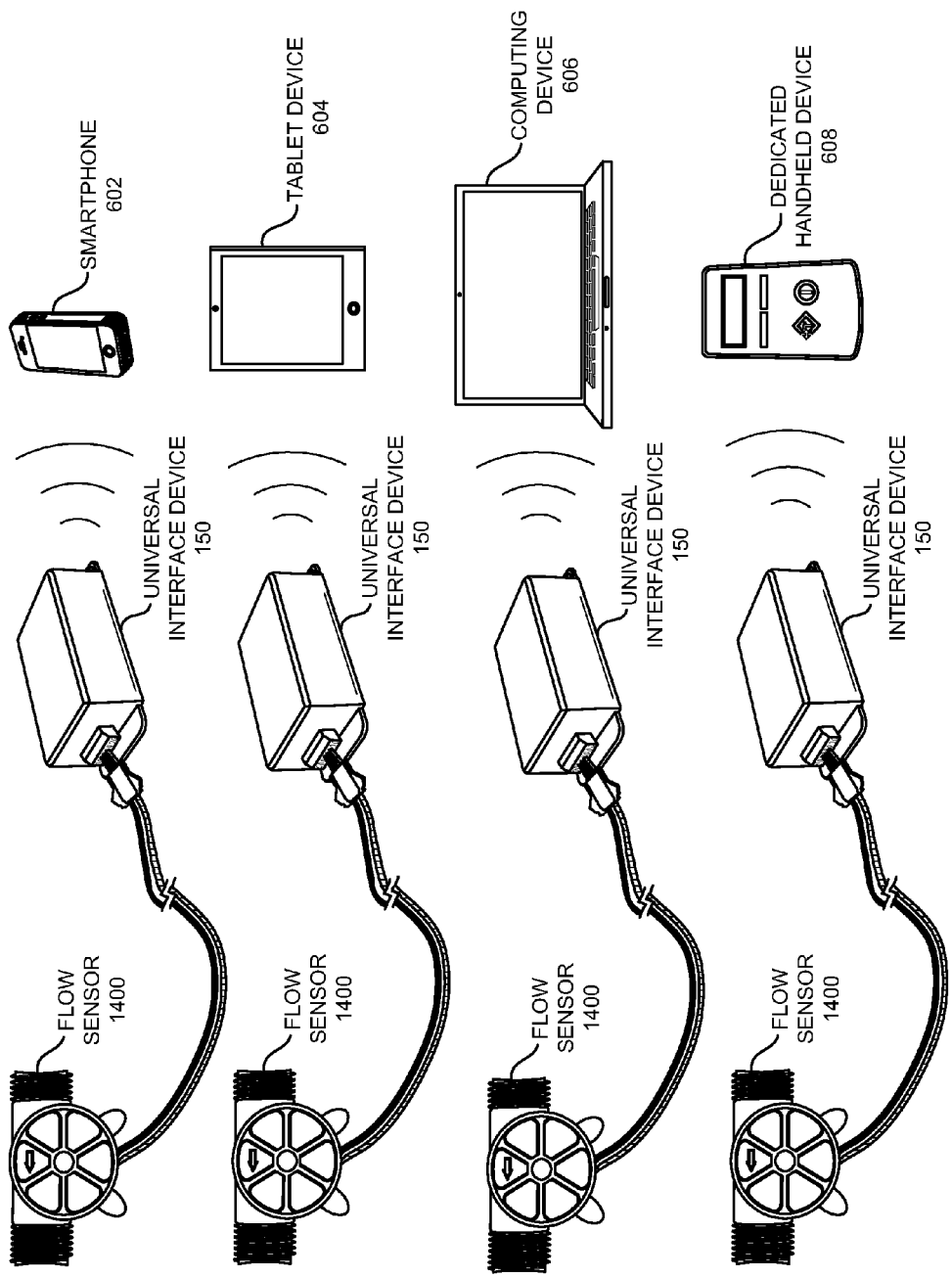

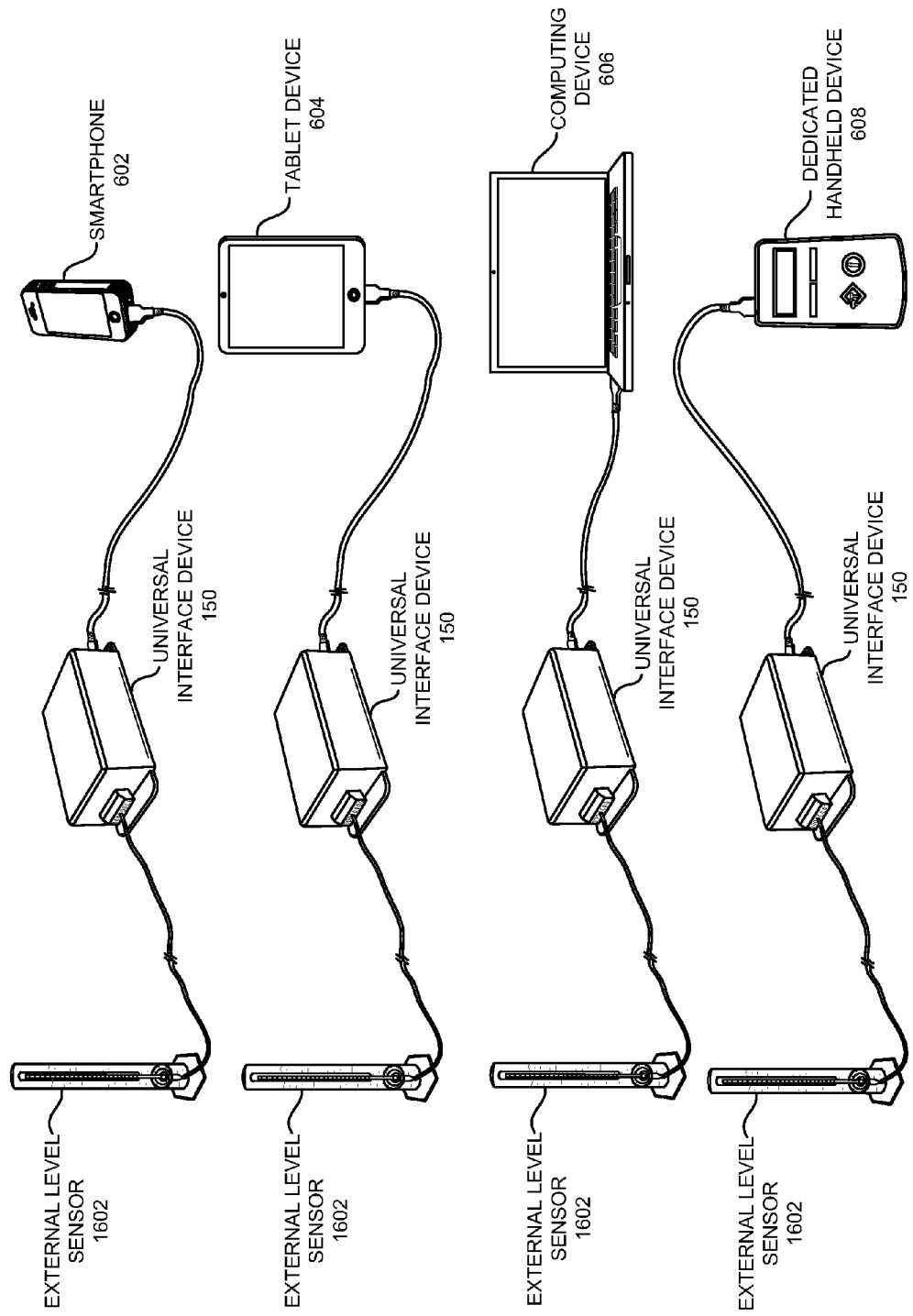

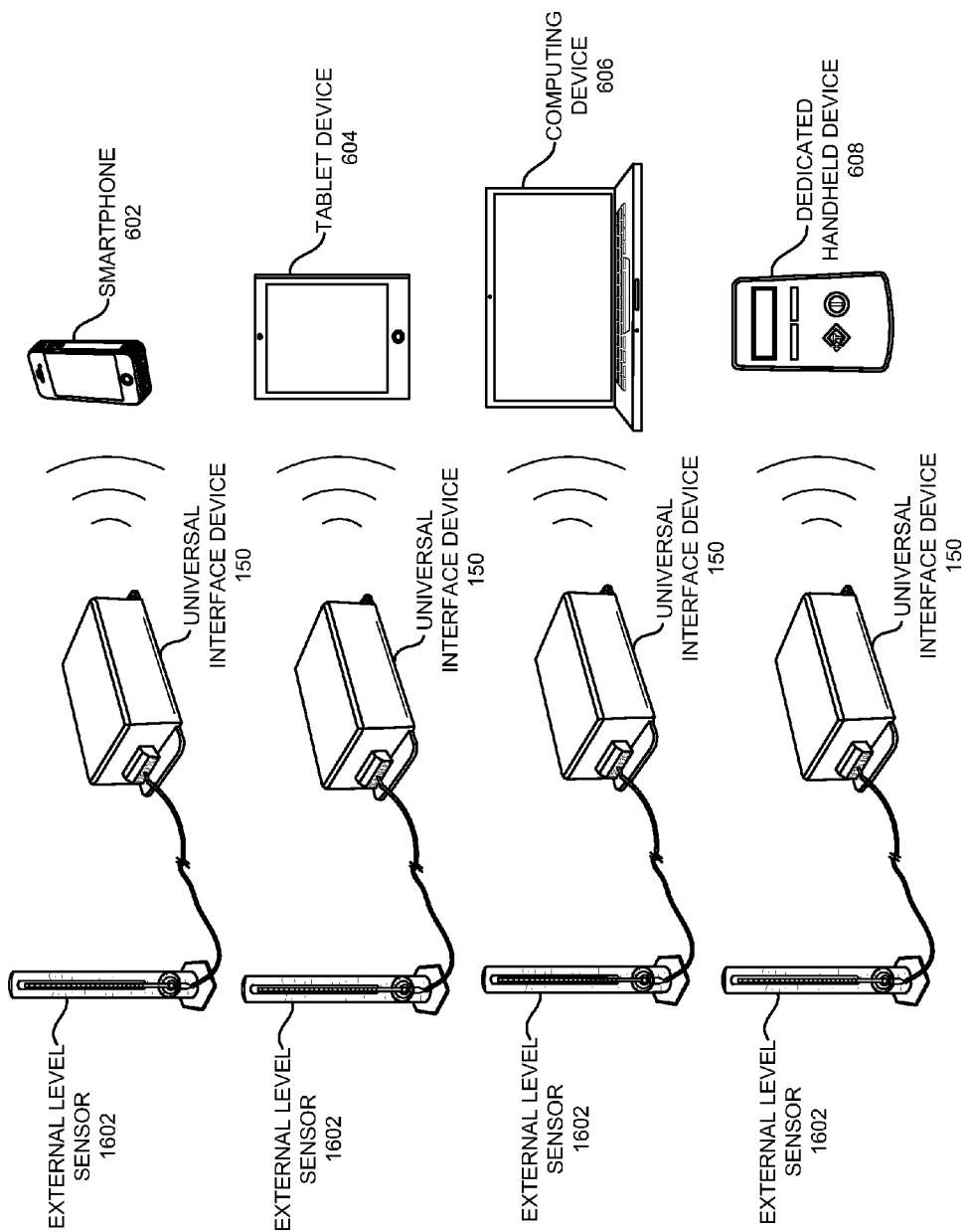

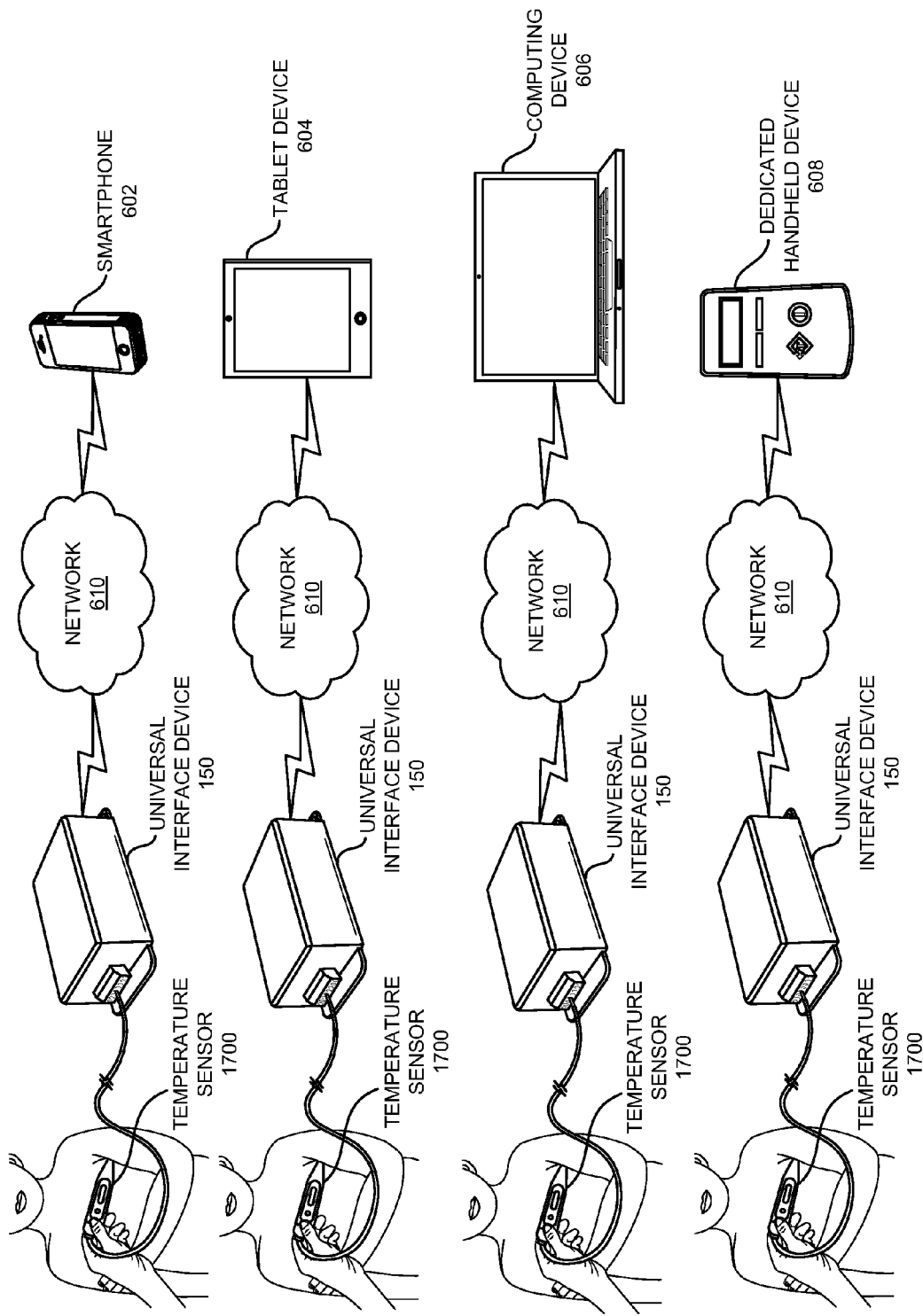

UNIVERSAL INTERFACE FOR ONE OR MORE SENSORS

CLAIM OF PRIORITY

This patent application is a continuation-in-part (CIP) application and claims priority to U.S. patent application Ser. No. 12/234,745 filed on Sep. 22, 2008, which, in turn, claims priority to U.S. Provisional Patent Application Ser. No. 60/974,434, filed on Sep. 21, 2007.

FIELD OF TECHNOLOGY

This disclosure relates generally to software and/or hardware technology and, in one example embodiment, to a universal interface for one or more sensors.

BACKGROUND

Sensor(s) may require electrical power that is limited to certain voltages and/or currents. The electrical power used by the sensor(s) may not be available from a standard electrical power source available at a home or an office and may function on batteries or other alternate sources of stored energy. When the sensor operates on a battery, the power available from the battery may change over time with consumption and the quality of the power may also change with consumption and time. The sensor(s)'s connector(s) may further use a specific power connector and/or a wire that a consumer may use to create an electrical connection (e.g., a wire input, a solder connection, a wire wrap connection, etc.). The sensor(s) may also use a type or quality of power (e.g., a clean regulated power to limit noise, or be at a precise level required for proper sensor readings) that may not be available as provided by standard power sources. The power standard for the sensor(s) and/or the sensor(s)'s connector may prevent the sensor(s) from operating with standard computers, smart phones, data acquisition and digitization devices or other display and measurement devices.

In addition, sensor(s) may use a custom sensor output (digital and/or an analog voltage outputs) with a range that exceeds or falls below a threshold standard used for standard electronic equipment (e.g., a hard drive, a computer, a recording device, data acquisition system, etc.). The sensor(s) may further have a custom output connector and/or a connector that is used with specialized data collection equipment (e.g., an A/D converter, a data collection card, etc.). These additional requirements may also prevent the sensor(s) from functioning with standard computers, smart phones, data acquisition and digitization devices or other display and measurement devices.

SUMMARY

A method and system of a universal interface for one or more sensors (e.g., a strain gauge, a load cell, etc.) are disclosed. In one aspect, a method includes acquiring an electrical power signal of an external source at a universal interface device; communicating with one or more sensors coupled to the universal interface device through the universal interface device; conditioning, at the universal interface device, the electrical power signal, wherein the conditioning is based on a type of power used and a quality of power used by the one or more sensors; transferring the conditioned electrical power signal to the one or more sensors; receiving, at the universal interface device, an output of the one or more sensors operating on the conditioned electrical power signal; converting the output of the one or more sensors to an appropriate form thereof compatible with an interface associated with the universal interface device; communicating the appropriate form to the interface; and communicating the output of the one or more sensors to one or more data processing devices communicatively coupled to the universal interface device through the interface.

The external source (e.g., a power source) may include at least one of a USB power source, a battery, a solar or wind power generator, and a wall charger. The electrical power (e.g., alternating current, direct current, etc.) may be conditioned by at least one of detecting an input voltage, adjusting a variance of the electrical power, and altering a voltage of the electrical power. The compatible form (e.g., a digital signal recognized by standard computer equipment, a wireless transmission to communicate with a computer, smartphone, tablet, etc.) may include at least one of a digital signal and an analog signal (e.g., an analog signal varying between 0 and 5 volts). The compatible form may be communicated through at least one of a wired interface (e.g., a cable, a USB port, RS-233 port, a serial port, a conductor, etc.), a wireless interface (e.g., Zigbee®, cellular, Bluetooth®, WiFi, WiMax, RFID, and other radio frequency standards, etc.), and an analog interface (e.g., voltage output, current output, an A/D converter input, etc.).

The sensor output (e.g., a strain gauge output, a load cell output, etc.) may include at least one of an approximately 0 to 20 millivolt signal, an approximately 0 to 5 Volt signal, a 4-20 mA signal (e.g., a 4-20 milliamp signal), a frequency based output, and a digital signal such as Pulse Width Modulation. The wired interface may be coupleable using at least one of a USB connection, an I²C connection, an SPI connection, an RS-232 connection, an RS-485 connection, a Ethernet connection, and a Power over Ethernet connection. The compatible form (e.g., a digital signal recognized by standard computer equipment, etc.) may be communicated through the wired interface using at least one of the approximately 0 to 20 millivolt signal, the approximately 0 to 5 Volt signal, the 4-20 mA signal, a frequency based output, and the digital signal, a USB signal, an I²C signal, an SPI signal, a UART signal, an RS-232 signal, an RS-485 signal, an Ethernet signal, a Power over Ethernet signal, a CAN bus signal, and a Profibus signal. The method may further comprise transmitting the compatible form to a display such as an LED display or an LCD display or controller.

In another aspect, a universal interface system is disclosed. In one aspect, the system comprises one or more sensors; and a universal interface device coupled to the one or more sensors, wherein the universal interface device further: acquires an electrical power signal of an external source, communicates with the one or more sensors, conditions the electrical power signal, wherein the conditioning is based on a type of power used and a quality of power used by the sensor, transfers the conditioned electrical power signal to the one or more sensors, receives an output of the one or more sensors operating on the conditioned electrical power signal, converts the output of the one or more sensors to an appropriate form thereof compatible with an interface associated with the universal interface device, communicates the appropriate form to the interface, and communicates the output of the one or more sensors to one or more data processing devices communicatively coupled to the universal interface device through the interface.

The external source may include at least one of a USB power source, a battery, solar or wind power generator, and a wall charger. The electrical power may be conditioned by at least one of detecting an input voltage, adjusting a variance of the electrical power, and altering a voltage of the electrical power. The compatible form may include at least one of a digital signal and an analog signal. The compatible form may be communicated through at least one of a wired interface, a wireless interface, and an analog interface. The sensor output may include at least one of an approximately 0 to 20 millivolt signal, an approximately 0 to 5 V signal, a 4-20 mA signal, a frequency based output, and a digital signal.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIGS. 7A-7C depict a system comprising a type of force sensor and the universal interface, according to one or more embodiments.

FIGS. 11A-11C depict a system comprising a type of force sensor and the universal interface, according to one or more embodiments.

FIGS. 14A-14C depict a system comprising a type of flow sensor and the universal interface, according to one or more embodiments.

FIGS. 16A-16F depict a system comprising types of level sensors and the universal interface, according to one or more embodiments.

FIGS. 17A-17C depict a system comprising a temperature sensor and the universal interface, according to one or more embodiments.

Other features of the present embodiments will be apparent from the accompanying drawings and from the detailed description that follows.

DETAILED DESCRIPTION

A method, system, and apparatus of a universal interface compatible with one or more sensors are disclosed. Although the present embodiments have been described with reference to specific example embodiments, it will be evident that various modifications and changes may be made to these embodiments without departing from the broader spirit and scope of the various embodiments.

Figure 1:
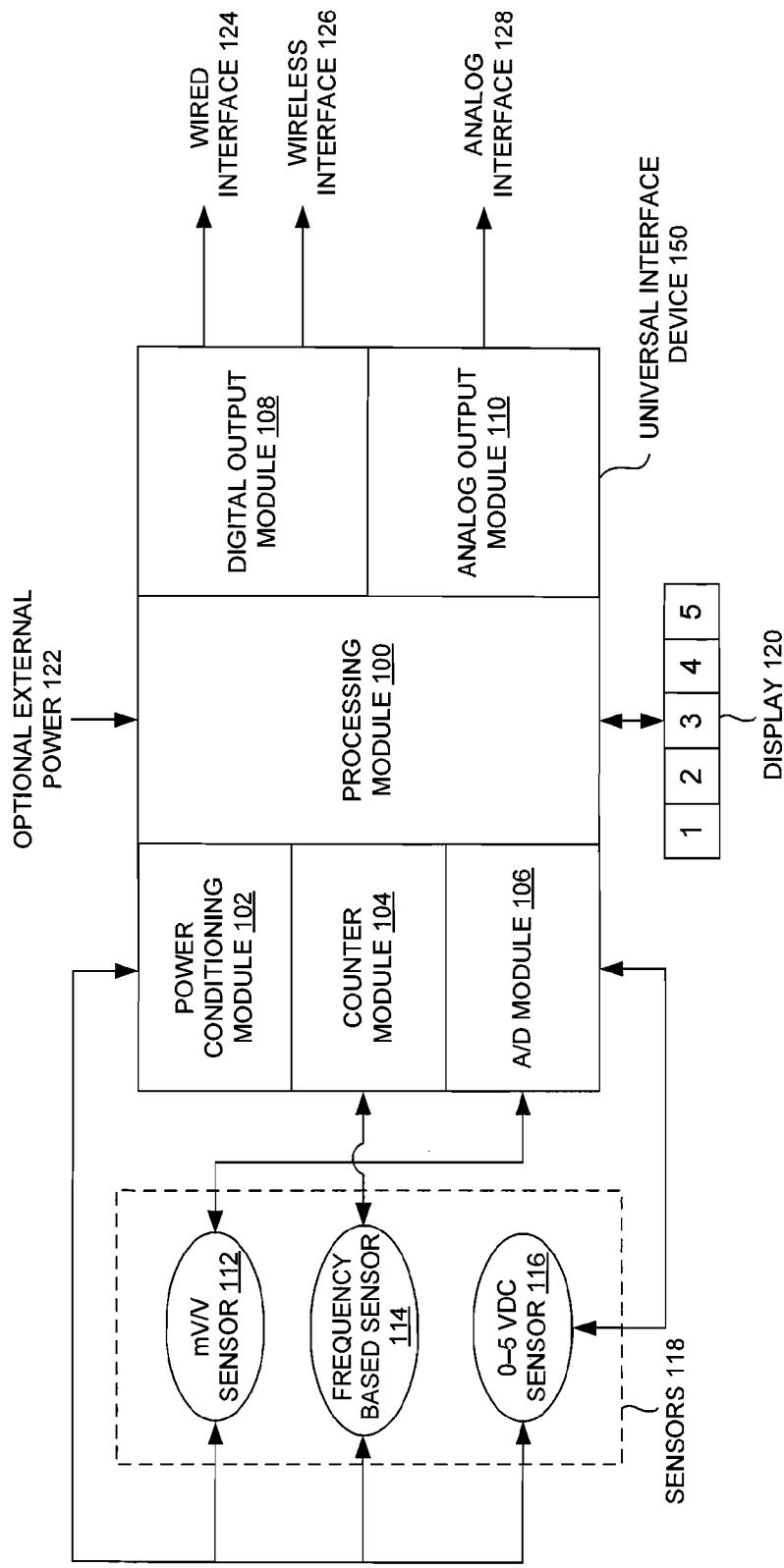
FIG. 1 depicts a system comprising a universal interface, according to one or more embodiments.

FIG. 1 illustrates one example embodiment of a system comprising a universal interface compatible with one or more sensors. As shown, the universal interface device 150 may include a processing module 100, a power conditioning module 102, a counter module 104, an A/D module 106, a digital output module 108, and/or an analog output module 110. The universal interface device 150 may communicate and/or interact with sensors 118, a display 120, an optional external power 122, a wired interface 124, a wireless interface 126, and/or an analog interface 128.

The universal interface device (e.g., the universal interface device 150 and/or 350) may acquire an optional external power (e.g., the optional external power 122 and/or 322). The optional external power may be direct current and/or alternating current that may be provided by more than one source of electrical power. The optional external power may be provided by a battery, a wall charger, a USB power line, or any other source of electricity. The overall function of the universal interface device may be governed by the processing module 100, which may control and/or monitor the components of the universal interface device, the inputs, and/or the outputs of the device. The processing module 100 may also perform a number of other operations including the processing, computing, communication, linearization, calibration, storage, and/or display of various signals. These signals may be communicated between the processing module, components and/or modules of the universal interface device 150, sensors 118, interfaces (e.g., the wired interface, the wireless interface, the analog interface, etc.) and the display 120.

The universal interface device (e.g., the universal interface device 150 and/or 350) may communicate with sensors 118 (e.g., a strain gauge, a load cell, a temperature sensor, a wind sensor, etc.), which may be a single sensor or several sensors. As shown in FIG. 1, these sensors may include a mV/V sensor 112, a frequency based sensor 114, and/or a 0-5 VDC sensor 116, as well as any other type of sensor. The sensor output may be a 0 to 20 millivolt signal, an approximately 0 to 5 volt signal, a 4-20 mA signal, a frequency based output, and/or a digital signal.

The sensor(s) 118 may communicate with the power conditioning module 102, and the sensors 118 may receive a conditioned power from the power conditioning module. The universal interface device 150 may provide power to any type of sensor.

Figure 2:
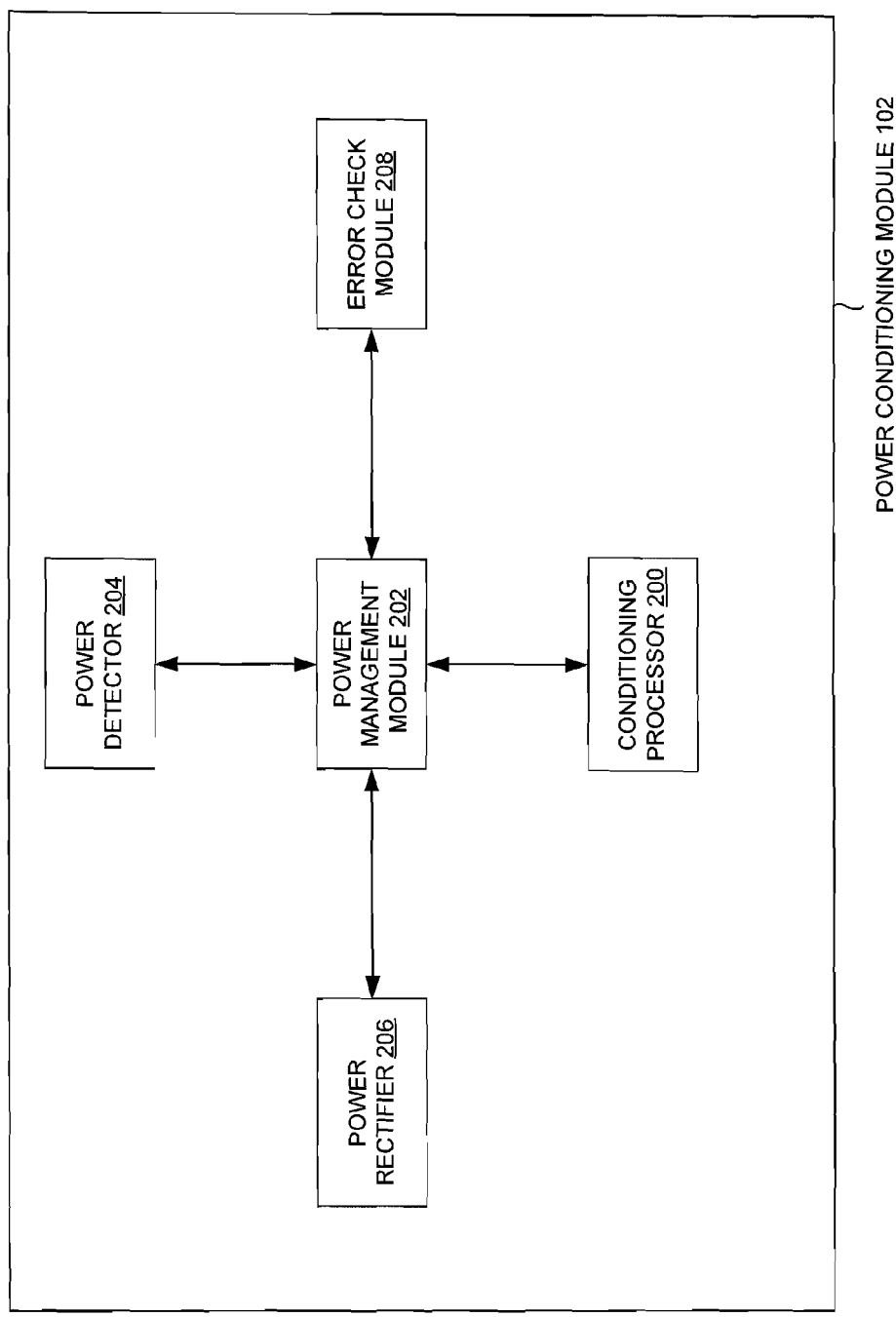
FIG. 2 is an exploded view of a power conditioning module that illustrates a power management module, a power rectifier, and other various modules communicating with each other, according to one or more embodiments.

FIG. 2 illustrates an embodiment of a power conditioning module 102 that includes a conditioning processor 200, a power management module 202, a power detector 204, a power rectifier 206, and an error check module 208. The electrical power may be conditioned by detecting an input voltage with the power detector 204 and/or by adjusting a variance of the electrical power with the power rectifier 206. A voltage of the electrical power may be altered by the power management module 202 and/or the power rectifier 206. The electrical power may further be conditioned by removing a power noise, sustaining power during a loss of power, and/or limiting a peak power. An error message may be generated by the error check module 208, which may account for problems in readings of a sensor (e.g., the sensors 118).

The communication between the sensors 118 and the power module 102 may relate to the level and type of power used by the sensor and/or a quality of power received by the sensor. The electrical power transferred to the sensors 118 may depend on the communication between the sensors 118 and the power conditioning module 102.

The sensors 118 may communicate with the counter module 104, and the communication may relate to a number of counts of a sensor output. The A/D module 106 may communicate with the sensors 118, and it may receive an analog signal (e.g., a 0-20 mV signal, a 0-5 volt signal, etc.) from the sensors 118 to be converted to a digital signal.

Each of the communications and/or power transfers between the sensors 118, the power conditioning module 102, the counter module 104, and/or the A/D module 106 may be governed and/or monitored by the processing module 100. The processing module 100 may convert the communications and/or power transfers to a compatible form (e.g., a digital signal, an analog signal, a wireless frequency, etc.). The processing module 100 may communicate the compatible form to an interface (e.g., a wired interface 124, a wireless interface 126, an analog interface 128).

The processing module 100 may communicate the compatible form (e.g., the digital signal, the analog signal) to an interface using a digital output module 108 and/or an analog output module 110. The digital output module 108 and/or the analog output module 110 may communicate with a wired interface 124, a wireless interface 126, and/or an analog interface 128.

The wired interface may be coupleable using at least one of an analog 0-5 VDC standard, an analog 4-20 mA standard, an analog mV/V standard, a serial UART standard, an I2C standard, an SPI standard, and/or any other standard known to one of ordinary skill in the art. The compatible form (e.g., the digital signal, the analog signal, etc.) may be communicated to the wired interface using at least one of the approximately 0 to 20 millivolt signal, the approximately 0 to 5 Volt signal, the 4-20 mA signal, a frequency based output, and the digital signal.

Figure 3:
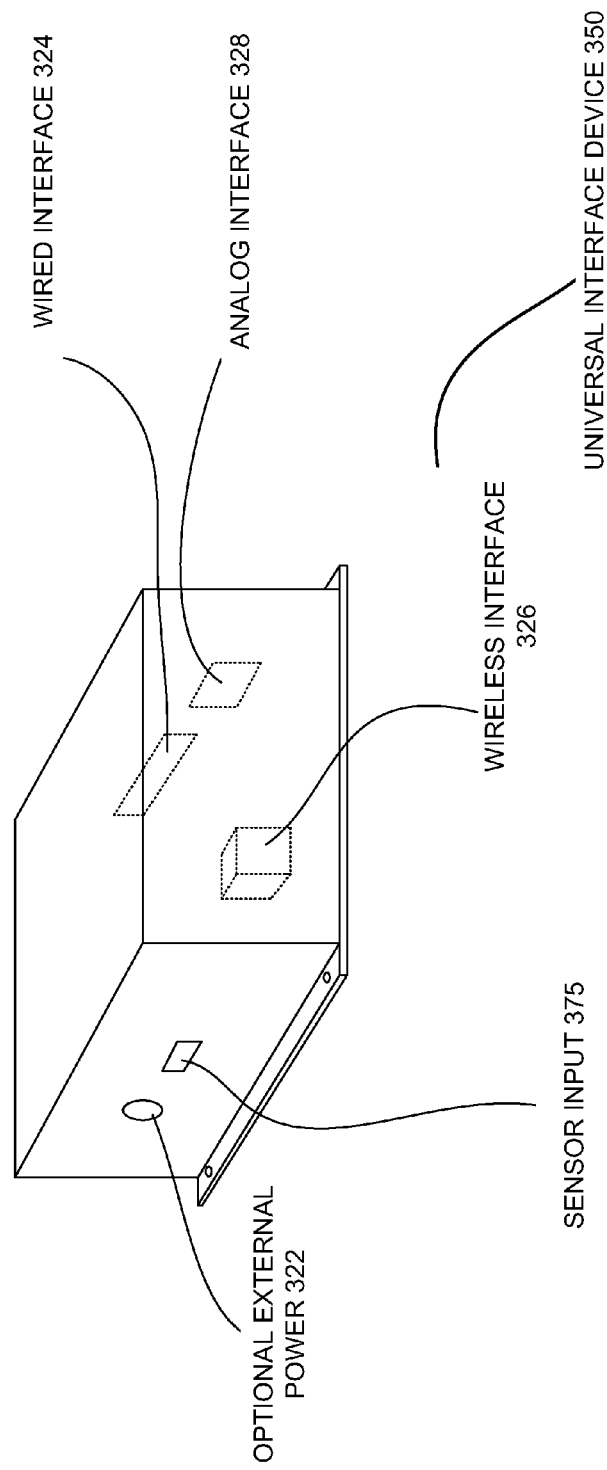
FIG. 3 illustrates an exemplary universal interface apparatus, according to one or more embodiments.

FIG. 3 illustrates an embodiment of the universal interface compatibility of a sensor that includes a universal interface device 350, a sensor input 375, an optional external power 322, a wired interface 324, a wireless interface 326, and an analog interface 328. A sensor (e.g., a load cell, a strain gauge, a temperature sensor) may be coupled to the universal interface device using the sensor input 375, which may receive an analog input, a digital input, a frequency signal, and/or any other sensor input. The sensor input 375 may receive a 0-20 millivolt input, a 0-5 volt input, a 4-20 mA input, and a variety of other electrical sensor inputs varying in voltage and/or current. The universal interface device 350 may communicate a sensor output converted to a compatible form to one or more interfaces (e.g., the wired interface 324, the wireless interface 326, the analog interface 328, etc.)

Figure 4:
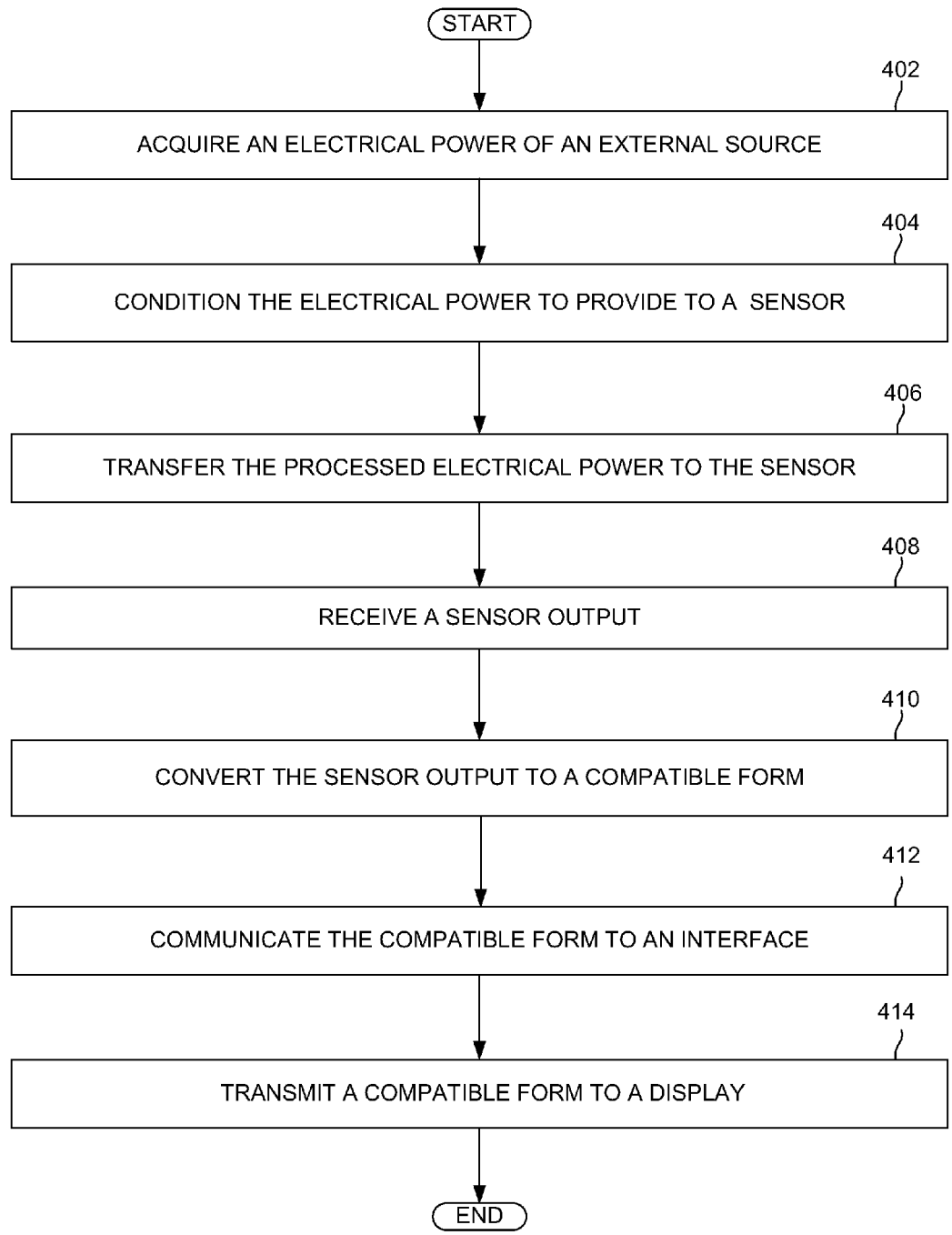
FIG. 4 is a process flow diagram depicting an exemplary method, according to one or more embodiments.

FIG. 4 is a process flow depicting a method of obtaining an optional external power, conditioning the electrical power, transferring the power to a sensor, obtaining a sensor output, and converting the sensor output to a compatible form, according to one embodiment. In operation 402, an electrical power of an external source may be acquired. The electrical power may be alternating current and/or direct current. The external source may be a battery, a USB power, a wall charger, and/or any other electrical power source.

In operation 404, the electrical power may be conditioned (e.g., filtered, rectified, smoothed, etc.) to be provided to a sensor (e.g., the strain gauge, the load cell, etc.). In operation 406, the processed electrical power may be transferred to the sensor. In operation 408, a sensor output (e.g., a millivolt signal, a 0-5 volt signal, a digital signal, a 4-20 mA signal, a frequency signal, etc.) may be received. In operation 410, the sensor output may be converted to a compatible form (e.g., a digital signal, a wireless transmission, etc.).

In operation 412, the compatible form may be communicated to an interface (e.g., the wired interface 124 and/or 324, the wireless interface 126 and/or 326, the analog interface 128 and/or 328, etc.). In operation 414, the compatible form may be transmitted to a display (e.g., the display 120).

Figure 5:
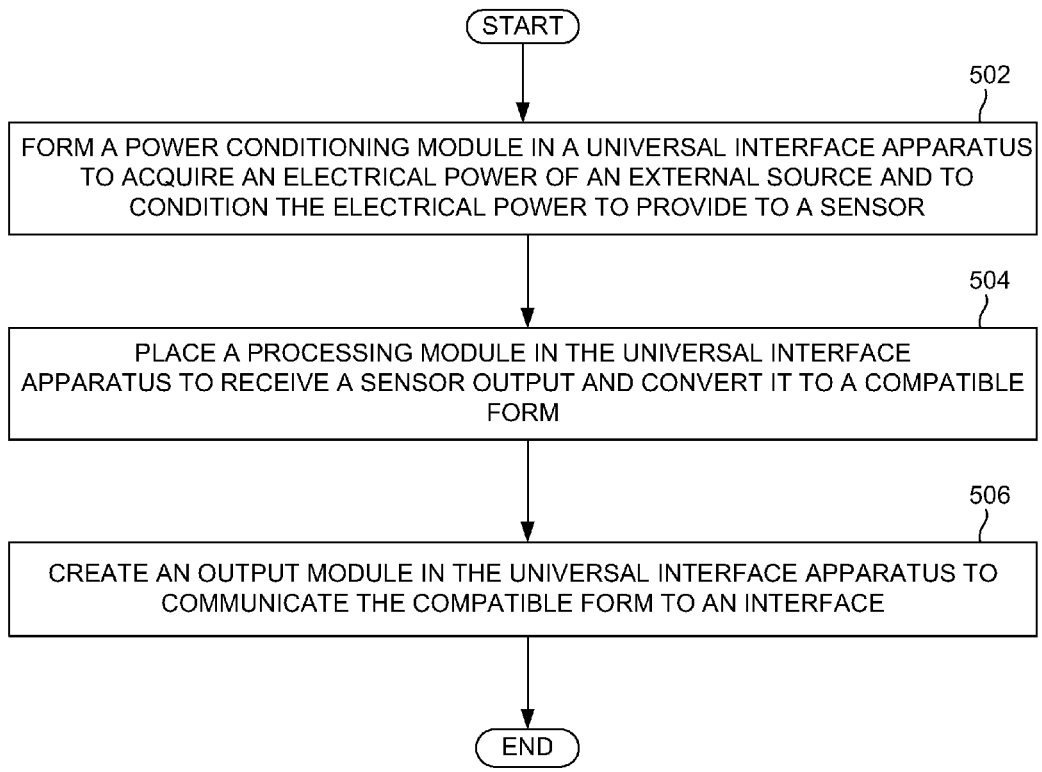
FIG. 5 is another process flow diagram depicting an additional exemplary method, according to one or more embodiments.

FIG. 5 is a process flow depicting a method of communicating a compatible form of a sensor signal to an interface. In operation 502, the operation comprises forming a power conditioning module in a universal interface apparatus to acquire an electrical power of an external source and to condition the electrical power to provide to a sensor. In operation 504, the operation comprises placing a processing module in the universal interface apparatus to receive a sensor output and convert it to a compatible form. Finally, in operation 506, the operation involves creating an output module in the universal interface apparatus to communicate the compatible form to an interface.

In particular, the processing module 100, the power conditioning module 102, the counter module 104, the A/D module 106, the digital output module 108, the analog output module 110, the mV/V sensor 112, the frequency based sensor 114, the 0-5 VDC sensor 116, the sensors 118, the optional external power 122 and/or 322, the wired interface 124 and/or 324, the wireless interface 126 and/or 326, the analog interface 128 and/or 328, universal interface device 150 and/or 350, the conditioning processor 200, the power management module 202, the power detector 204, the power rectifier 206, the error check module 208, and/or the sensor input 375 of FIGS. 1-4 may be enabled using software and/or using transistors, logic gates, and electrical circuits (e.g., application specific integrated ASIC circuitry) such as a power circuit, an energy storage circuit, a motion circuit, a notification circuit, a signal processing circuit, a rectifier circuit, a power sensing circuit, a restrictor circuit, an external power circuit, and other circuits using one or more of the technologies described herein.

Figure 6A:
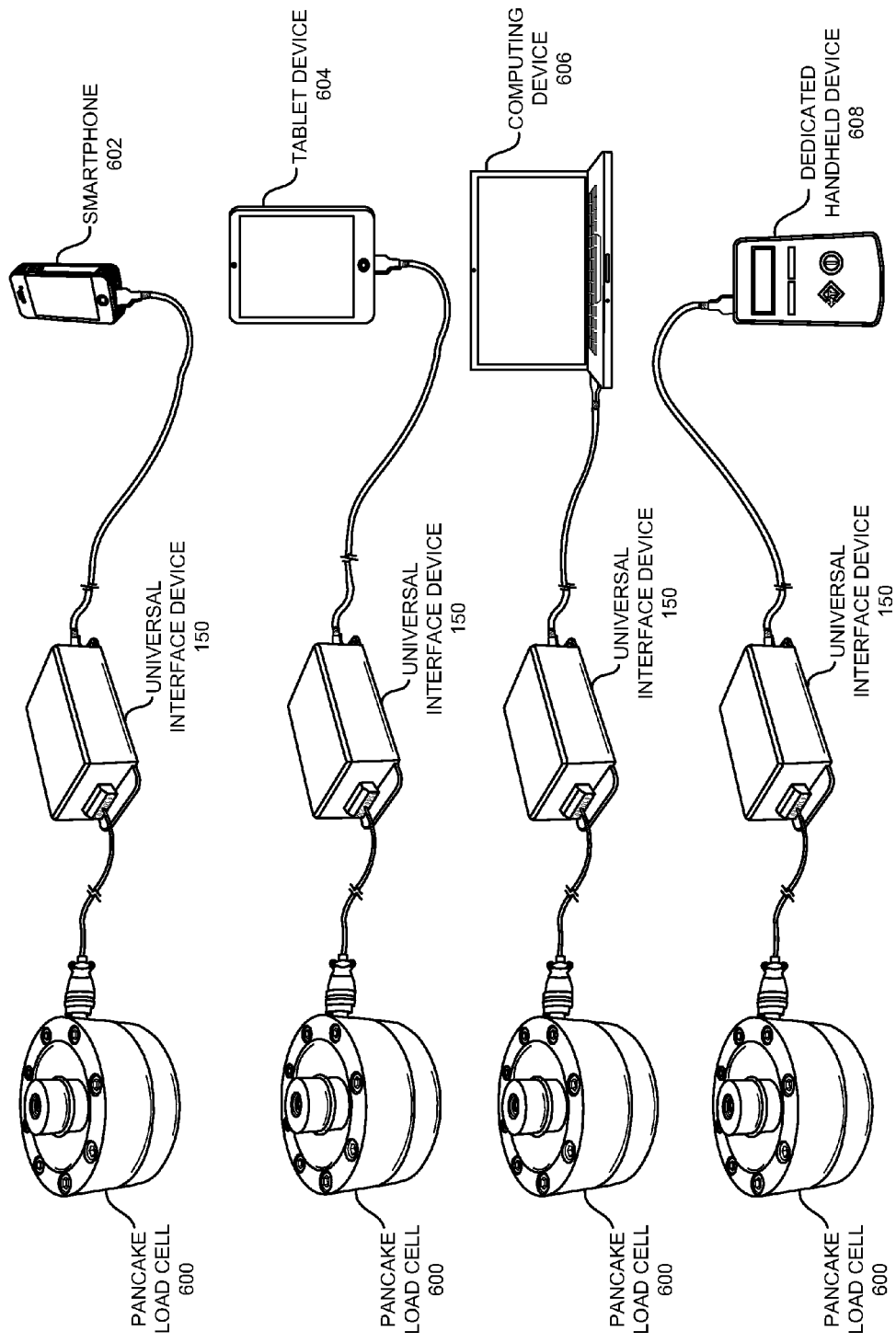
FIGS. 6A-6C depict a system comprising a type of force sensor and the universal interface, according to one or more embodiments.
Figure 6B:
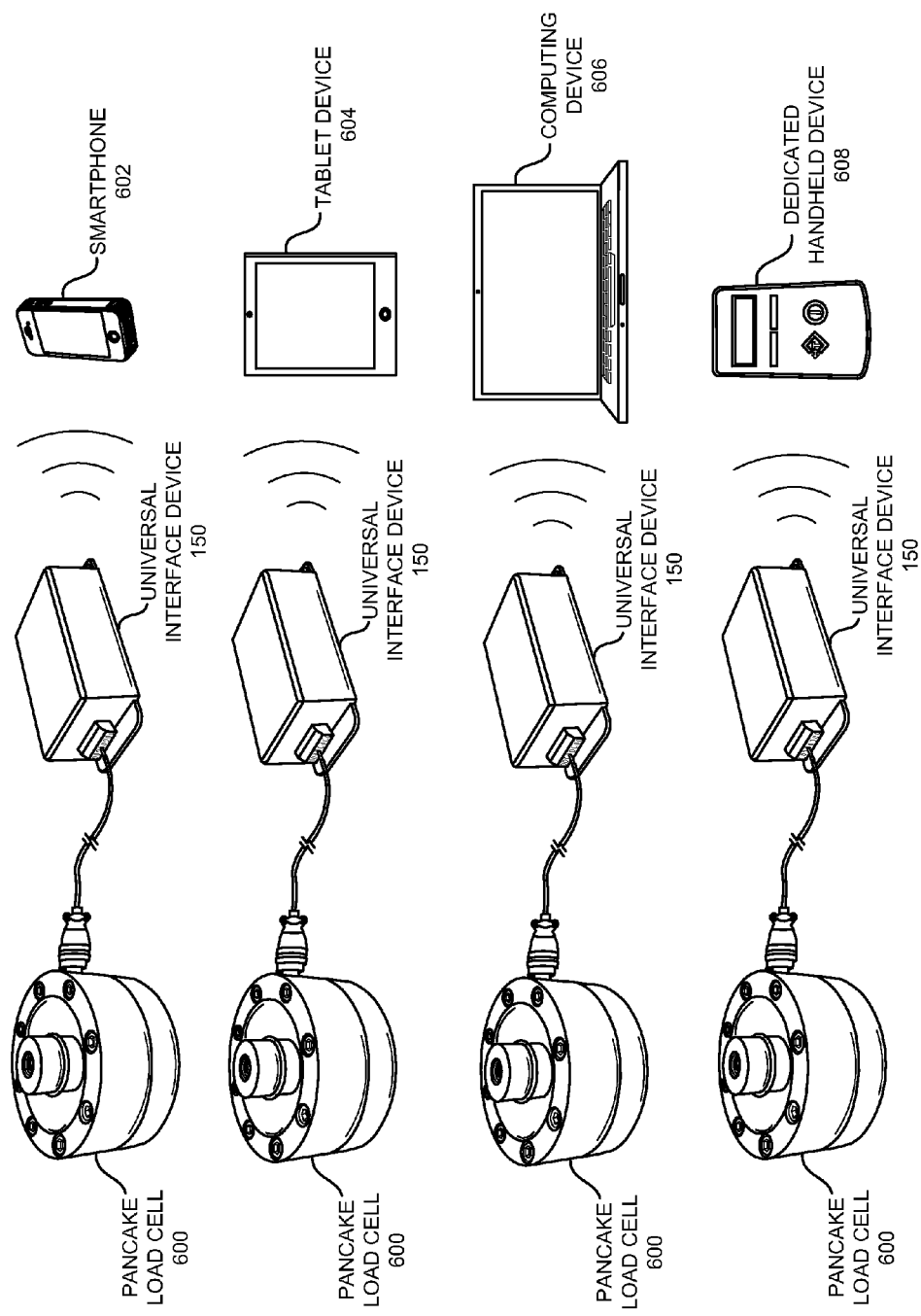
Figure 6C:
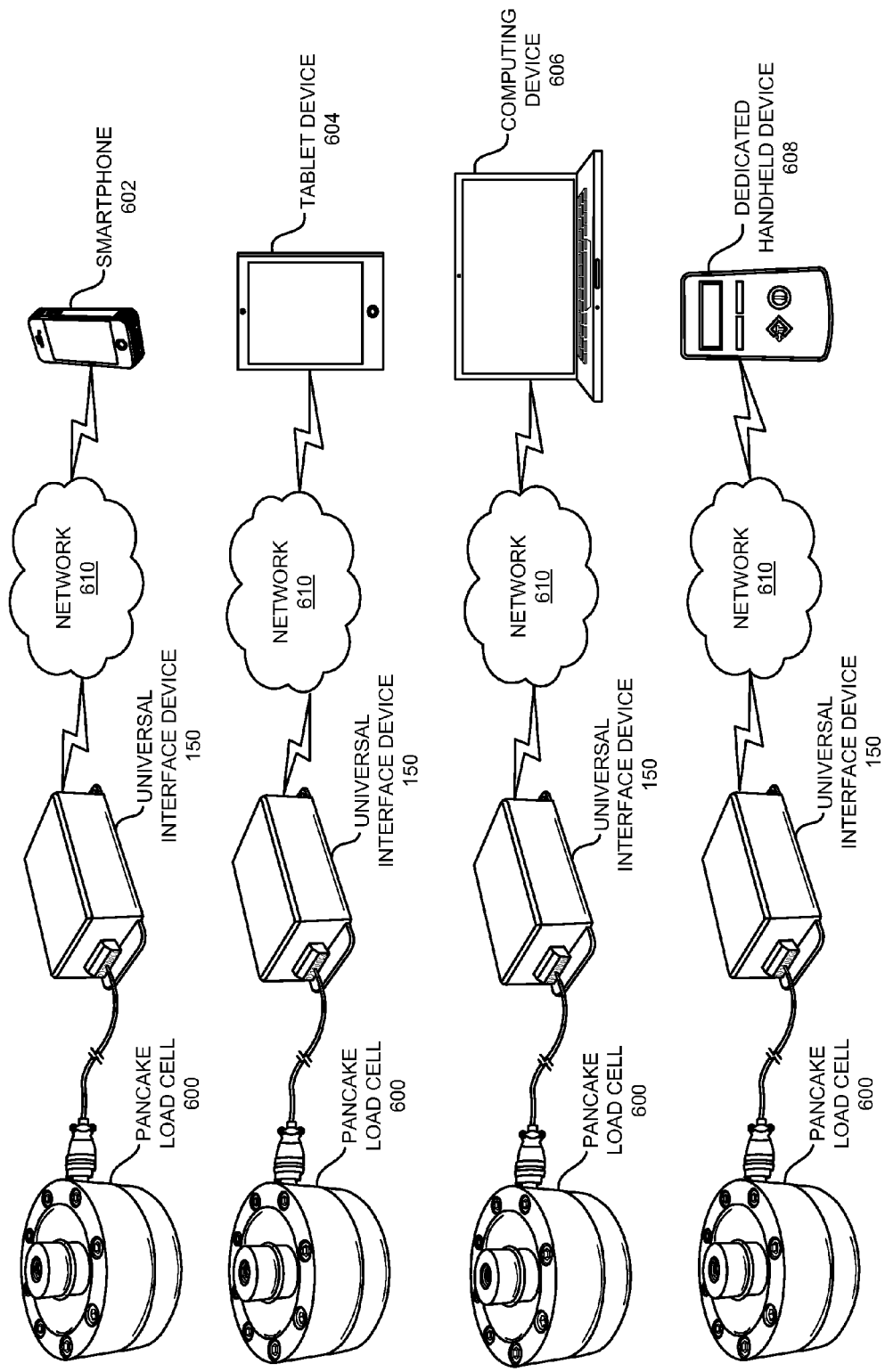

FIGS. 6A-6C depict a system comprising a pancake load cell 600 and the universal interface device 150, according to one or more embodiments. In one embodiment depicted in FIG. 6A, the pancake load cell 600 may be coupled to the universal interface device 150 through a wired connection.

The wired connection may be based on an analog 0-5 VDC standard, an analog 4-20 mA standard, an analog mV/V standard, a serial UART standard, an I2C standard, an SPI standard, a USB standard or any other standard known to one of ordinary skill in the art. In this embodiment, the universal interface device 150 may be coupled to a smartphone 602 through a wired connection. In another embodiment depicted in FIG. 6A, the universal interface device 150 may be coupled to a tablet device 604 through a wired connection. In yet another embodiment depicted in FIG. 6A, the universal interface device 150 may be coupled to a computing device 606 through a wired connection. In a further embodiment depicted in FIG. 6A, the universal interface device 150 may be coupled to a dedicated handheld device 608 through a wired connection. The pancake load cell 600 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 6B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 6C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the pancake load cell 600 may be any force sensor designed for heavy duty industrial weighing and testing applications. In another embodiment, the pancake load cell 600 may be any force sensor that meets either International Organization of Legal Metrology (OIML) or National Institute of Standards and Technology Handbook (HB) 44 Class III Standards. In one embodiment, the pancake load cell 600 may be made of high grade alloy steel. In one or more embodiments, the pancake load cell 600 may be used to calibrate force applied by pneumatic and hydraulic presses. The pancake load cell 600 may be a load cell that is designed for compression applications and/or tension applications. The available capacities of the load cell may be 50 lb., 500 lb., 5000 lb., 10,000 lb., 25,000 lb., 50,000 lb., or 100,000 lb. In one embodiment, the pancake load cell 600 may include a contact zone cavity formed in a ring like fashion around a periphery of a movable surface.

Figure 7C:
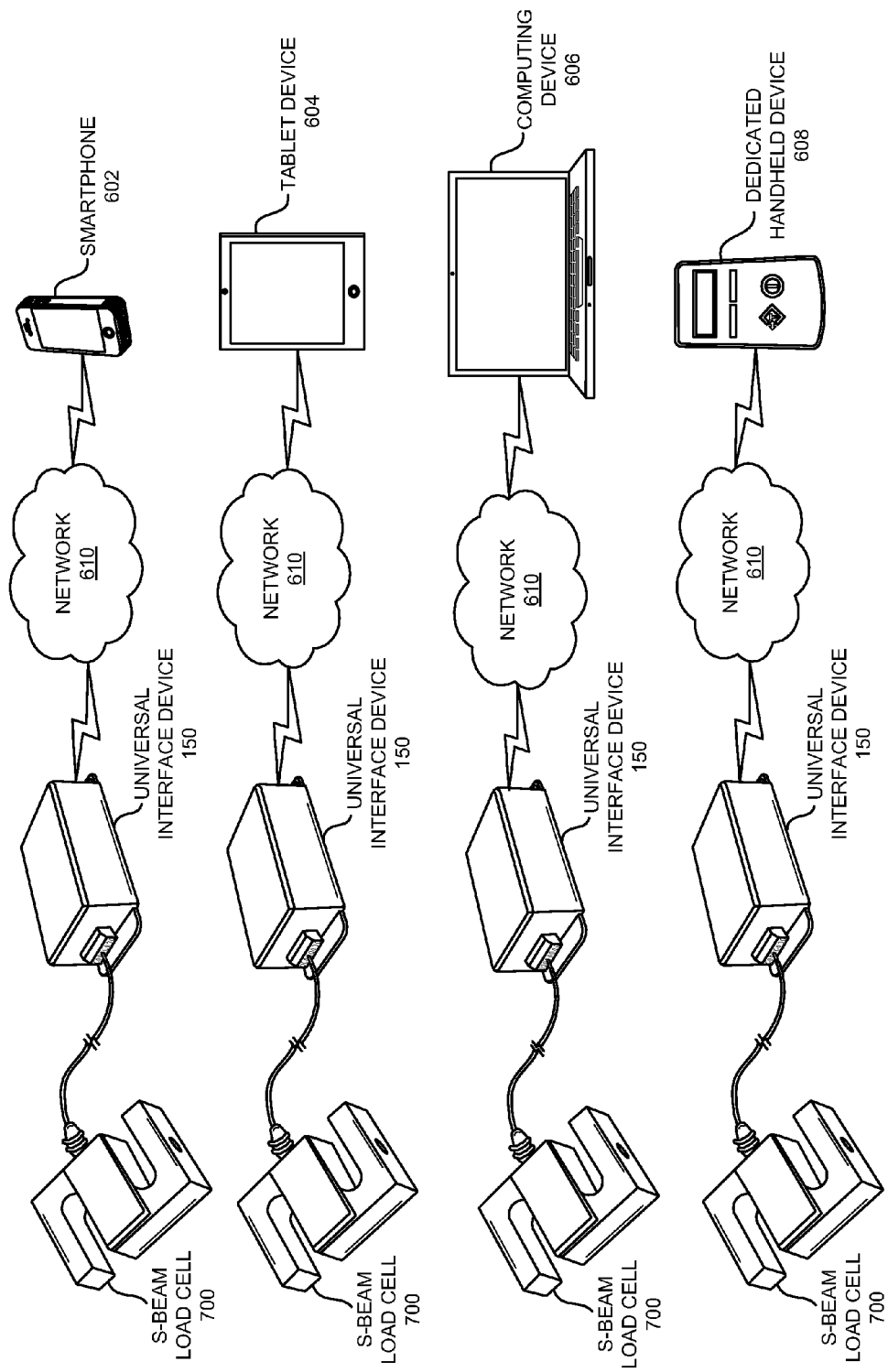

FIGS. 7A-7C depict a system comprising an S-beam load cell 700 and the universal interface 150, according to one or more embodiments. In one embodiment depicted in FIG. 7A, the S-beam load cell 700 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 7A, the universal interface device 150 may be coupled to a tablet device 604 through a wired connection. In yet another embodiment depicted in FIG. 7A, the universal interface device 150 may be coupled to a computing device 606 through a wired connection. In a further embodiment depicted in FIG. 7A, the universal interface device 150 may be coupled to a dedicated handheld device 608 through a wired connection. The S-beam load cell 700 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 7B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 7C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the S-beam load cell 700 may be any tension and/or compression force sensor designed for in-line testing applications not limited to wire, cable, cord or rope strength testing applications. In one embodiment, the S-beam load cell 700 may be attached from the threaded female holes on the ends of the S-beam load cell 700 to threaded rod-ends or eye bolts. In another embodiment, S-beam load cell 700 may be made of tool steel. In yet another embodiment, S-beam load cell 700 includes a flexible strain relief material. In one or more embodiments, the S-beam load cell 700 may be used for tank weighing, hopper weighing, or other push-pull kind of reliability testing applications. The S-beam load cell 700 may provide an off-center loading compensation. The available capacities of the S-beam load cell 700 may be a few ounces to hundreds of thousands of pounds. In one or more embodiments, the S-beam load cell 700 may be adapted for use in health kiosks.

Figure 8A:
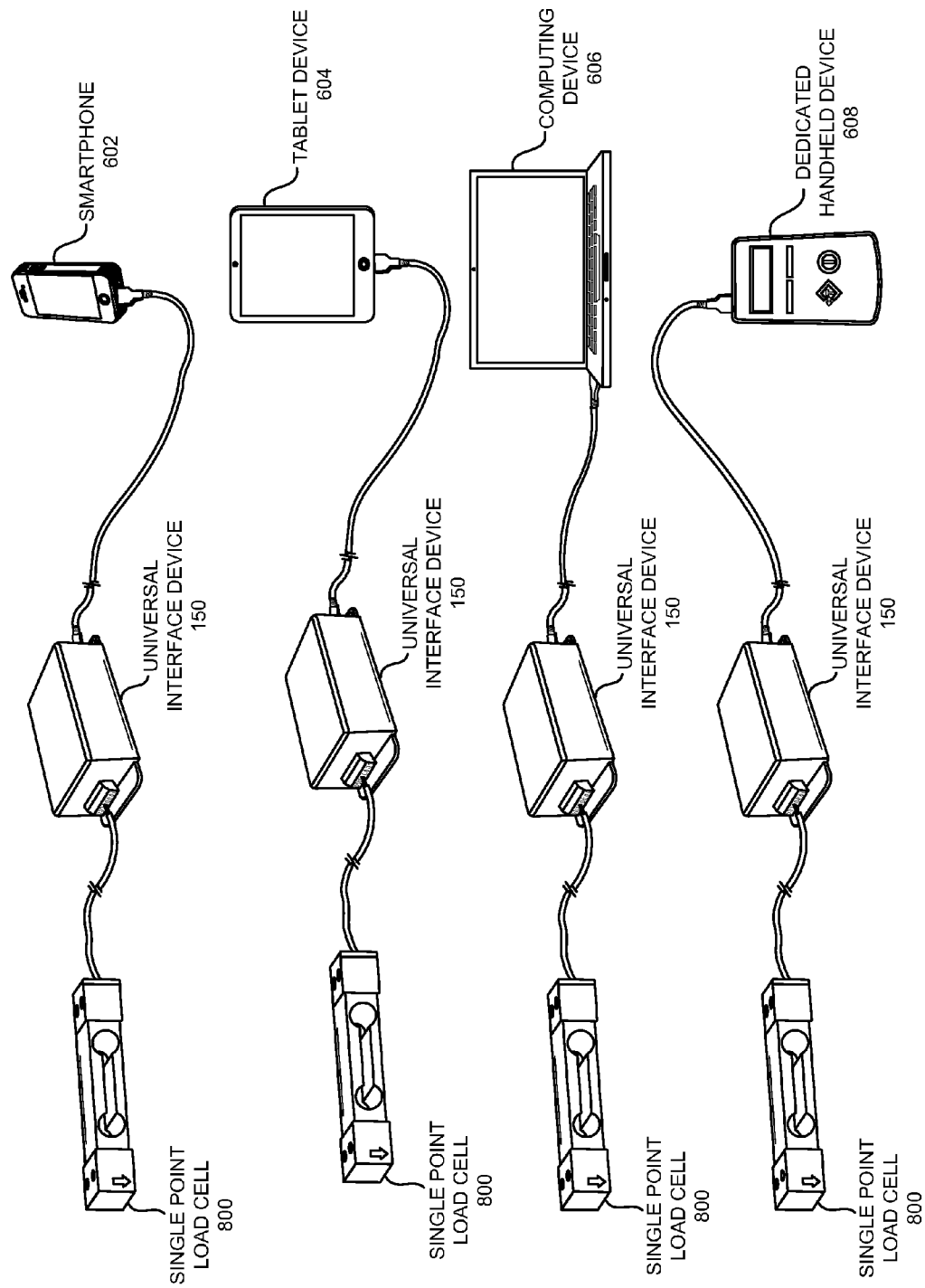
FIGS. 8A-8C depict a system comprising a type of force sensor and the universal interface, according to one or more embodiments.
Figure 8B:
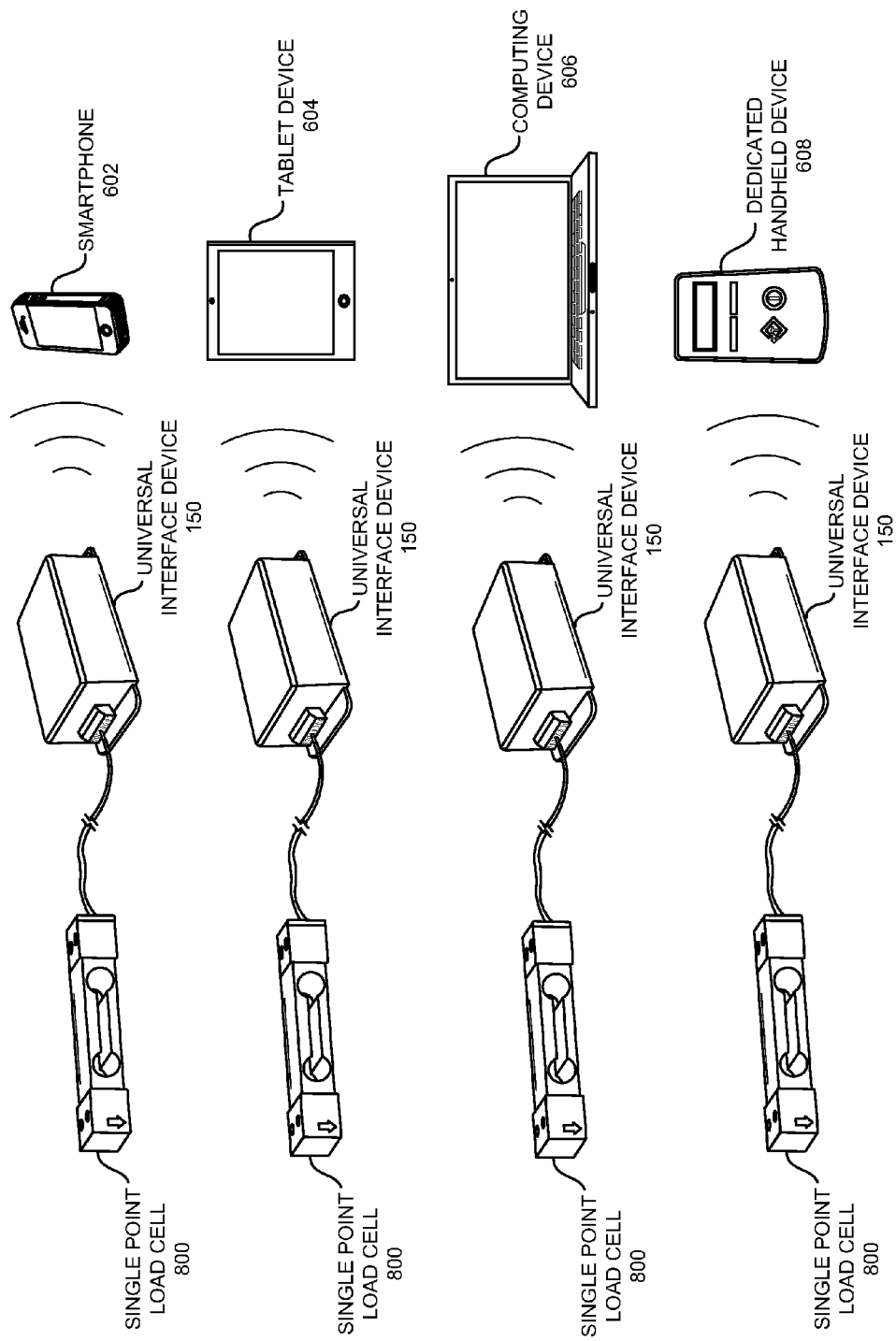
Figure 8C:
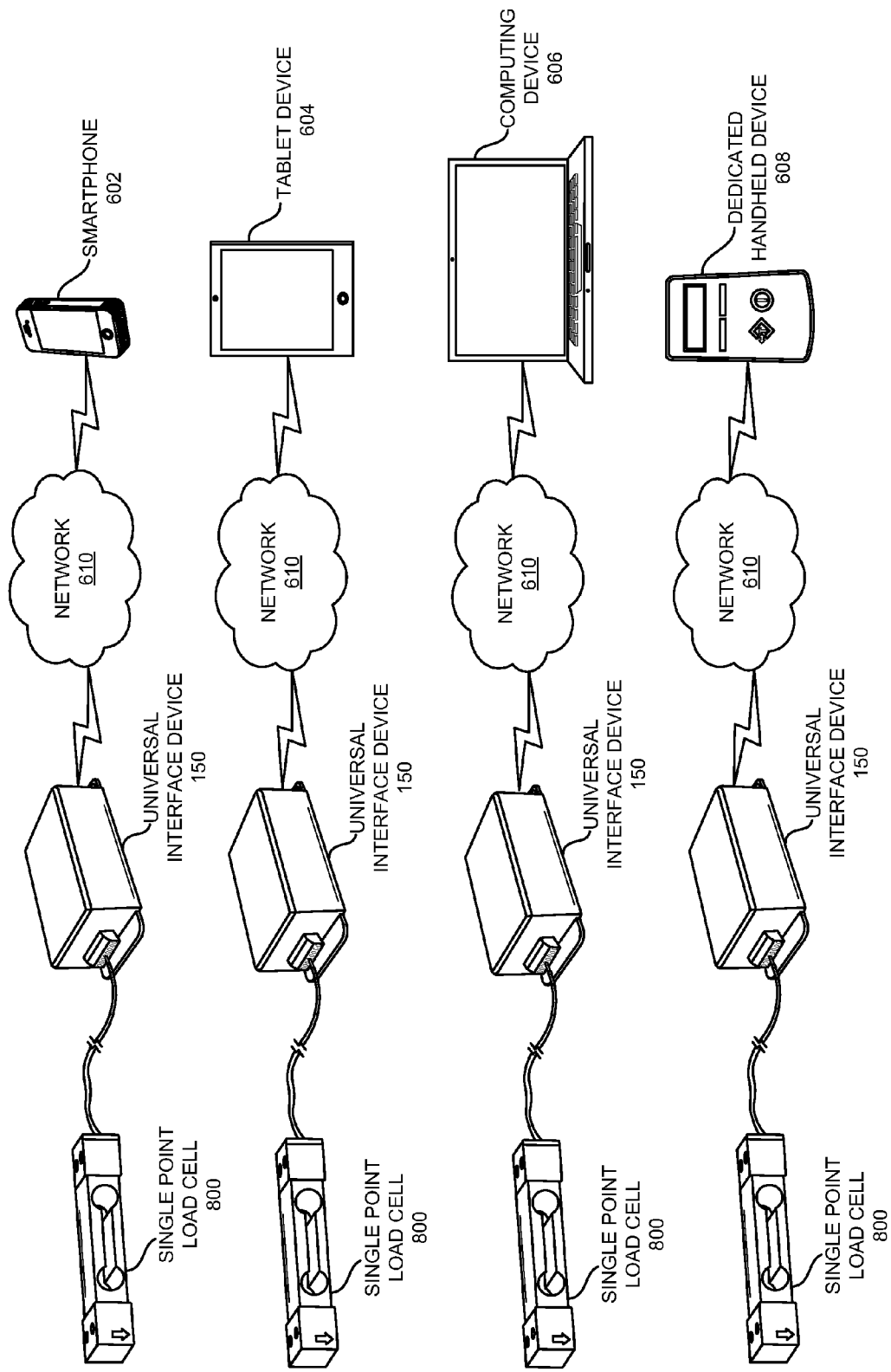

FIGS. 8A-8C depict a system comprising a single point load cell 800 and the universal interface 150, according to one or more embodiments. In one embodiment depicted in FIG. 8A, the single point load cell 800 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 8A, the universal interface device 150 may be coupled to a tablet device 604 through a wired connection. In yet another embodiment depicted in FIG. 8A, the universal interface device 150 may be coupled to a computing device 606 through a wired connection. In a further embodiment depicted in FIG. 8A, the universal interface device 150 may be coupled to a dedicated handheld device 608 through a wired connection. The single point load cell 800 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 8B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 8C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

Figure 8D:
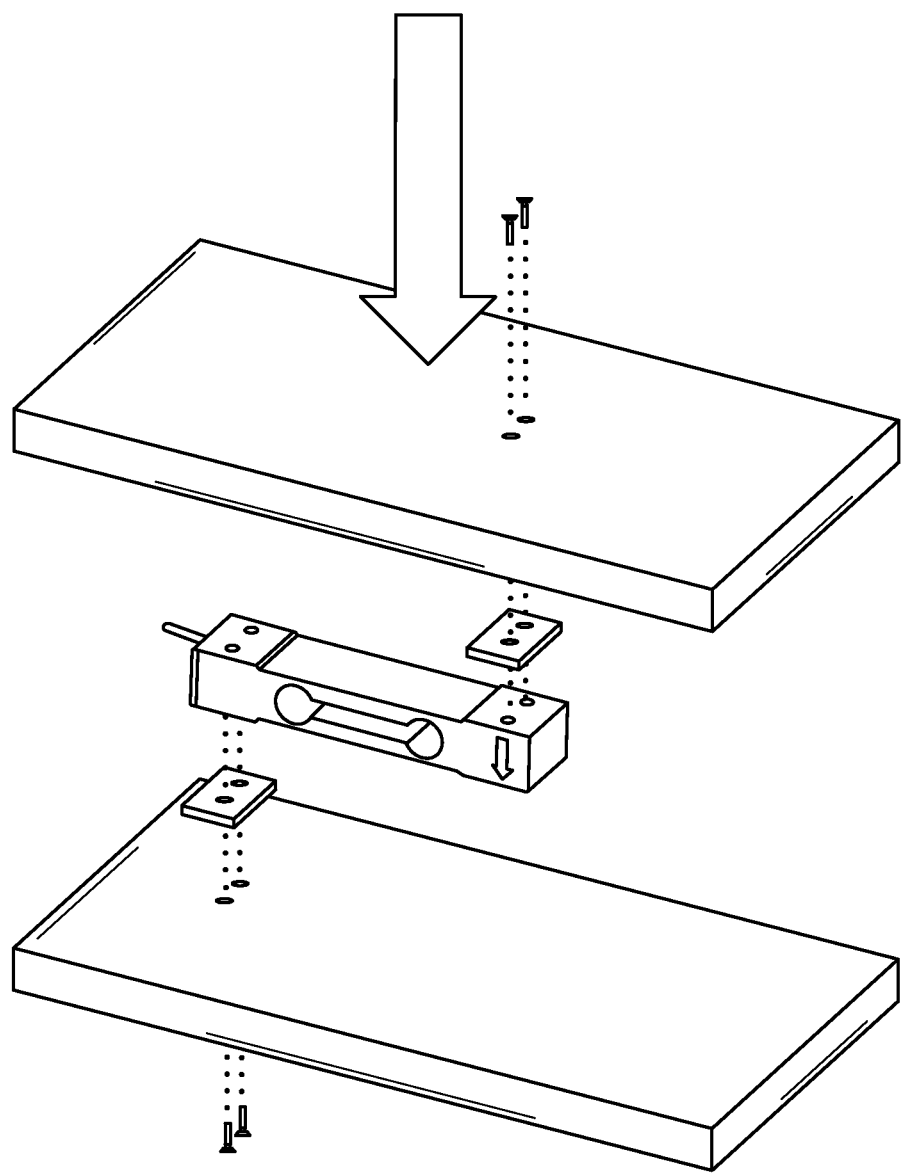
FIG. 8D depicts an assembly of an exemplary force sensor, according to one or more embodiments.

As depicted in FIG. 8D, the single point load cell 800 may be attached to a load bearing surface on either or both sides of the single point load cell 800.

In one or more embodiments, the single point load cell 800 may be any force sensor designed for weighing applications (e.g. bench scales, floor scales, medical scales, grocery scales, postal scales, etc.). In another embodiment, the single point load cell 800 may be any single point force sensor that is NTEP (National Type Evaluation Program) or International Organization of Legal Metrology (OIML) approved. In one embodiment, the single point load cell 800 may be used to construct a USB scale when combined with a load cell interface. In one or more embodiments, the single point load cell 800 may provide an off-center loading compensation. The available capacities of the single point load cell 800 may be few ounces to hundreds of thousands of pounds. In one or more embodiments, the single point load cell 800 may be adapted for use in health kiosks for remote delivery of health care through the Internet or cellular data connection.

Figure 9A:
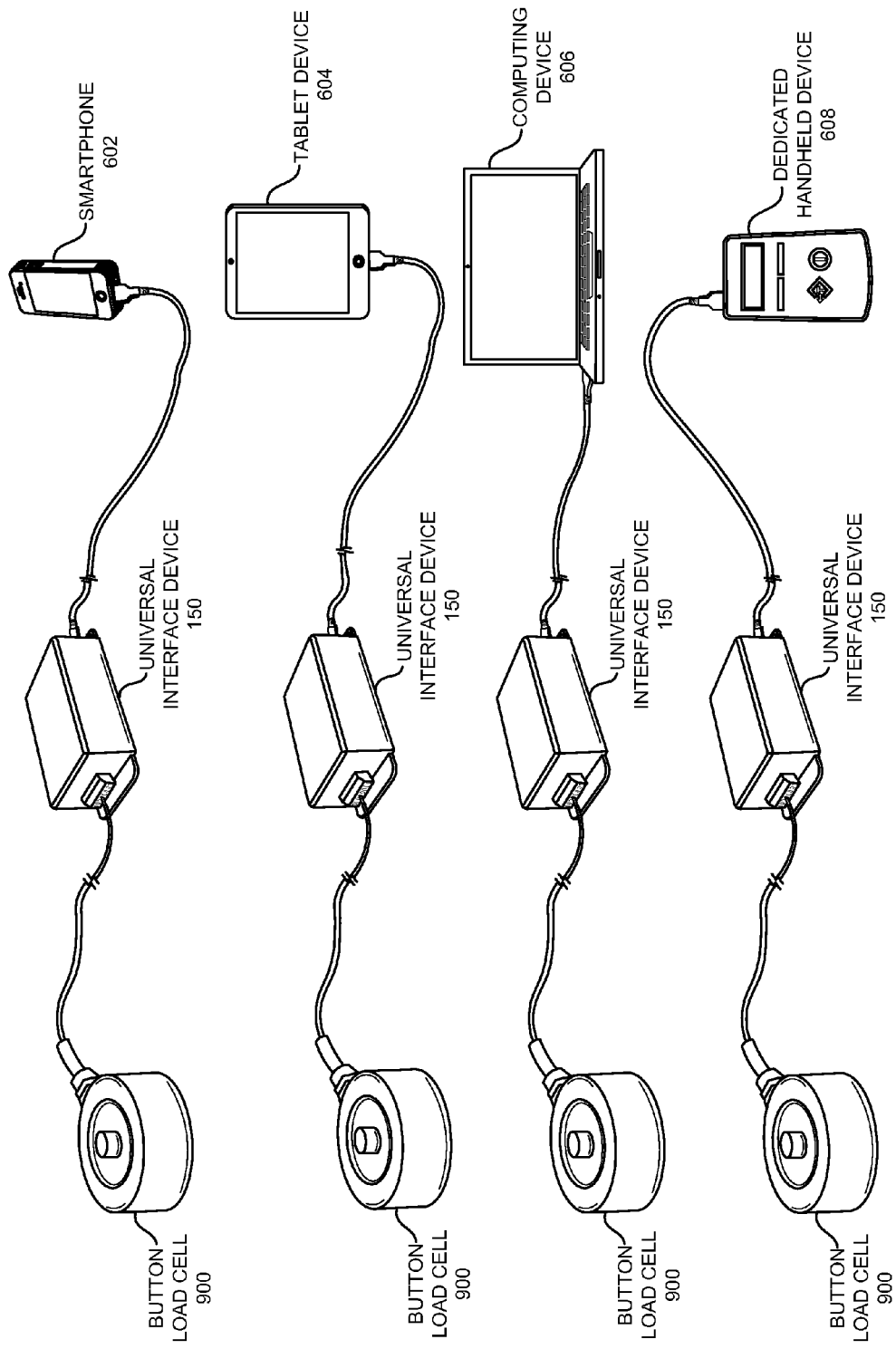
FIGS. 9A-9C depict a system comprising a type of force sensor and the universal interface, according to one or more embodiments.
Figure 9B:
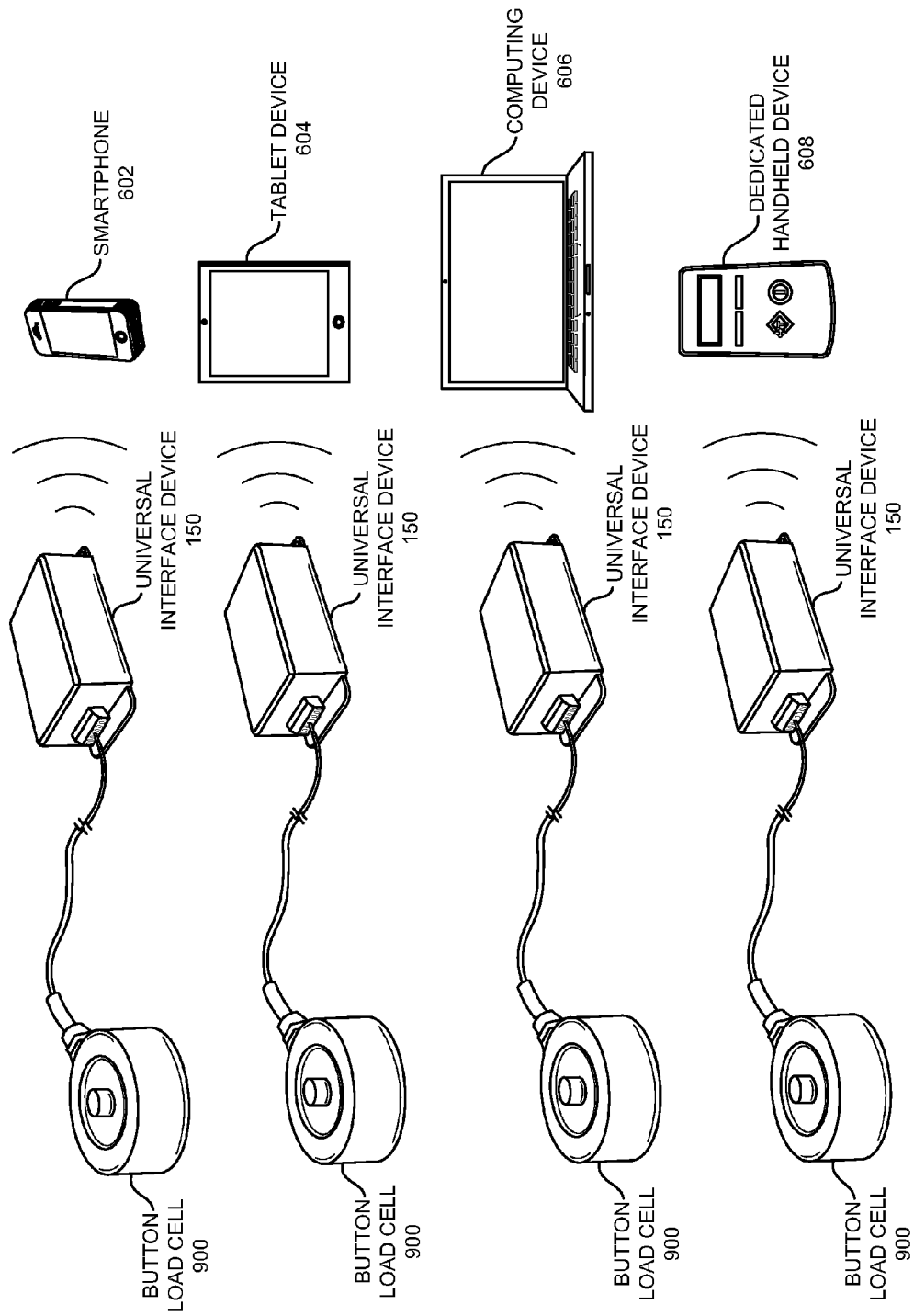
Figure 9C:
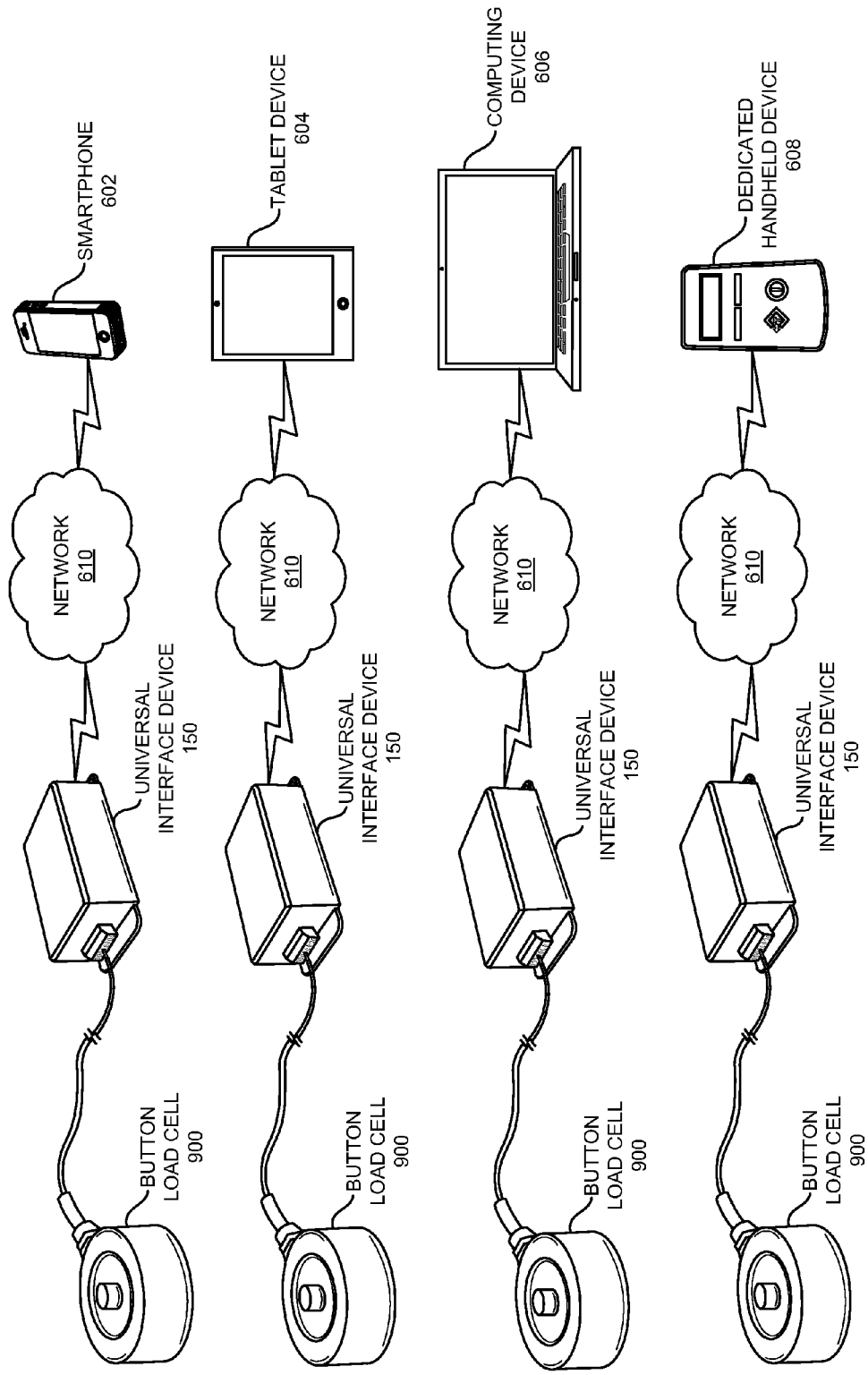

FIGS. 9A-9C depict a system comprising a button load cell 900 and the universal interface 150, according to one or more embodiments. In one embodiment depicted in FIG. 9A, the button load cell 900 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 9A, the universal interface device 150 may be coupled to a tablet device 604 through a wired connection. In yet another embodiment depicted in FIG. 9A, the universal interface device 150 may be coupled to a computing device 606 through a wired connection. In a further embodiment depicted in FIG. 9A, the universal interface device 150 may be coupled to a dedicated handheld device 608 through a wired connection. The button load cell 900 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 9B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 9C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the button load cell 900 may be any force sensor designed for compression and/or load bearing measurement applications. In another embodiment, the button load cell 900 may have a built-in raised surface with curvature for applying loads. In one embodiment, the button load cell 900 may have threaded mounting holes on the base underneath the sensor. The available capacities of the button load cell 900 may be few ounces to hundreds of thousands of pounds.

Figure 10A:
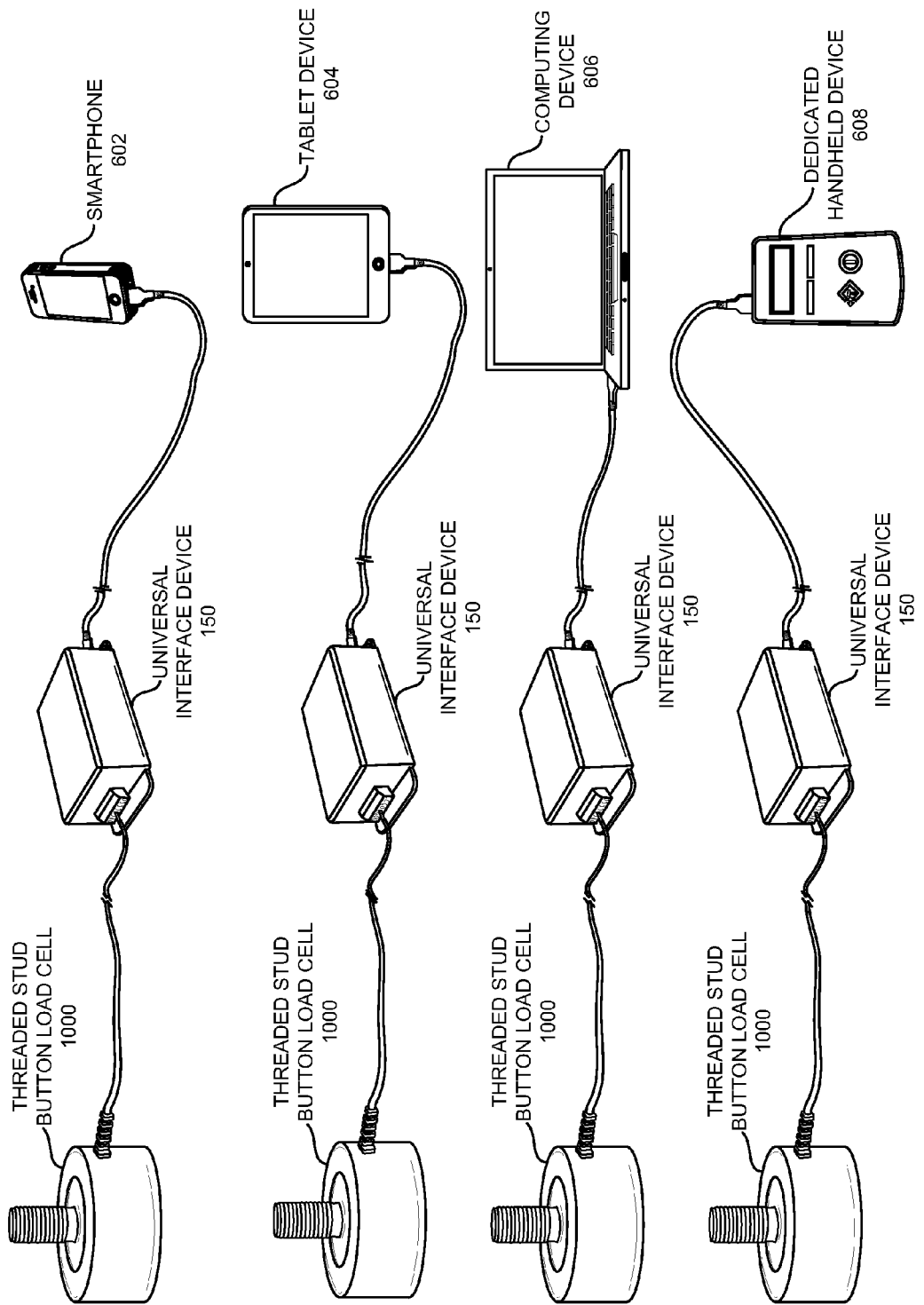
FIGS. 10A-10C depict a system comprising a type of force sensor and the universal interface, according to one or more embodiments.
Figure 10B:
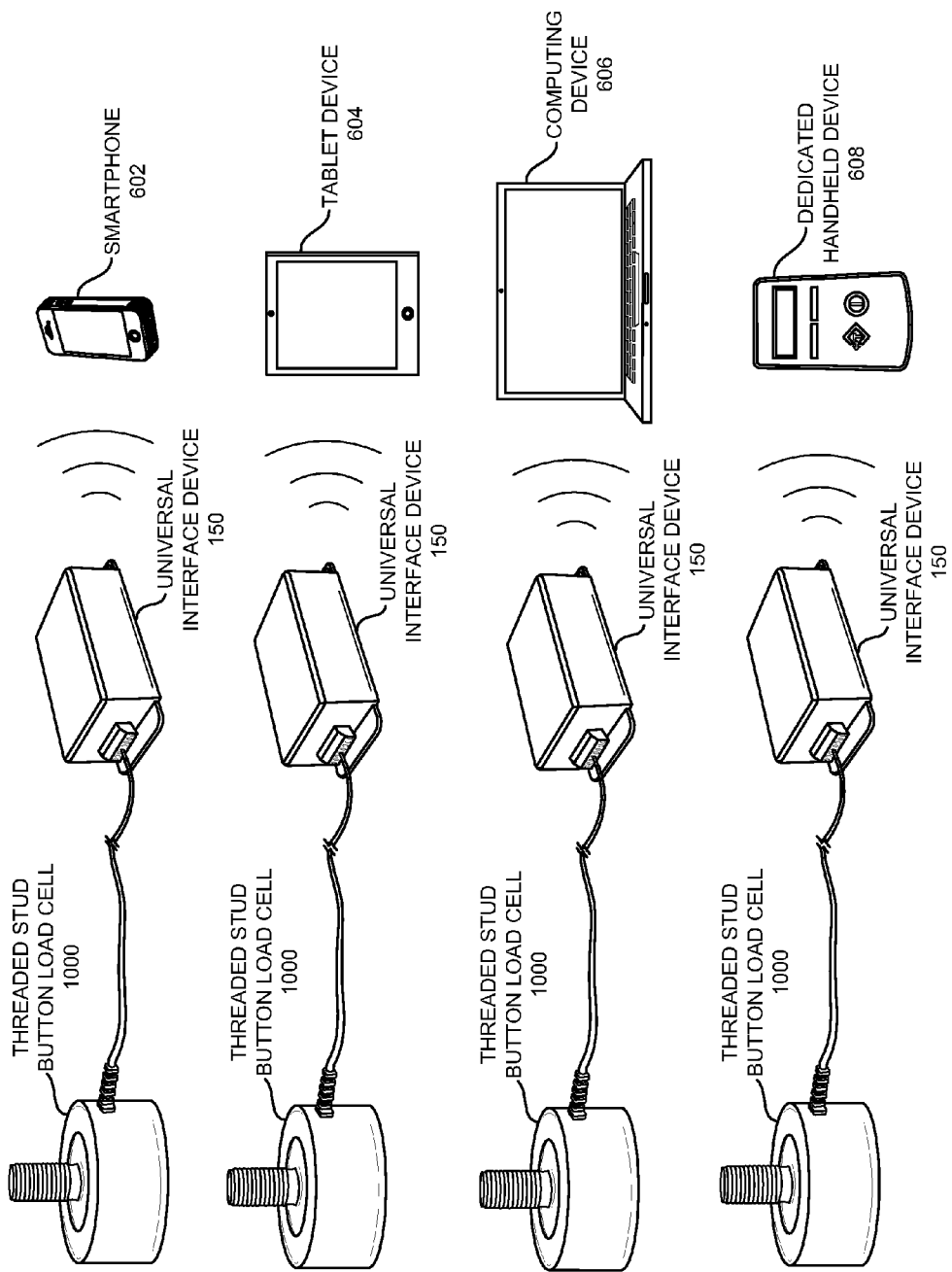
Figure 10C:
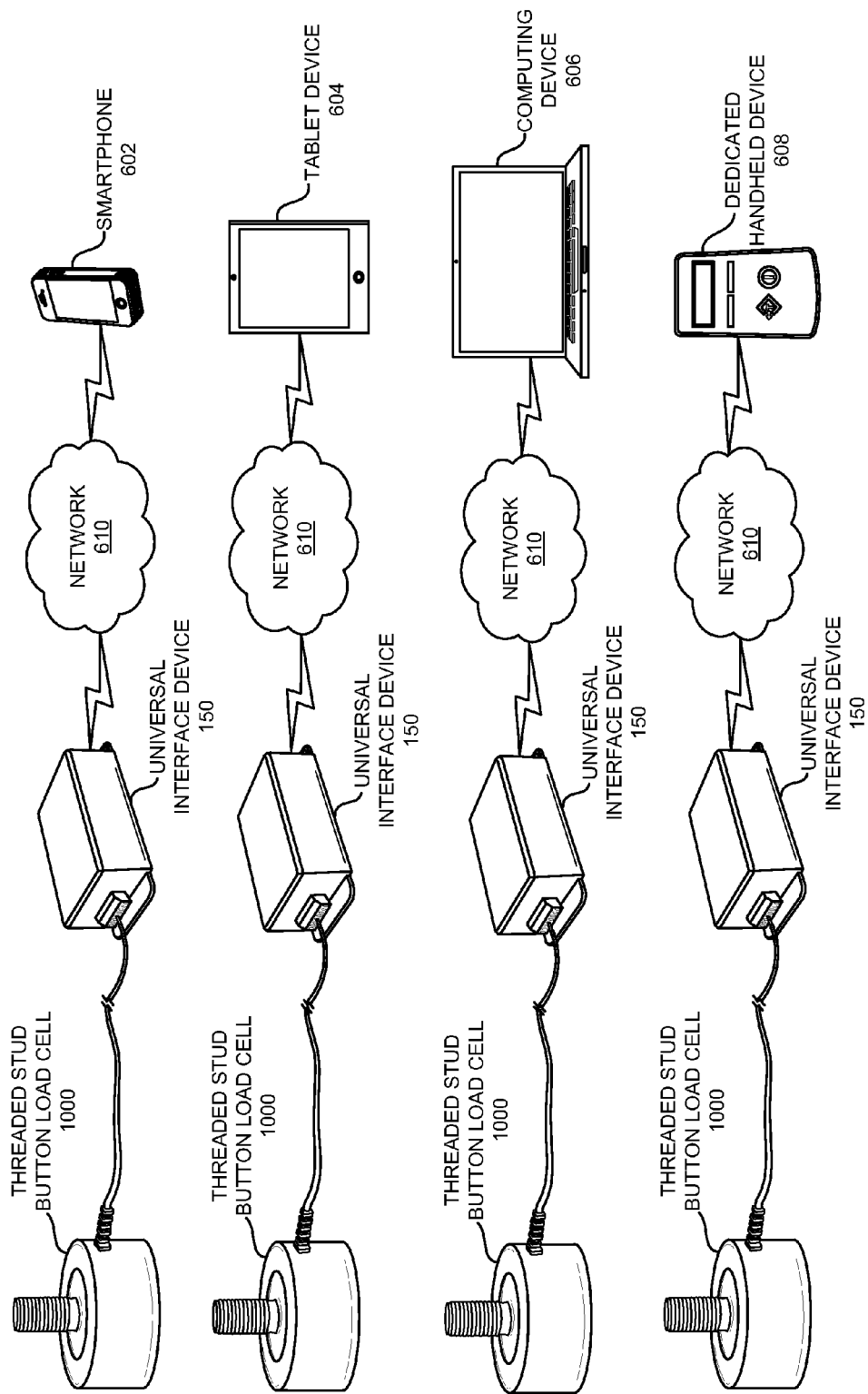

FIGS. 10A-10C depict a system comprising a threaded stud button load cell 1000 and the universal interface 150, according to one or more embodiments. In one embodiment depicted in FIG. 10A, the threaded stud button load cell 1000 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, USB standard or any other standard known to one of ordinary skill in the art. In this embodiment, the universal interface device 150 may be coupled to a smartphone 602 through a wired connection. In another embodiment depicted in FIG. 10A, the universal interface device 150 may be coupled to a tablet device 604 through a wired connection. In yet another embodiment depicted in FIG. 10A, the universal interface device 150 may be coupled to a computing device 606 through a wired connection. In a further embodiment depicted in FIG. 10A, the universal interface device 150 may be coupled to a dedicated handheld device 608 through a wired connection. The threaded stud button load cell 1000 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 10B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 10C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the threaded stud button load cell 1000 may be any force sensor designed for tension and/or compression measurement applications. In another embodiment, the threaded stud button load cell 1000 may comprise a male threaded stud and may be used to create a leg for a scale using a female foot. Four such pairs may be used to build a large area floor scale or build a weigh-in motion check scale for a conveyor belt, according to one embodiment. In one or more embodiments, the threaded stud button load cell 1000 may be made of tool steel. The threaded stud button load cell 1000 may have threaded mounting holes and/or studs on both sides. The available capacities of the threaded stud button load cell 1000 may be 110 lb., 220 lb., 440 lb., or 1,100 lb. In one or more embodiments, the threaded stud button load cell 1000 may be adapted for use in health kiosks.

Figure 11B:
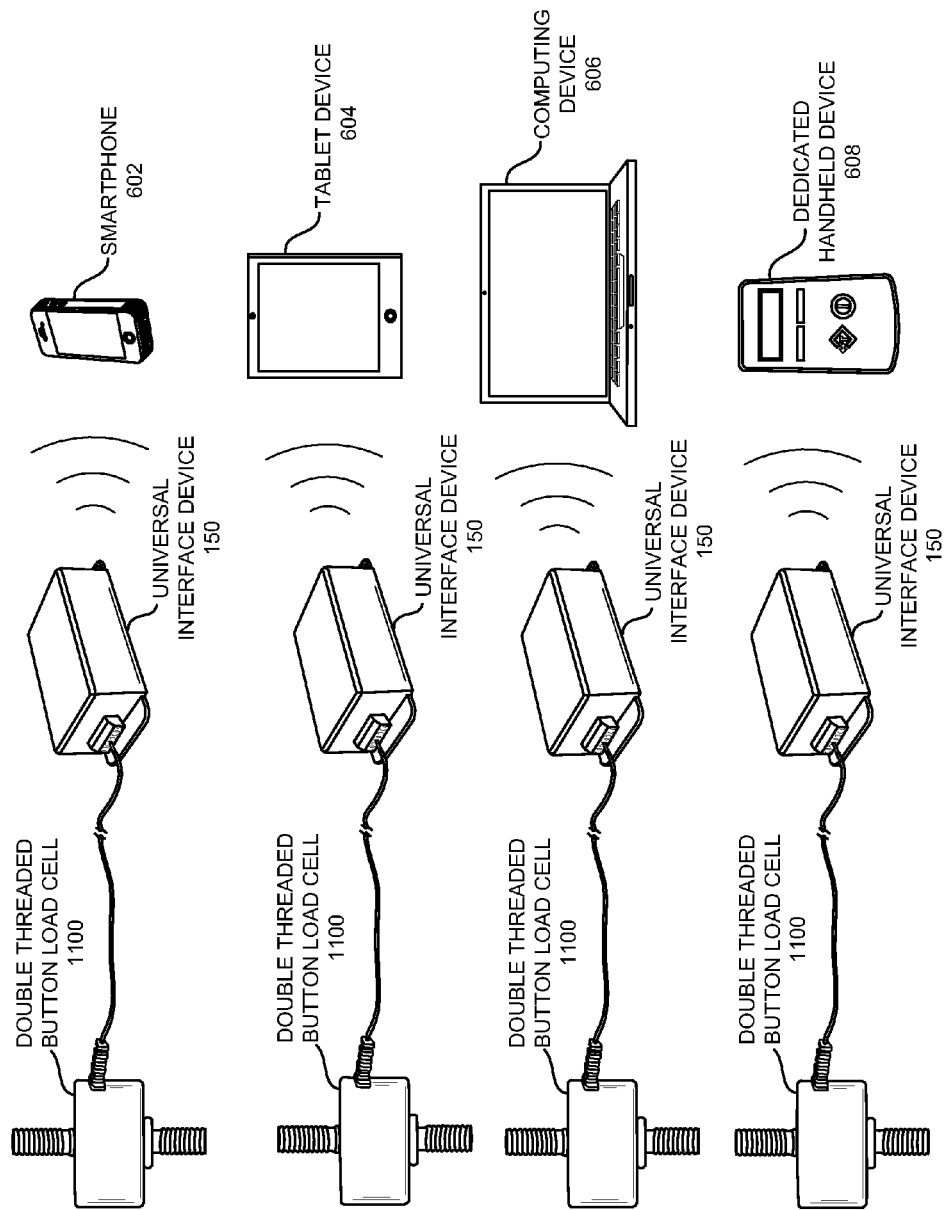
Figure 11C:
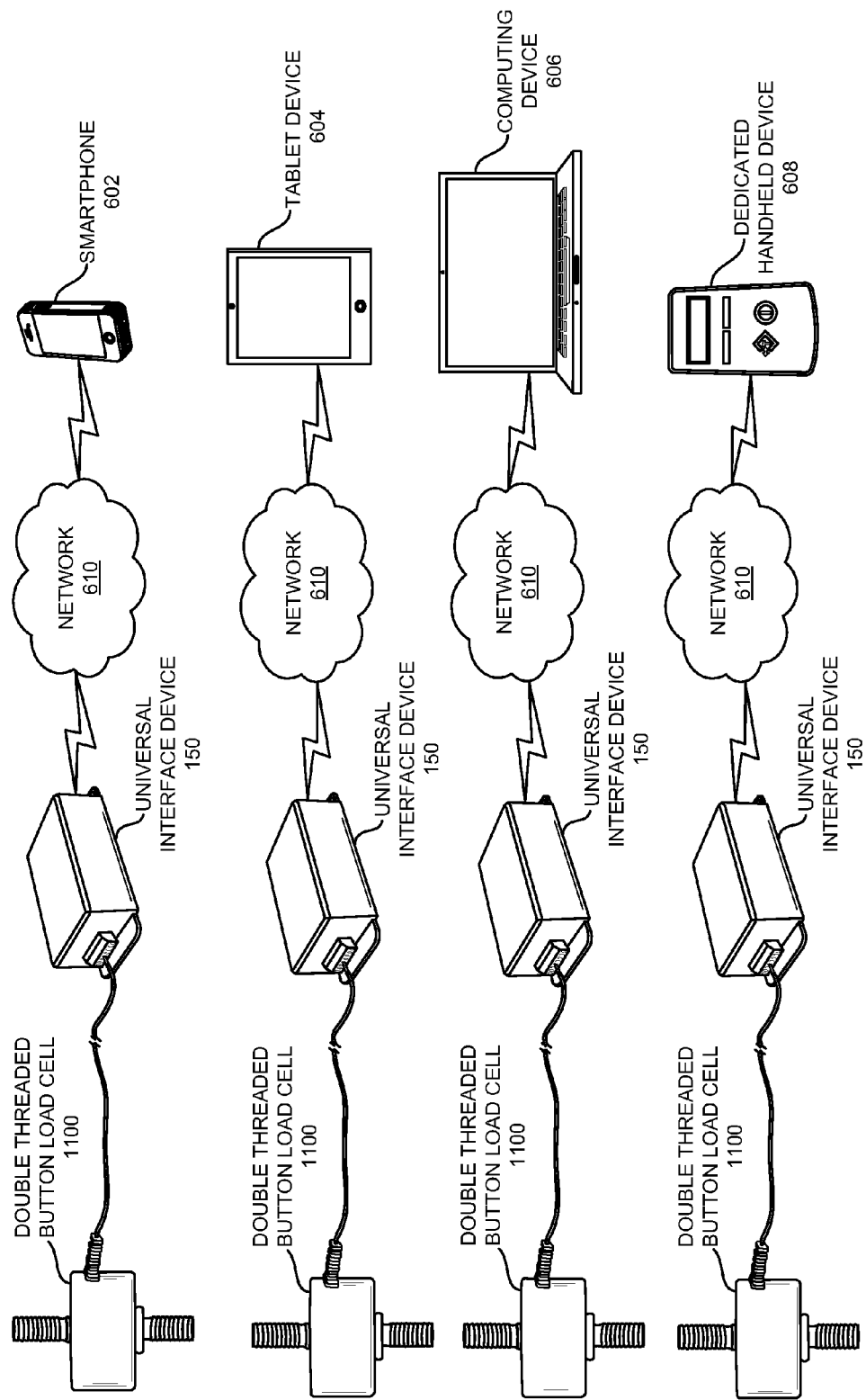

FIGS. 11A-11C depict a system comprising a double threaded button load cell 1100 and the universal interface 150, according to one or more embodiments. In one embodiment depicted in FIG. 11A, the double threaded button load cell 1100 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 11A, the universal interface device 150 may be coupled to a tablet device 604 through a wired connection. In yet another embodiment depicted in FIG. 11A, the universal interface device 150 may be coupled to a computing device 606 through a wired connection. In a further embodiment depicted in FIG. 11A, the universal interface device 150 may be coupled to a dedicated handheld device 608 through a wired connection. The double threaded button load cell 1100 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 11B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 11C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the double threaded button load cell 1100 may be any force sensor designed for tension and/or compression measurement applications. In another embodiment, the double threaded button load cell 1100 may comprise of threaded studs on a top surface and a bottom surface of the sensor. The available capacities of the double threaded button cell 1100 may be 11 lb., 22 lb., 110 lb., 220 lb., or 440 lb. In one or more embodiments, the double threaded button cell 1100 may be adapted for use in health kiosks.

Figure 12A:
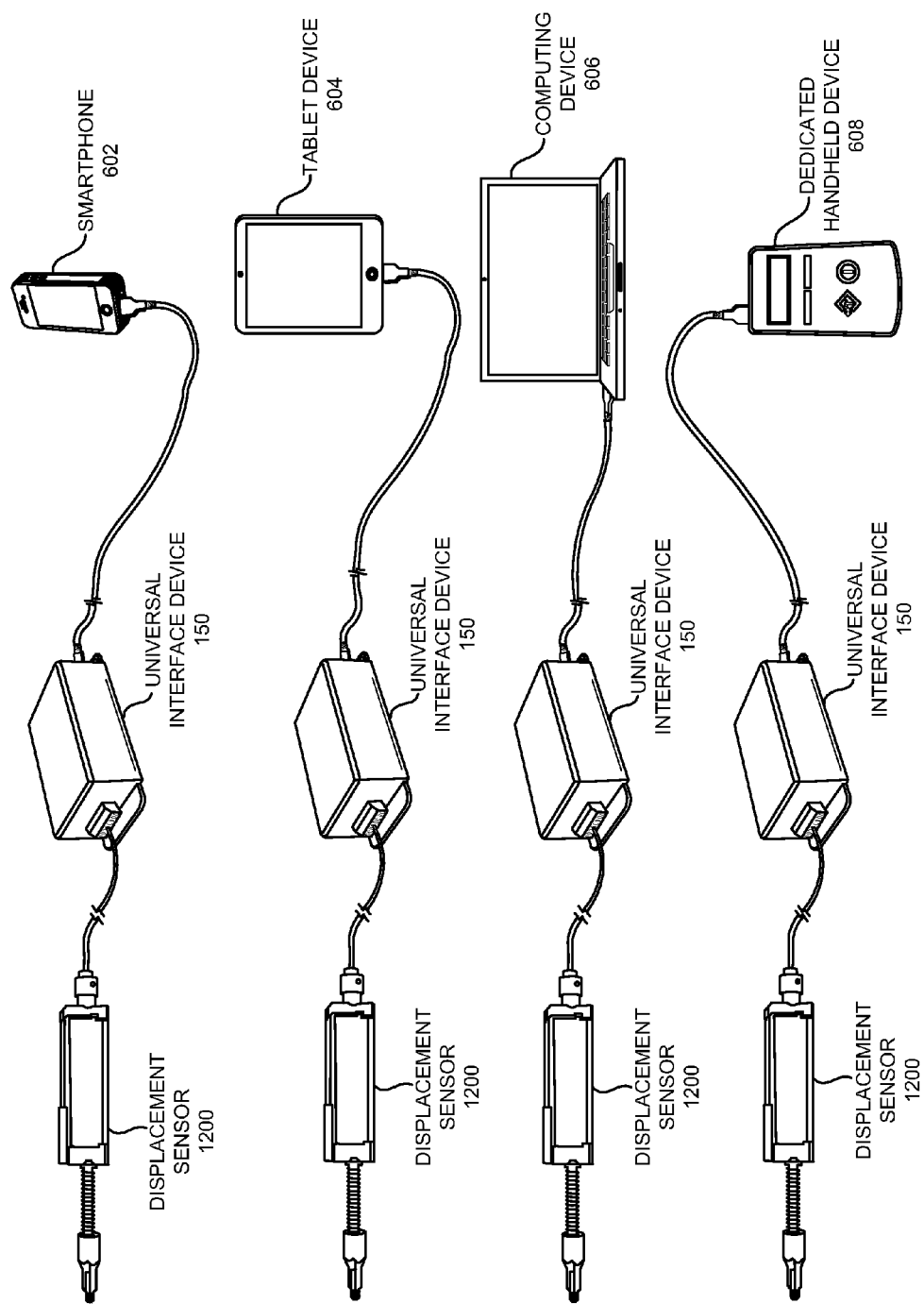
FIGS. 12A-12C depict a system comprising a type of displacement sensor and the universal interface, according to one or more embodiments.
Figure 12B:
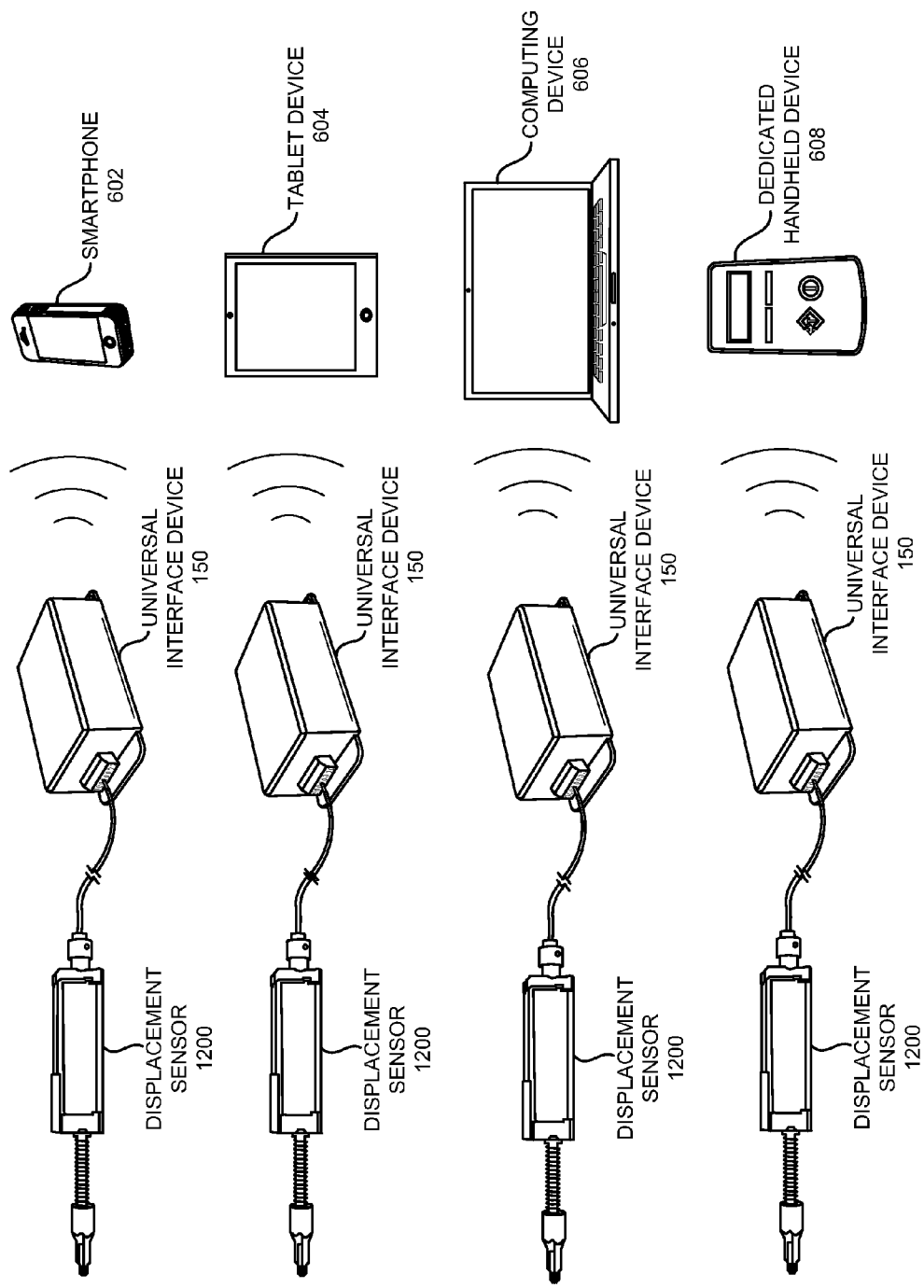
Figure 12C:
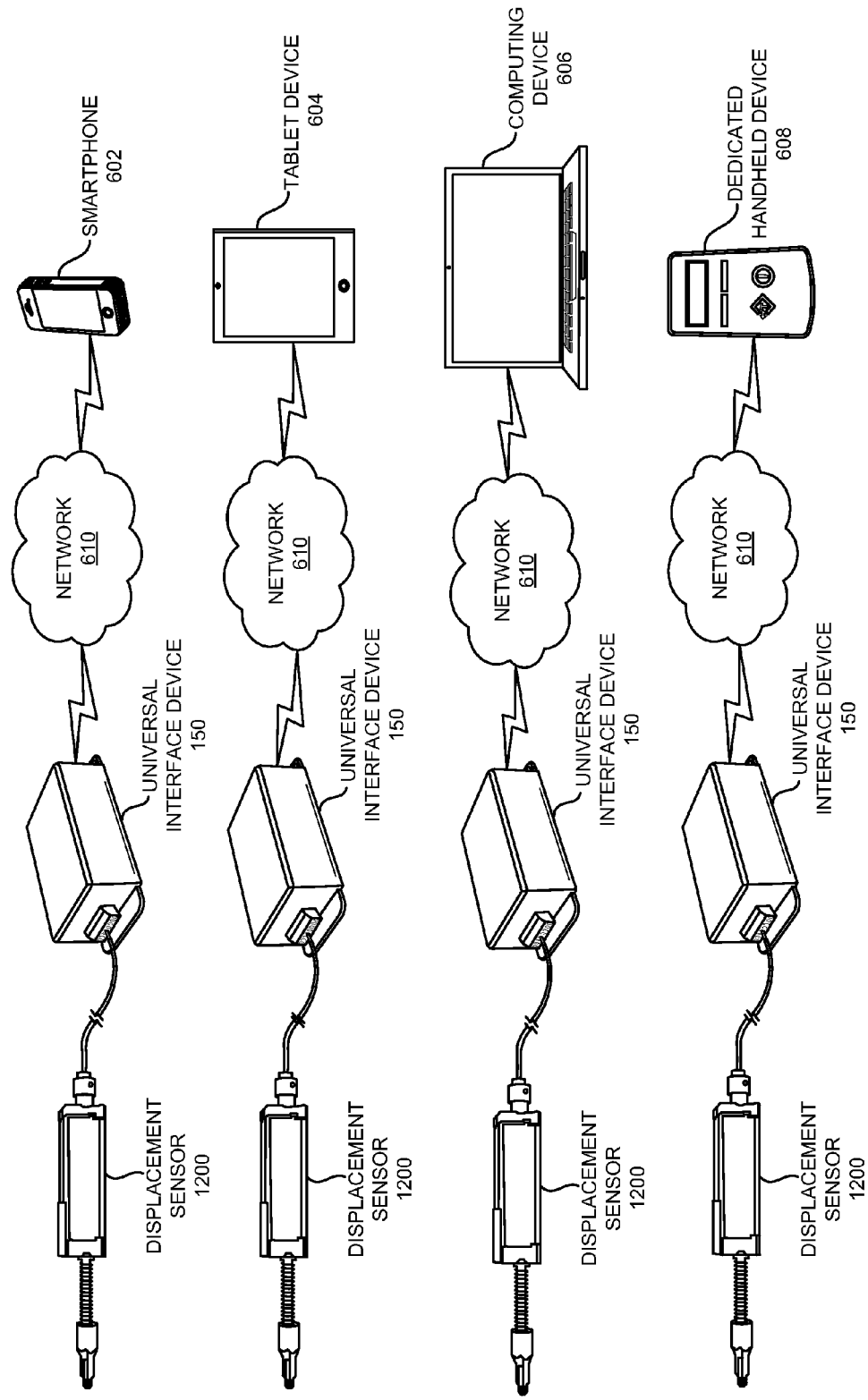

FIGS. 12A-12C depict a system comprising a displacement sensor 1200 and the universal interface 150, according to one or more embodiments. In one embodiment depicted in FIG. 12A, the displacement sensor 1200 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 12A, the universal interface device 150 may be coupled to a tablet device 604 through a wired connection. In yet another embodiment depicted in FIG. 12A, the universal interface device 150 may be coupled to a computing device 606 through a wired connection. In a further embodiment depicted in FIG. 12A, the universal interface device 150 may be coupled to a dedicated handheld device 608 through a wired connection. The displacement sensor 1200 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 12B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 12C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

Figure 12D:
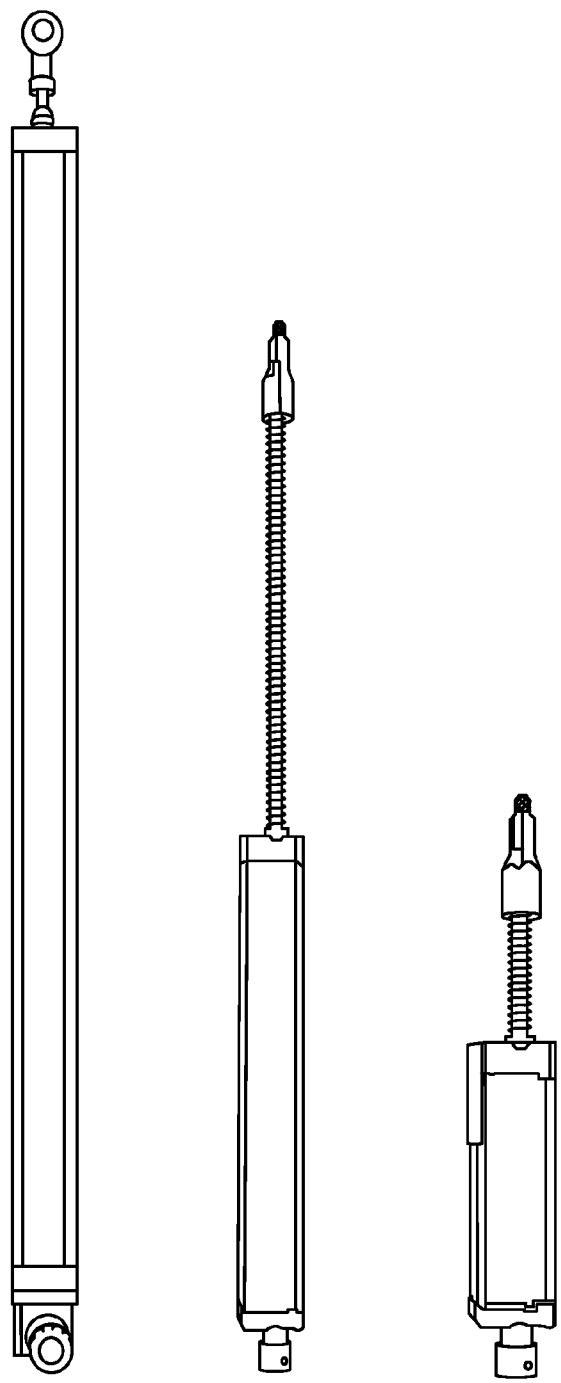
FIG. 12D depicts several exemplary displacement sensors, according to one or more embodiments.

As depicted in FIG. 12D, the displacement sensor 1200 may be available in a plurality of configurations. In one or more embodiments, the displacement sensor 1200 may be any potentiometer such as a string potentiometer designed for displacement measurement applications. In another embodiment, the displacement sensor 1200 may be a standalone analog displacement sensor. In yet another embodiment, the displacement sensor 1200 may be spring loaded. The available configurations of the displacement sensor 1200 may include but not be limited to 10 mm, 25 mm, 50 mm, 100 mm, or 500 mm.

Figure 13A:
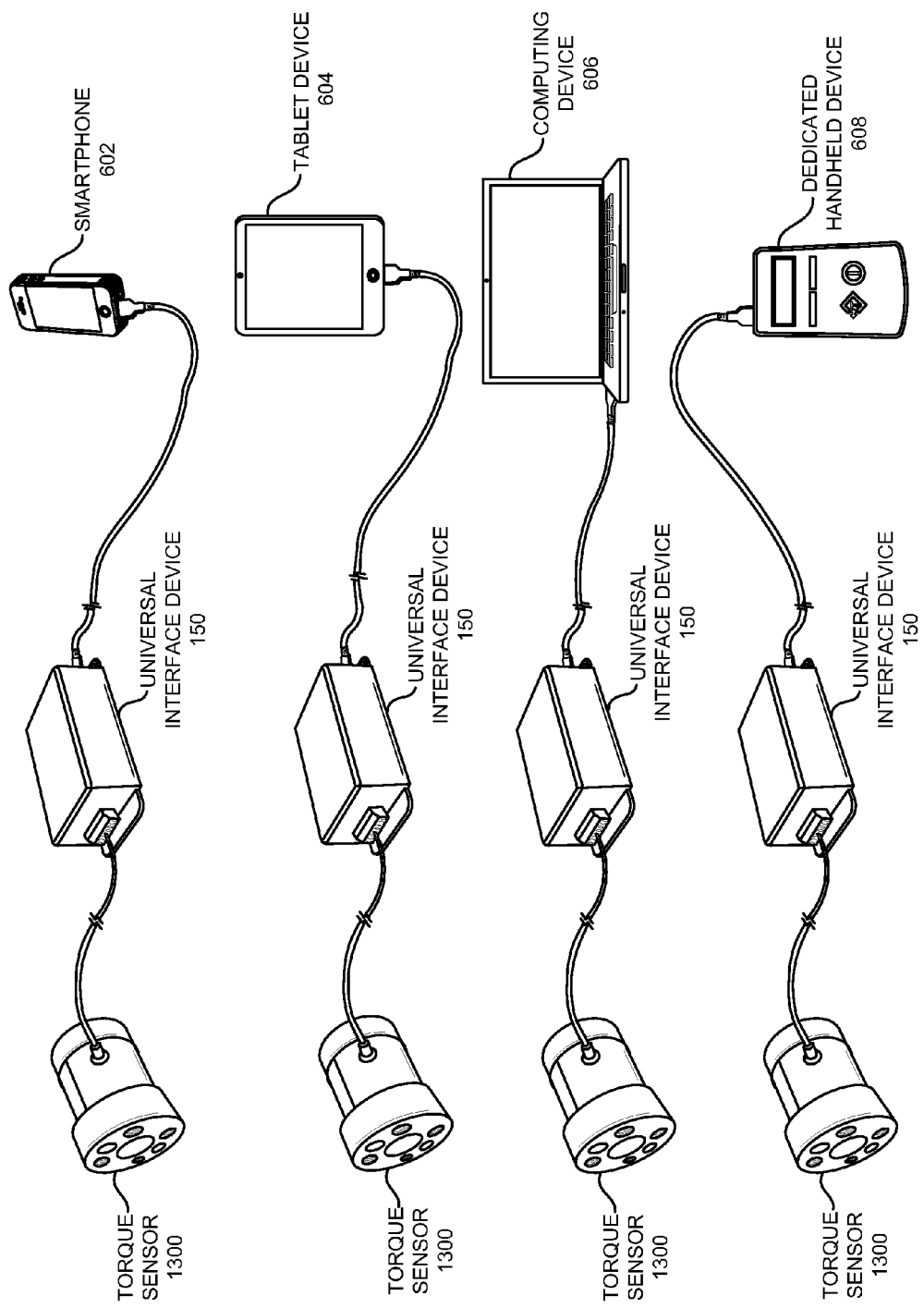
FIGS. 13A-13C depict a system comprising a type of torque sensor and the universal interface, according to one or more embodiments.
Figure 13B:
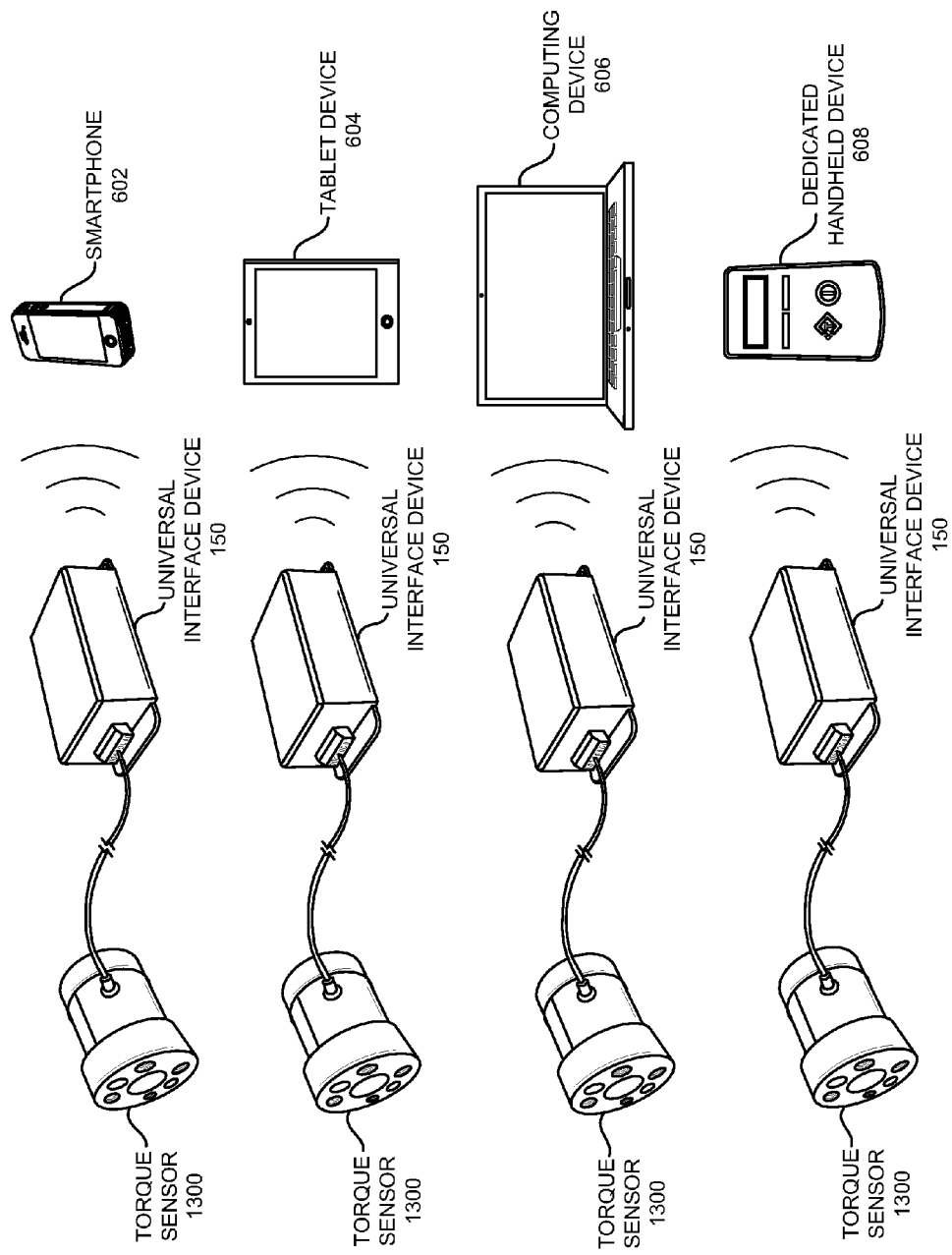
Figure 13C:
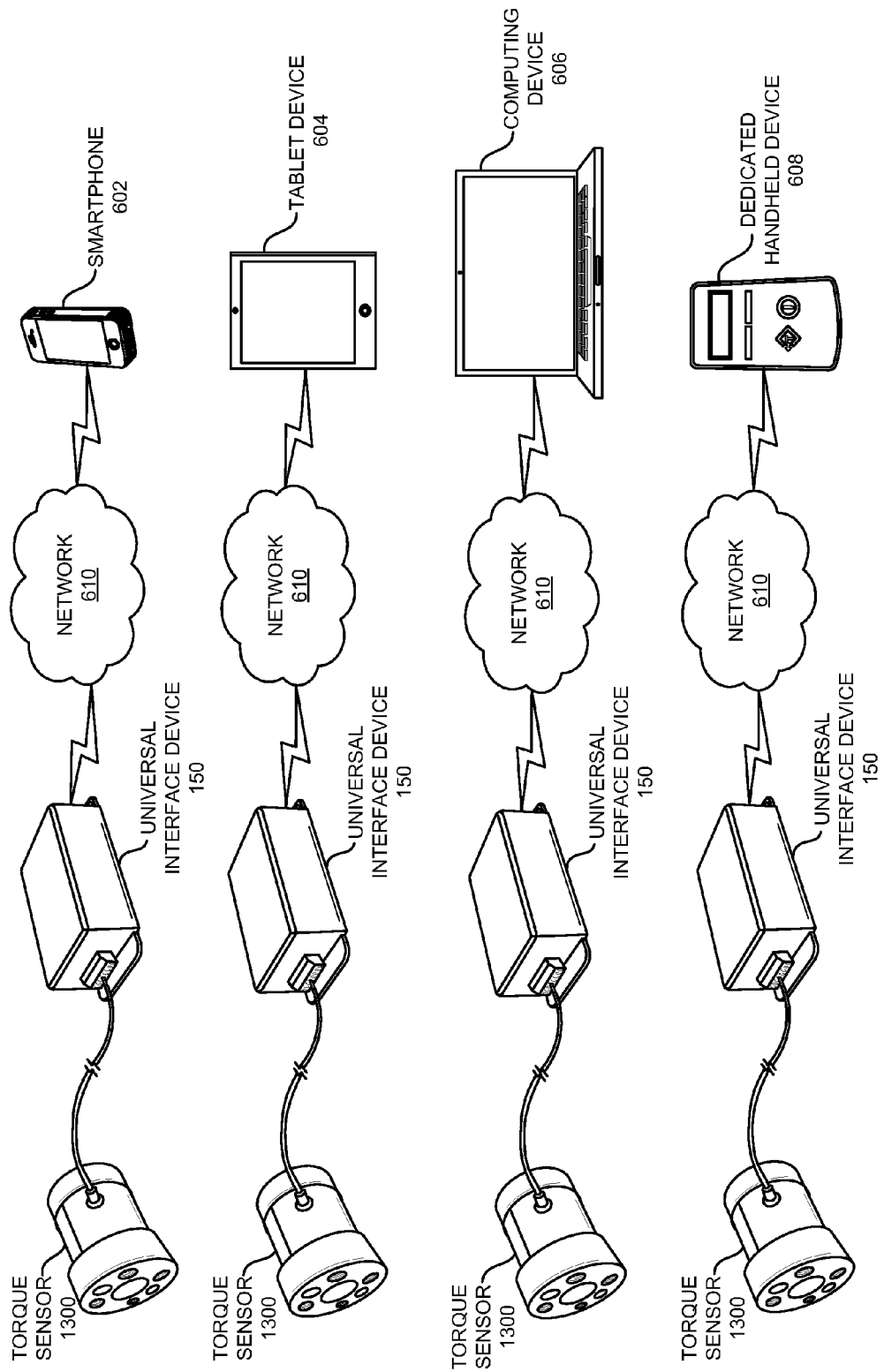

FIGS. 13A-13C depict a system comprising a torque sensor 1300 and the universal interface device 150, according to one or more embodiments. In one embodiment depicted in FIG. 13A, the torque sensor 1300 may be coupled to the universal interface device 150 through a wired connection. The wired connection may be based on an analog 0-5 VDC standard, an analog 4-20 mA standard, an analog mV/V standard, a serial UART standard, an I2C standard, an SPI standard, a USB standard or any other standard known to one of ordinary skill in the art. In this embodiment, the universal interface device 150 may be coupled to a smartphone 602 through a wired connection. In another embodiment depicted in FIG. 13A, the universal interface device 150 may be coupled to a tablet device 604 through a wired connection. In yet another embodiment depicted in FIG. 13A, the universal interface device 150 may be coupled to a computing device 606 through a wired connection. In a further embodiment depicted in FIG. 13A, the universal interface device 150 may be coupled to a dedicated handheld device 608 through a wired connection. The torque sensor 1300 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 13B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 13C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

Figure 13D:
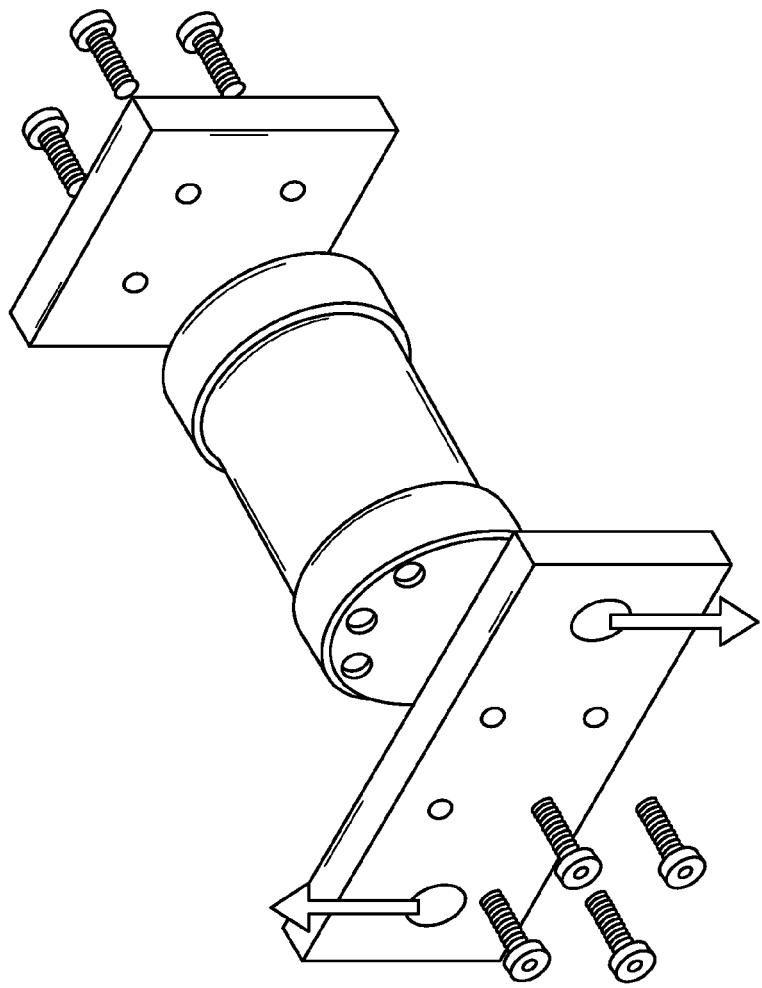
FIG. 13D depicts an assembly of an exemplary torque sensor in use, according to one or more embodiments.

As depicted in FIG. 13D, the torque sensor 1300 may be attached on either or both ends of the torque sensor 1300.

In one or more embodiments, the torque sensor 1300 may be any force sensor designed for torque measurement applications. In one embodiment, the torque sensor 1300 may be made of aluminum. The available capacities of the torque sensor 1300 may be 6 N·m, 10 N·m, 60 N·m, or 150 N·m.

Figure 14C:
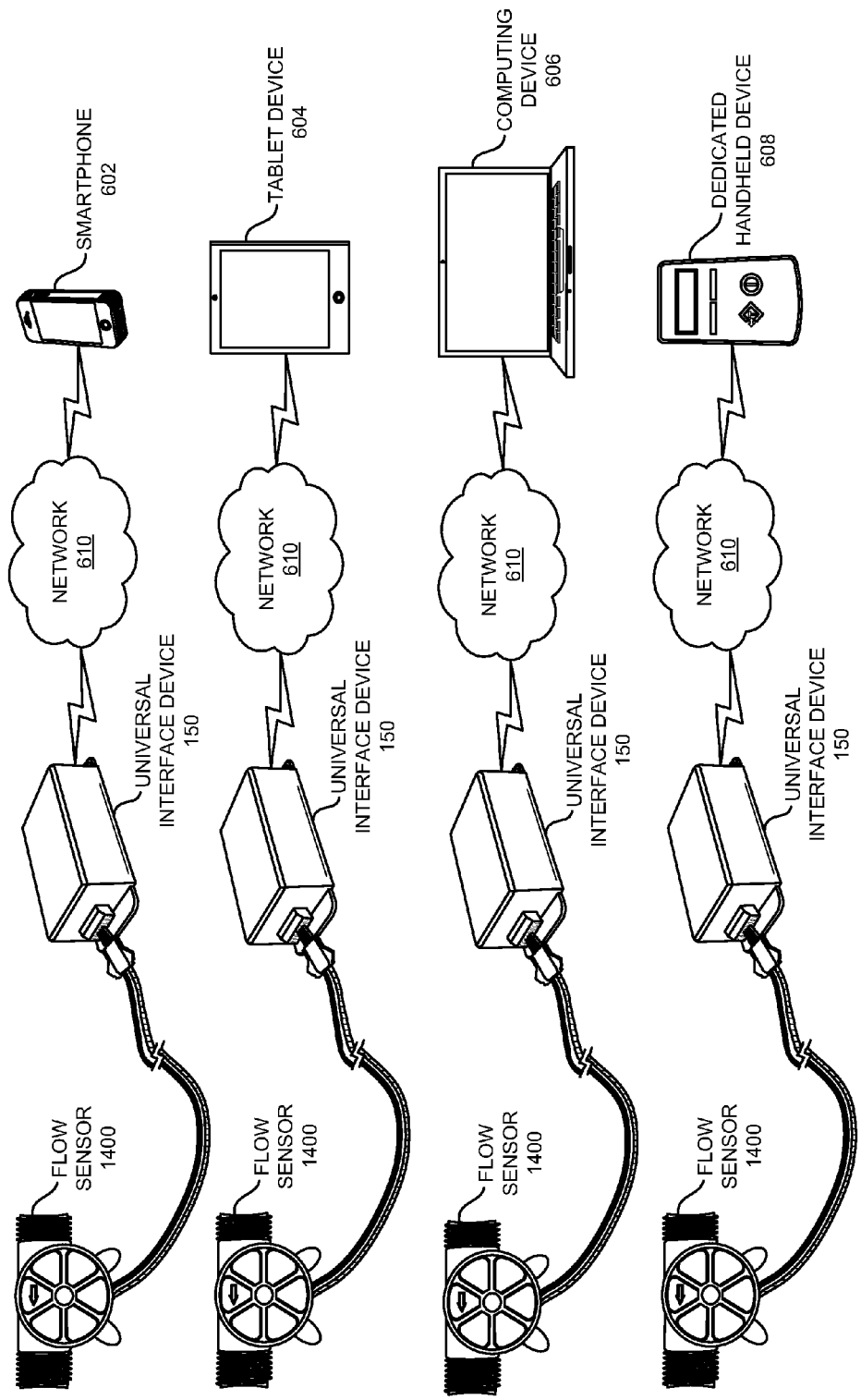

FIGS. 14A-14C depict a system comprising a flow sensor 1400 and the universal interface 150, according to one or more embodiments. In one embodiment depicted in FIG. 14A, the flow sensor 1400 may be coupled to the universal interface device 150 through a wired connection. The wired connection may be based on an analog 0-5 VDC standard, an analog 4-20 mA standard, an analog mV/V standard, a serial UART standard, an I2C standard, an SPI standard, a USB standard or any other standard known to one of ordinary skill in the art. In this embodiment, the universal interface device 150 may be coupled to a smartphone 602 through a wired connection. In another embodiment depicted in FIG. 14A, the universal interface device 150 may be coupled to a tablet device 604 through a wired connection. In yet another embodiment depicted in FIG. 14A, the universal interface device 150 may be coupled to a computing device 606 through a wired connection. In a further embodiment depicted in FIG. 14A, the universal interface device 150 may be coupled to a dedicated handheld device 608 through a wired connection. The flow sensor 1400 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 14B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 14C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the flow sensor 1400 may be any sensor designed for flow measurement applications. In another embodiment, the flow sensor 1400 may be a differential pressure flow meter, velocity flow meter, positive displacement flow meter, mass flow meter, or open channel flow meter. In one embodiment, the flow sensor 1400 may have a vane that is pushed by the flow, and may drive a rotary potentiometer, or similar devices. The flow sensor 1400 may measure flowing velocity, according to one or more embodiments.

Figure 15A:
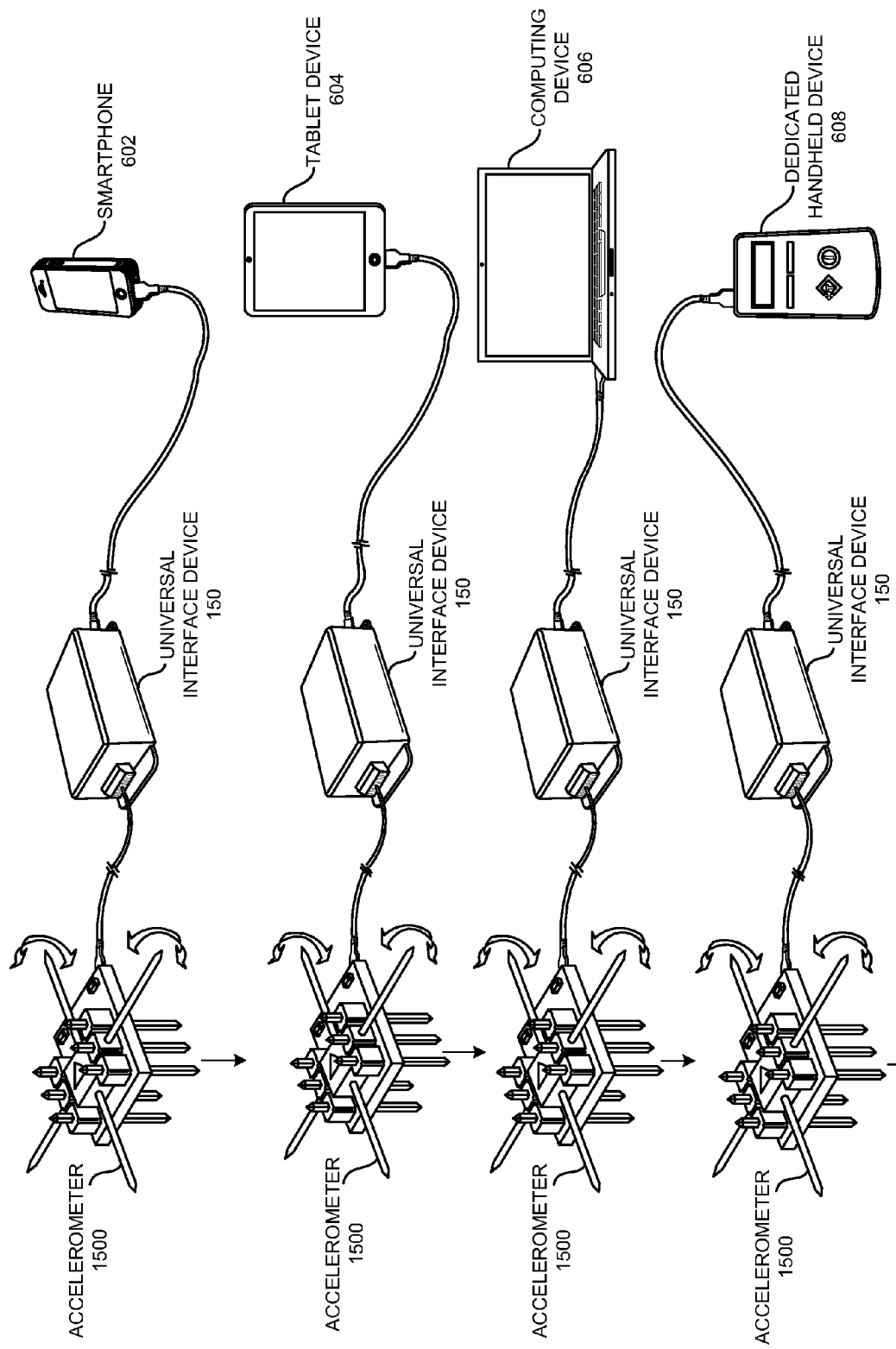
FIGS. 15A-15C depict a system comprising an accelerometer and the universal interface, according to one or more embodiments.
Figure 15B:
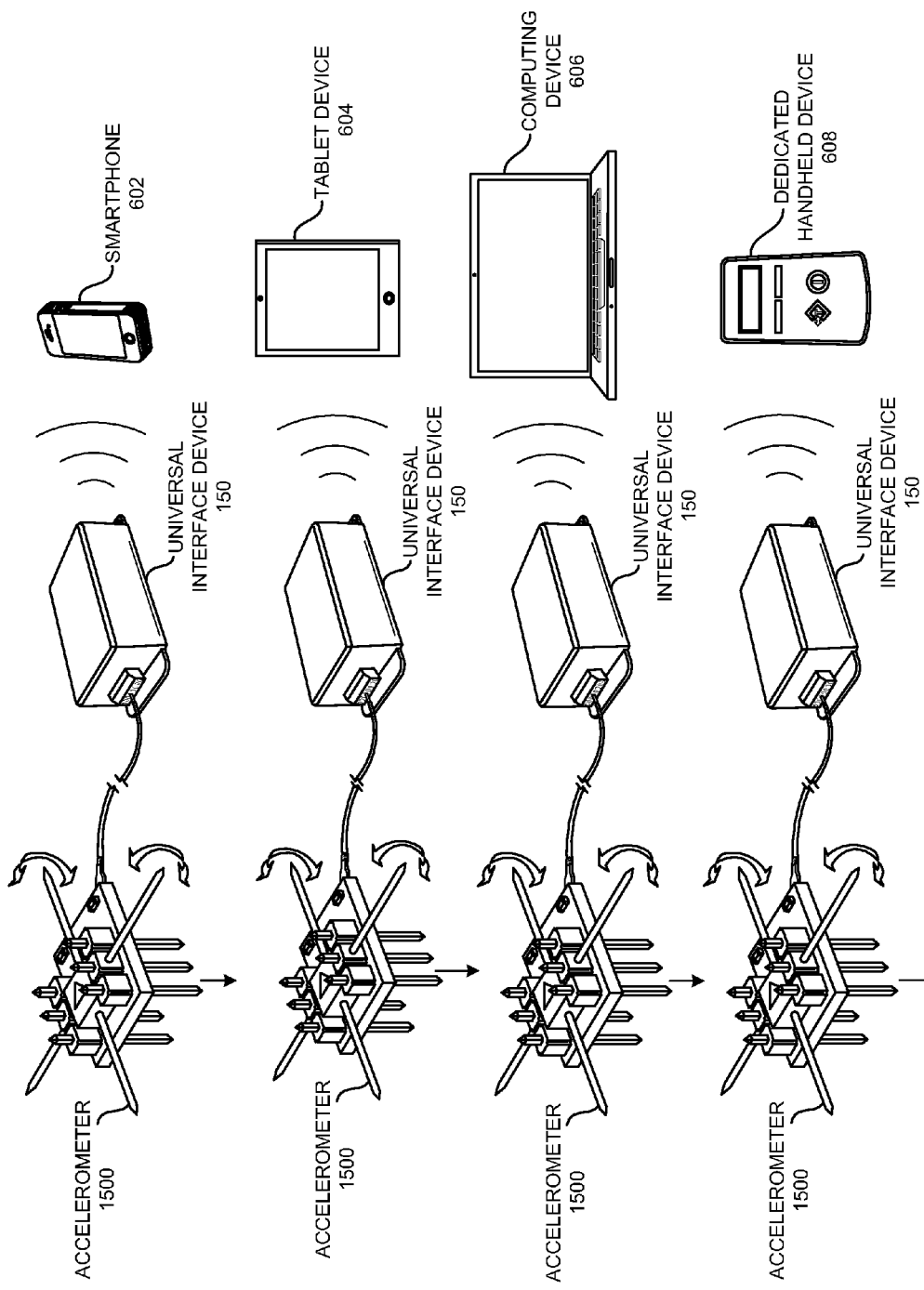
Figure 15C:
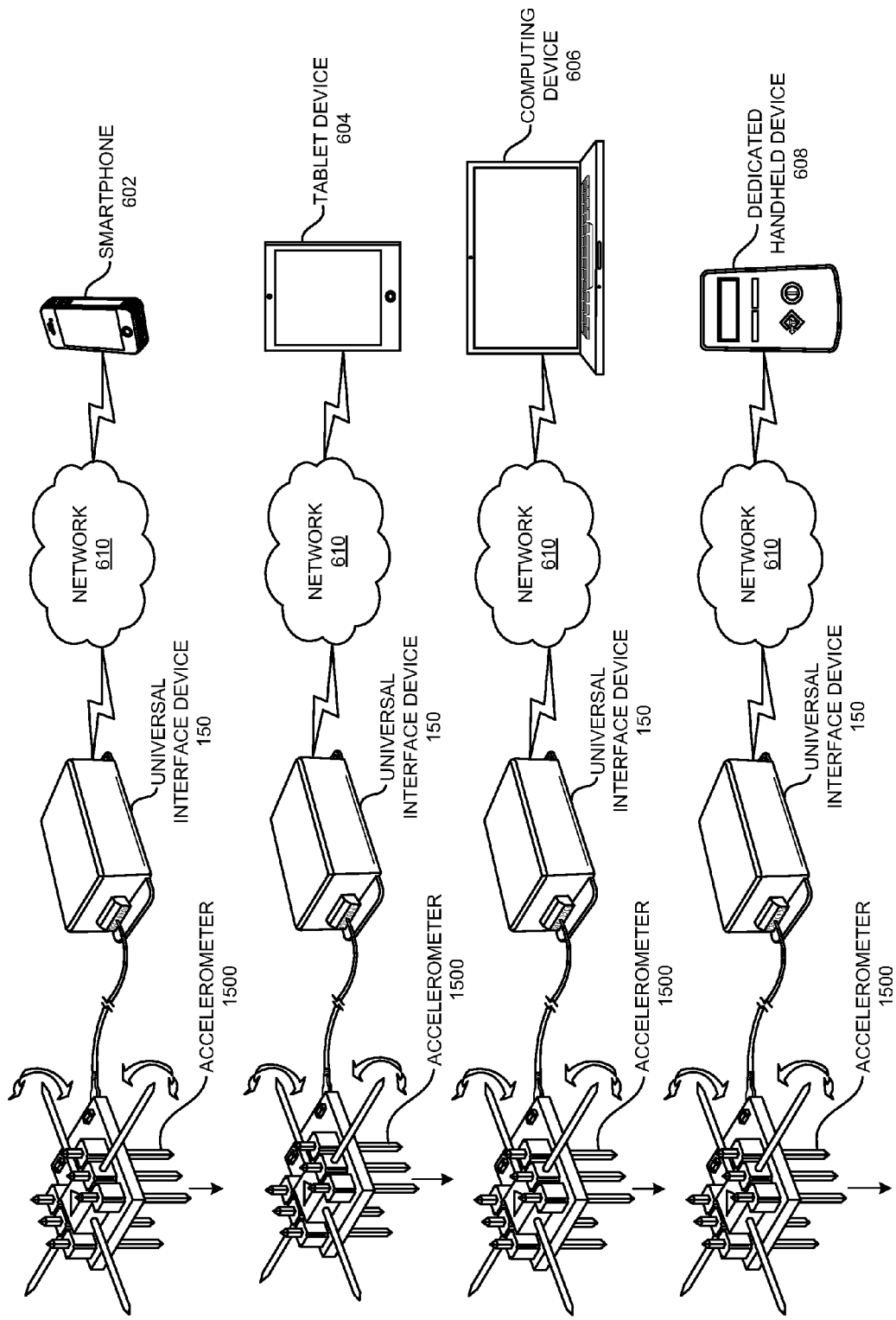

FIGS. 15A-15C depict a system comprising an accelerometer 1500 and the universal interface 150, according to one or more embodiments. In one embodiment depicted in FIG. 15A, the accelerometer 1500 may be coupled to the universal interface device 150 through a wired connection. The wired connection may be based on an analog 0-5 VDC standard, an analog 4-20 mA standard, an analog mV/V standard, a serial UART standard, an I2C standard, an SPI standard, a USB standard or any other standard known to one of ordinary skill in the art. In this embodiment, the universal interface device 150 may be coupled to a smartphone 602 through a wired connection. In another embodiment depicted in FIG. 15A, the universal interface device 150 may be coupled to a tablet device 604 through a wired connection. In yet another embodiment depicted in FIG. 15A, the universal interface device 150 may be coupled to a computing device 606 through a wired connection. In a further embodiment depicted in FIG. 15A, the universal interface device 150 may be coupled to a dedicated handheld device 608 through a wired connection. The accelerometer 1500 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 15B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 15C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the accelerometer 1500 may be any sensor designed for acceleration force measurement applications. In another embodiment, the accelerometer 1500 may be an analog or a digital electromechanical device. In one embodiment, the accelerometer 1500 may measure the amount of static acceleration, typically due to gravity, or dynamic acceleration. In one embodiment, the accelerometer 1500 may rely on the piezoelectric effect for its operation. In another embodiment, the accelerometer 1500 may rely on a change in capacitance. In yet another embodiment, the accelerometer 1500 may rely on a change in piezoresistivity.

Figure 16A:
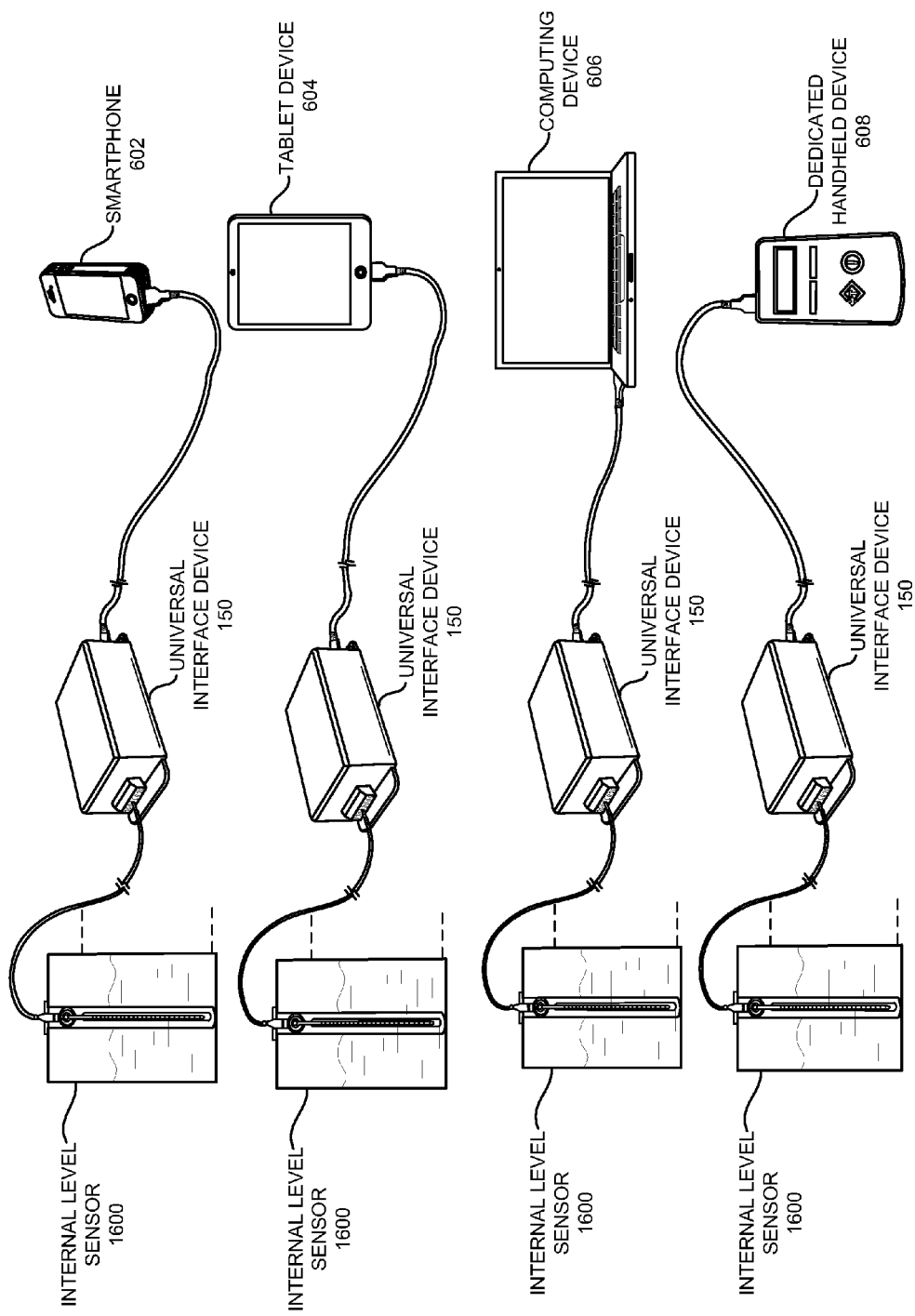
Figure 16B:
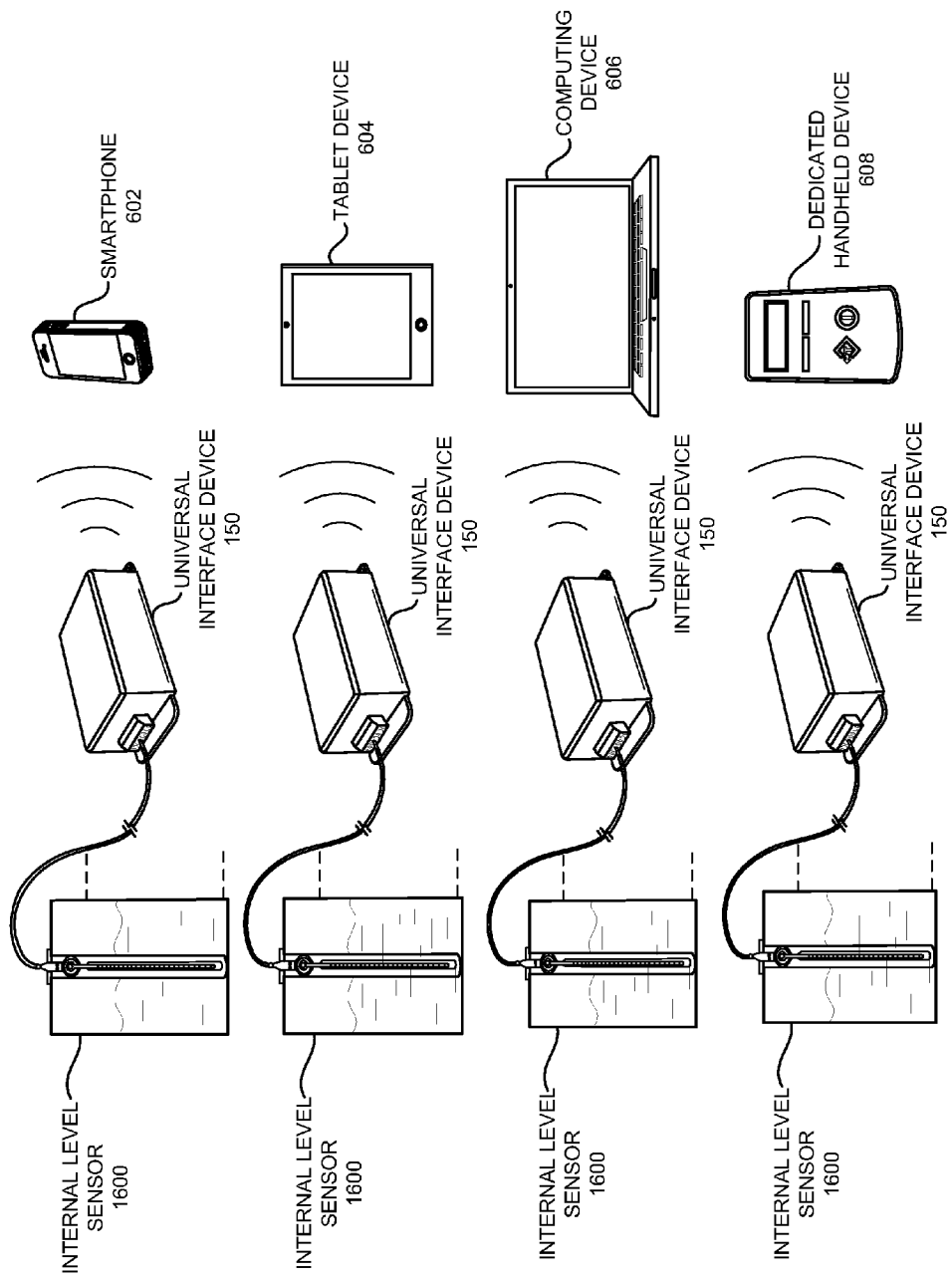
Figure 16C:
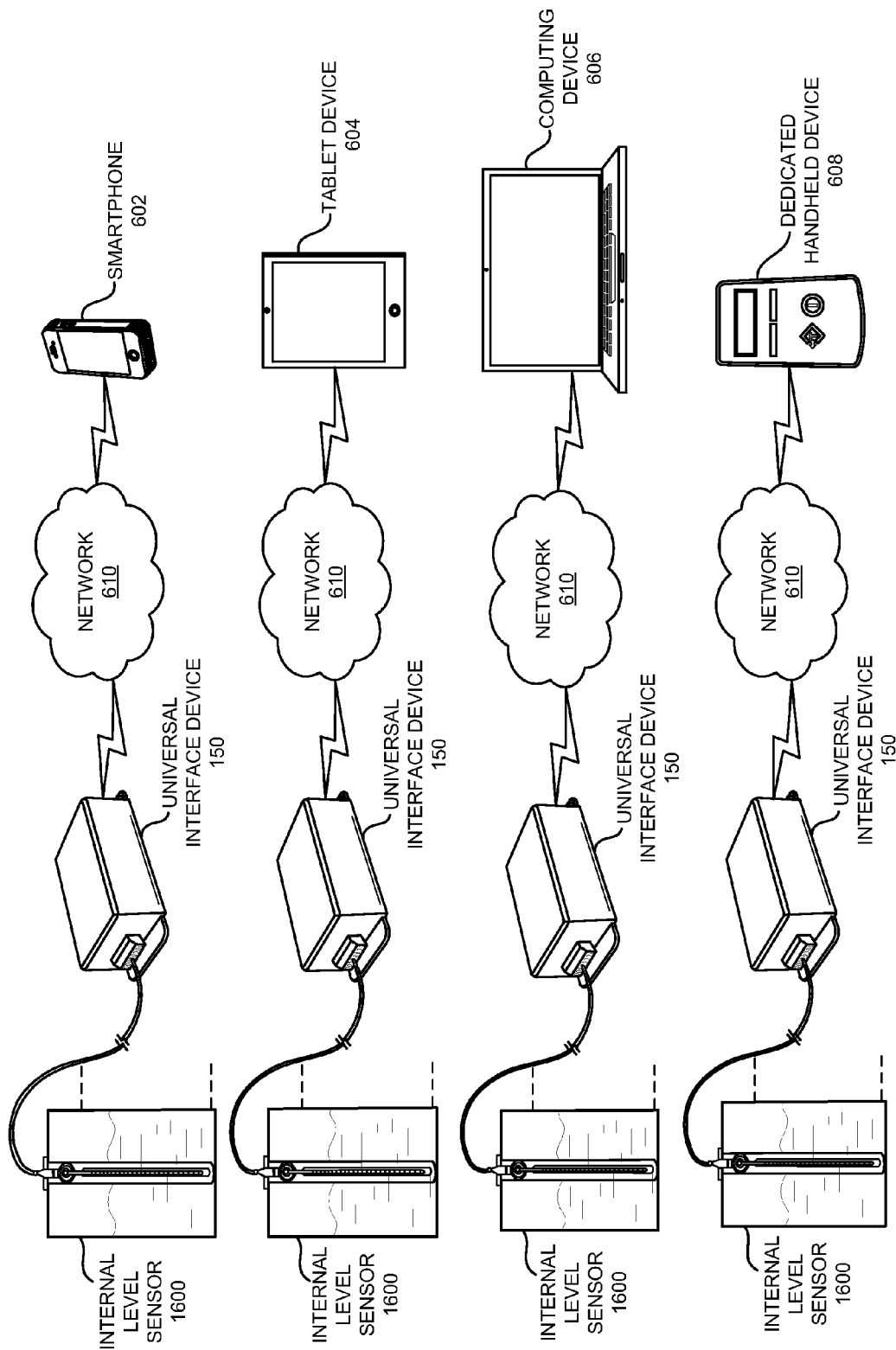

FIGS. 16A-16C depict a system comprising an internal level sensor 1600 and the universal interface 150, according to one or more embodiments. In one embodiment depicted in FIG. 16A, the internal level sensor 1600 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 16A, the universal interface device 150 may be coupled to a tablet device 604 through a wired connection. In yet another embodiment depicted in FIG. 16A, the universal interface device 150 may be coupled to a computing device 606 through a wired connection. In a further embodiment depicted in FIG. 16A, the universal interface device 150 may be coupled to a dedicated handheld device 608 through a wired connection. The internal level sensor 1600 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 16B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 16C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the internal level sensor 1600 may be any capacitive sensor designed for the detection of fluid levels, powder levels, and/or granular material levels. In one embodiment, the internal level sensor 1600 may be a capacitive level sensor used on the inside of a metallic or a non-metallic tank. In this embodiment, the internal level sensor 1600 may be submerged or immersed in the material inside the tank.

Figure 16F:
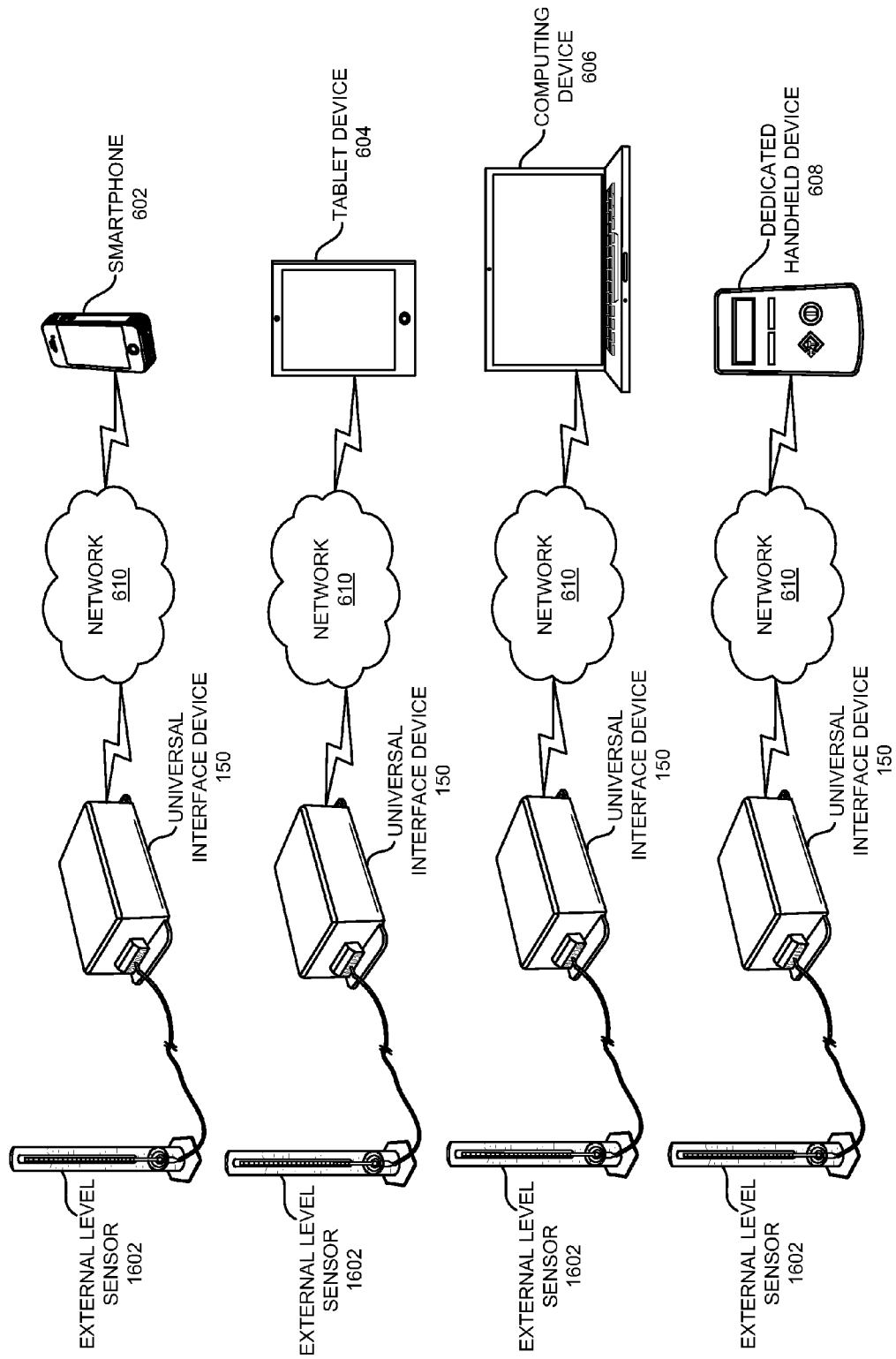

FIGS. 16D-16F depict a system comprising an external level sensor 1602 and the universal interface 150, according to one or more embodiments. In one embodiment depicted in FIG. 16D, the external level sensor 1602 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 16D, the universal interface device 150 may be coupled to a tablet device 604 through a wired connection. In yet another embodiment depicted in FIG. 16D, the universal interface device 150 may be coupled to a computing device 606 through a wired connection. In a further embodiment depicted in FIG. 16D, the universal interface device 150 may be coupled to a dedicated handheld device 608 through a wired connection. The external level sensor 1602 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 16E, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 16F, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the external level sensor 1602 may be any fluid level sensor designed for fluid level detection, measuring, and/or monitoring applications. In another embodiment, the external level sensor 1602 may be a capacitive level sensor mounted on the outside of a non-metallic tank and may be a contact free method of measuring fluid levels.

Figure 17A:
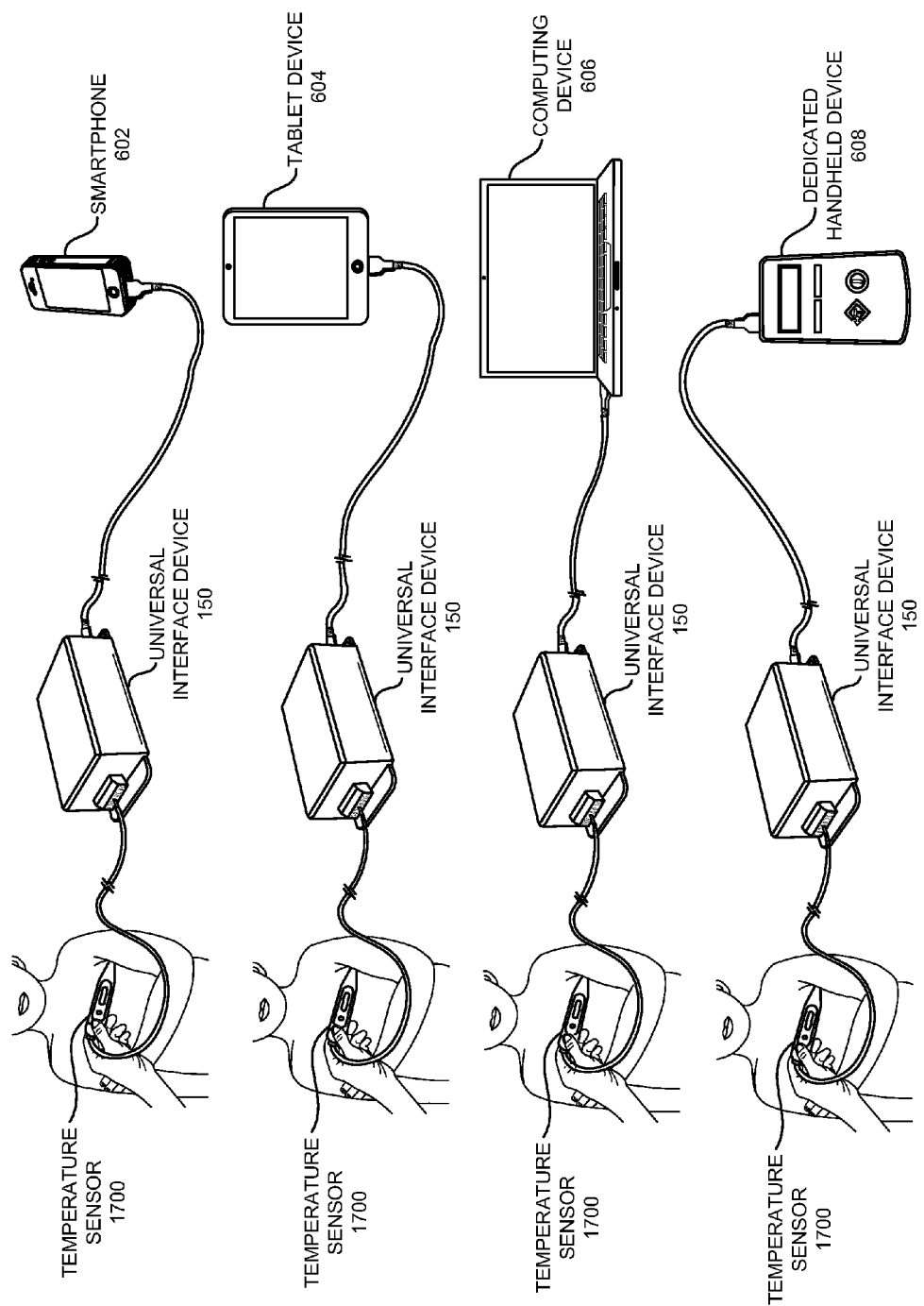
Figure 17B:
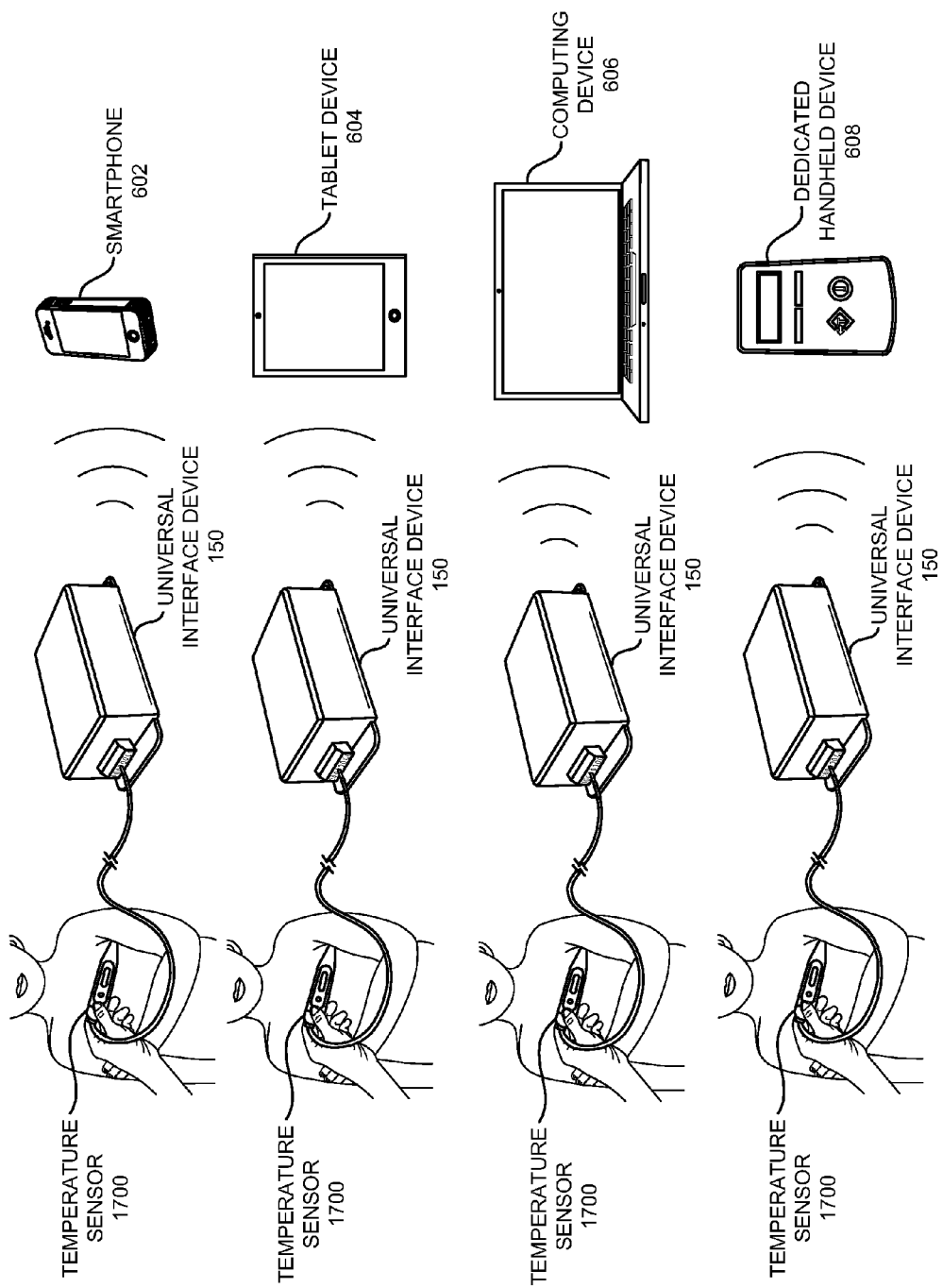

FIGS. 17A-17C depict a system comprising a temperature sensor 1700 and the universal interface 150, according to one or more embodiments. In one embodiment depicted in FIG. 17A, the temperature sensor 1700 may be coupled to the universal interface device 150 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the universal interface device 150 may be coupled to a smartphone 602 through a wired connection. In another embodiment depicted in FIG. 17A, the universal interface device 150 may be coupled to a tablet device 604 through a wired connection. In yet another embodiment depicted in FIG. 17A, the universal interface device 150 may be coupled to a computing device 606 through a wired connection. In a further embodiment depicted in FIG. 17A, the universal interface device 150 may be coupled to a dedicated handheld device 608 through a wired connection. The temperature sensor 1700 may communicate to the universal interface device 150 through the wired connection and the universal interface device 150 may communicate with any of the aforementioned devices through the wired connection. In one or more embodiments, the universal interface device 150 may establish such a wired connection through the wired interface 324 depicted in FIG. 3.

As depicted in FIG. 17B, the universal interface device 150 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 17C, the universal interface device 150 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

In one or more embodiments, the temperature sensor 1700 may be any temperature sensing device designed for measuring and/or recording temperature and/or temperature gradient applications. In one embodiment, the temperature sensor 1700 may be any electronic temperature sensing device. In this embodiment, the temperature sensor 1700 may measure and/or record in the Celsius scale, Fahrenheit scale, or Kelvin scale.

Figure 18A:
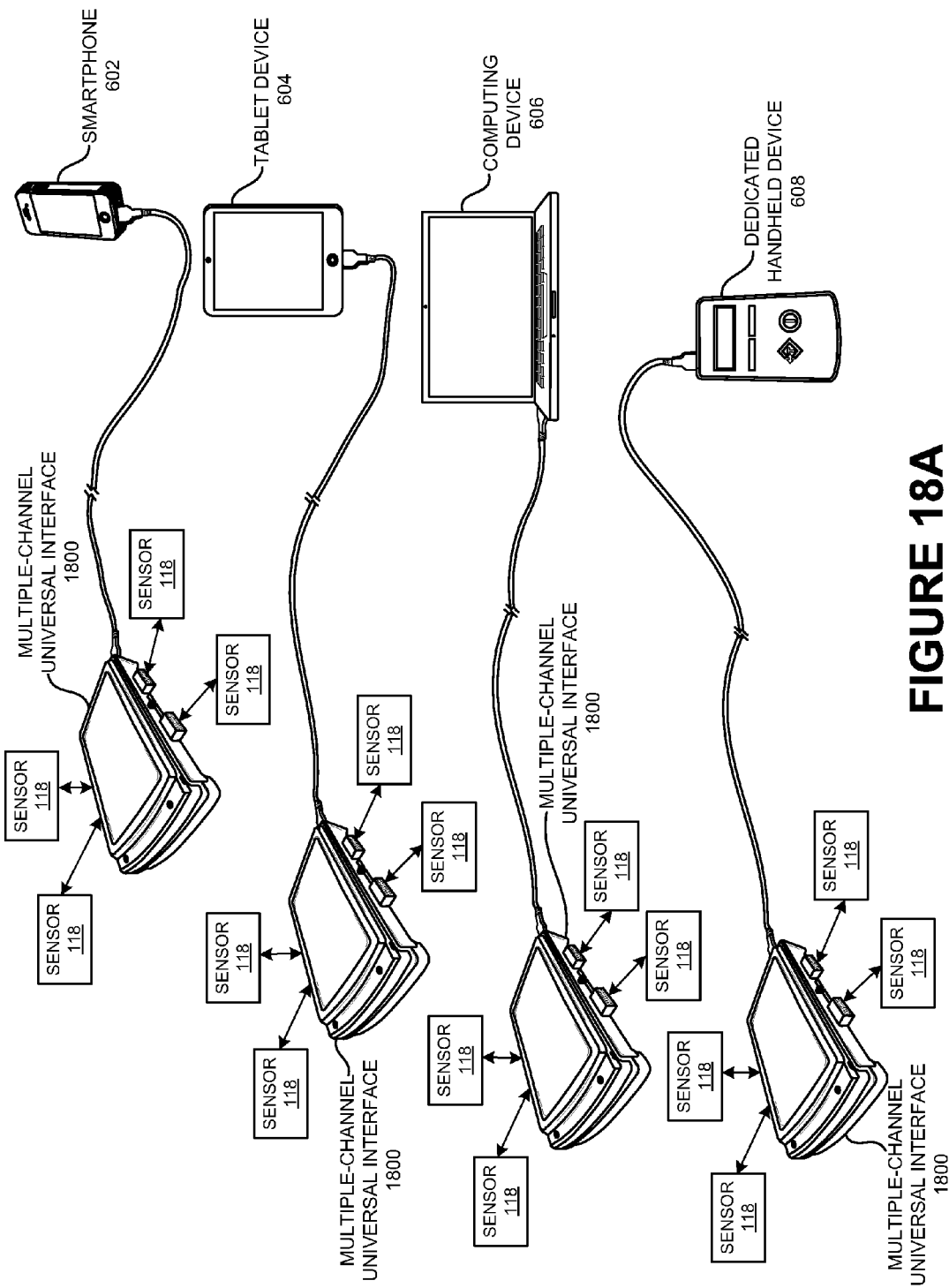
FIGS. 18A-18C depict a system comprising multiple sensors and the universal interface, according to one or more embodiments.
Figure 18B:
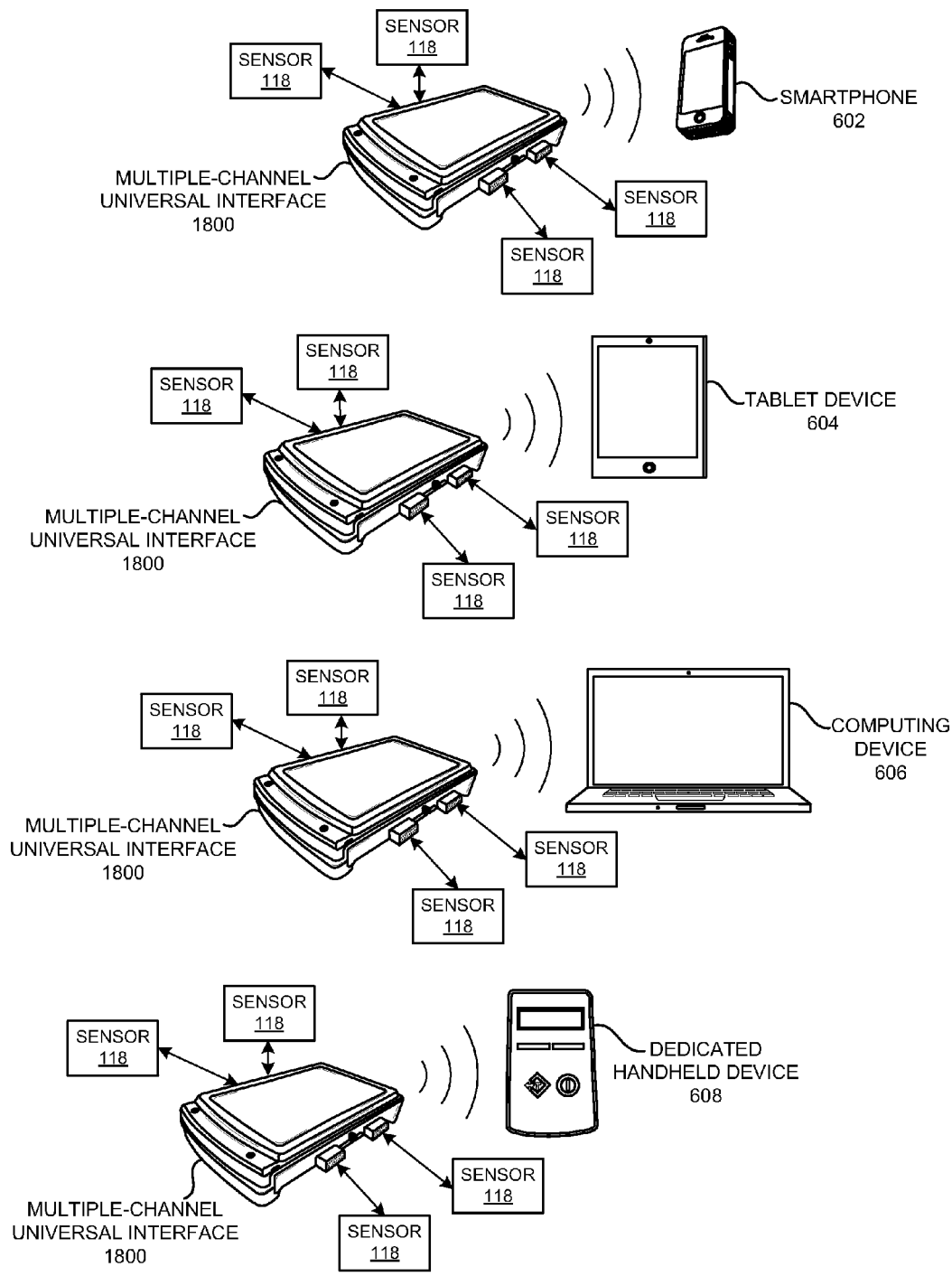
Figure 18C:
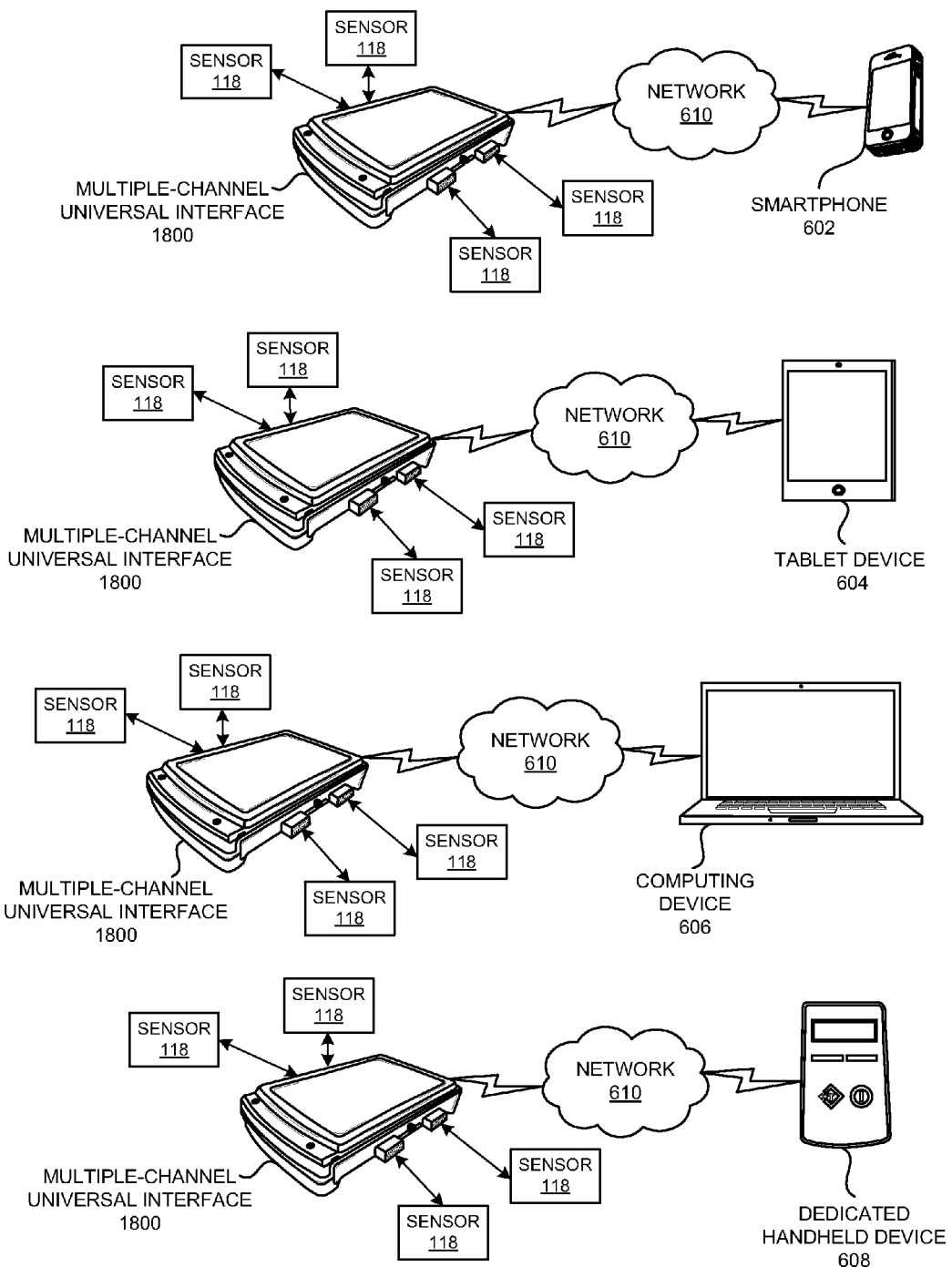

FIGS. 18A-18C depict a system comprising a plurality of sensors (for example, multiple sensors 118) coupled to a multiple-channel universal interface 1800, according to one or more embodiments. In one embodiment depicted in FIG. 18A, the plurality of sensors 118 may be coupled to the multiple-channel universal interface 1800 through a wired connection. The wired connection may be based on an analog 0-5 VDC standard, an analog 4-20 mA standard, an analog mV/V standard, a serial UART standard, an I2C standard, a SPI standard, a USB standard or any other standard known to one of ordinary skill in the art. In this embodiment, the multiple-channel universal interface 1800 may be coupled to a smartphone 602 through a wired connection. In another embodiment depicted in FIG. 18A, the multiple-channel universal interface 1800 may be coupled to a tablet device 604 through a wired connection. In yet another embodiment depicted in FIG. 18A, the multiple-channel universal interface 1800 may be coupled to a computing device 606 through a wired connection. In a further embodiment depicted in FIG. 18A, the multiple-channel universal interface 1800 may be coupled to a dedicated handheld device 608 through a wired connection. The plurality of sensor 118 may communicate to the multiple-channel universal interface 1800 through the wired connection and the multiple-channel universal interface 1800 may communicate with any of the aforementioned devices through the wired connection. In one or more embodiments, the multiple-channel universal interface 1800 may establish such a wired connection through the wired interface 324 depicted in FIG. 3.

As depicted in FIG. 18B, the multiple-channel universal interface 1800 may communicate with any of the smartphone 602, the tablet device 604, the computing device 606, and/or the dedicated handheld device 608 through a wireless connection. The wireless connection may be established through any of a Bluetooth® standard, a WiFi standard, a near-field communication (NFC) standard, or an applicable radio frequency standard. In one or more embodiments, the universal interface device 150 may establish such a wireless connection through the wireless interface 326 depicted in FIG. 3.

As depicted in FIG. 18C, the multiple-channel universal interface 1800 may communicate with any of the smartphone 602, the tablet device 604, the computing device 606, and/or the dedicated handheld device 608 through a network 610. The network 610 may be either a wired network or a wireless network. In one or more embodiments, the wireless network may be a local area network (LAN), a wide area network (WAN), or a cellular network. In one embodiment, the network 610 may be a distributed network in a cloud computing environment. In the case where the network 610 is a cellular network, such a network may comprise signals sent through a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and/or a General Packet Radio Service ("GPRS") protocol.

Figure 19:
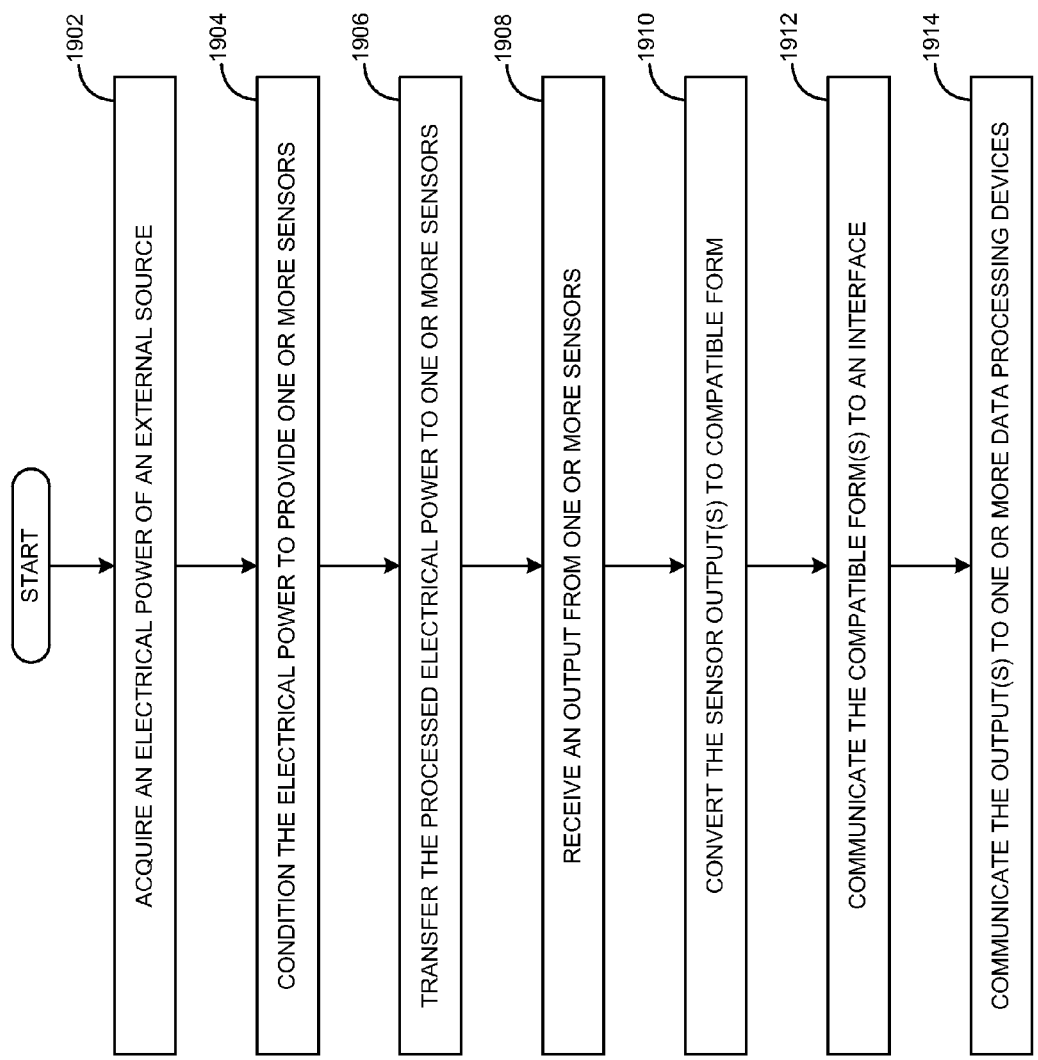
FIG. 19 is an additional process flow diagram depicting an additional exemplary method, according to one or more embodiments.

FIG. 19 is a process flow depicting an exemplary method disclosed herein. In operation 1902, the operation comprises acquiring an electrical power of an external source. In operation 1904, the operation comprises conditioning the electrical power to provide for one or more sensors. In operation 1906, the operation comprises transferring the processed electrical power to one or more sensors. In operation 1908, the operation comprises receiving an output from one or more sensors. In operation 1910, the operation comprises converting the sensor output(s) to a compatible form. In operation 1912, the operation comprises communicating the compatible form(s) to an interface. Finally, in operation 1914, the operation involves communicating the output(s) to one or more data processing devices (for example, the smartphone 602, the tablet device 604, the computing device 606, and/or the dedicated handheld device 608).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

In addition, it will be appreciated that the universal interface device may be constructed using semiconductor fabrication techniques as single application specific integrated circuit (ASIC) or a series of ASICS that perform the functions described herein. This system could be described as a system on a chip that performs the role of an interface device between one or more sensors and one or more computing and display devices.

In addition to displaying the data from the sensors on a PC, tablet, smartphone or dedicated display, the universal interface device can also serve as an interface to relays, switches, motors, valves, linear actuators, alarms, sound systems, lamps, pumps, heating or cooling devices, and other external devices to enable or disable them based on input values received from the one or more sensors.

What is claimed is:

1. A method, comprising:
    acquiring an electrical power signal of an external source at a universal interface device;
    communicating with one or more sensors coupled to the universal interface device through the universal interface device;
    conditioning, at the universal interface device, the electrical power signal, wherein the conditioning is based on a type of power used and a quality of power used by the one or more sensors;
    transferring the conditioned electrical power signal to the one or more sensors;
    receiving, at the universal interface device, an output of the one or more sensors operating on the conditioned electrical power signal;
    converting the output of the one or more sensors to an appropriate form thereof compatible with an interface associated with the universal interface device;
    communicating the appropriate form to the interface; and
    communicating the output of the one or more sensors to one or more data processing devices communicatively coupled to the universal interface device through the interface.

2. The method of claim 1, wherein the output of the one or more sensors is communicated to the one or more data processing devices through a wired connection.

3. The method of claim 1, wherein the output of the one or more sensors is communicated to the one or more data processing devices through a network.

4. The method of claim 3, wherein the network is a distributed network in a cloud computing environment.

5. The method of claim 3, wherein the network is one of a wired network and a wireless network.

6. The method of claim 5, wherein the wireless network is one of a cellphone based data network, a Bluetooth® network, a WiFi network, a ZigBee® network, and a radio frequency identification (RFID) network.

7. The method of claim 1, wherein the one or more sensors is at least one of a force sensor, a weight sensor, a torque sensor, a pressure sensor, a displacement sensor, an accelerometer, a flow sensor, a level sensor, and a temperature sensor.

8. The method of claim 7, wherein the force sensor is at least one of a pancake load cell, a single point load cell, a button load cell, a shear-beam load cell, and an S-beam load cell.

9. The method of claim 1, wherein the one or more data processing devices is a laptop computer, a desktop computer, a tablet device, a smartphone, a pump, a motor, a valve, a linear actuator, an alarm, a sound system, and a dedicated handheld device.

10. The method of claim 1, wherein the universal interface device is in the form of an application specific integrated circuit (ASIC).

11. A system, comprising:
    one or more sensors; and
    a universal interface device coupled to the one or more sensors, wherein the universal interface device further:
        acquires an electrical power signal of an external source,
        communicates with the one or more sensors,
        conditions the electrical power signal, wherein the conditioning is based on a type of power used and a quality of power used by the sensor,
        transfers the conditioned electrical power signal to the one or more sensors,
        receives an output of the one or more sensors operating on the conditioned electrical power signal,
        converts the output of the one or more sensors to an appropriate form thereof compatible with an interface associated with the universal interface device,
        communicates the appropriate form to the interface, and
        communicates the output of the one or more sensors to one or more data processing devices communicatively coupled to the universal interface device through the interface.

12. The system of claim 11, wherein the output of the one or more sensors is communicated to the one or more data processing devices through a wired connection.

13. The system of claim 11, wherein the output of the one or more sensors is communicated to the one or more data processing devices through a network.

14. The system of claim 13, wherein the network is a distributed network in a cloud computing environment.

15. The system of claim 13, wherein the network is one of a wired network and a wireless network.

16. The system of claim 15, wherein the wireless network is one of a cellphone based data network, a Bluetooth® network, a WiFi network, a ZigBee® network, and a radio frequency identification (RFID) network.

17. The system of claim 11, wherein the one or more sensors is at least one of a force sensor, a weight sensor, a torque sensor, a pressure sensor, a displacement sensor, an accelerometer, a flow sensor, a level sensor, and a temperature sensor.

18. The system of claim 17, wherein the force sensor is at least one of a pancake load cell, a single point load cell, a button load cell, a shear-beam load cell, and an S-beam load cell.

19. The system of claim 11, wherein the one or more data processing devices is a laptop computer, a desktop computer, a tablet device, a smartphone, a pump, a motor, a valve, a linear actuator, an alarm, a sound system, and a dedicated handheld device.

20. The system of claim 11, wherein the universal interface device is in the form of an application specific integrated circuit (ASIC).

* * * * *